(12) United States Patent
Tomigashi

(10) Patent No.: US 7,679,308 B2
(45) Date of Patent: Mar. 16, 2010

(54) MOTOR CONTROL DEVICE

(75) Inventor: Yoshio Tomigashi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 270 days.

(21) Appl. No.: 11/819,067

(22) Filed: Jun. 25, 2007

(65) Prior Publication Data
US 2008/0001571 A1  Jan. 3, 2008

(30) Foreign Application Priority Data
Jun. 28, 2006  (JP) .............................. 2006-177989

(51) Int. Cl.
*H02P 21/14* (2006.01)

(52) U.S. Cl. .................. 318/807; 318/400.02; 318/768; 318/801

(58) Field of Classification Search .................. 318/801, 318/807, 400.02, 701, 768, 461
See application file for complete search history.

(56) References Cited

U.S. PATENT DOCUMENTS

| | | | | |
|---|---|---|---|---|
| 5,264,773 A * | 11/1993 | Koyama et al. | ............. | 318/798 |
| 6,163,127 A | 12/2000 | Patel et al. | | |
| 6,329,781 B1 * | 12/2001 | Matsui et al. | ............... | 318/717 |
| 6,636,008 B2 * | 10/2003 | Yamada et al. | ......... | 318/400.02 |
| 6,768,280 B2 * | 7/2004 | Kitajima | .................... | 318/432 |
| 7,112,931 B2 * | 9/2006 | Kitajima | .................... | 318/114 |
| 7,248,989 B2 * | 7/2007 | Bae | ............................. | 702/142 |
| 7,388,246 B2 * | 6/2008 | Ahn et al. | .................... | 257/310 |
| 2001/0019251 A1 * | 9/2001 | Nakazawa | .................... | 318/701 |
| 2001/0024100 A1 * | 9/2001 | Shinnaka | .................... | 318/701 |
| 2002/0113615 A1 * | 8/2002 | Atarashi | .................... | 324/772 |
| 2004/0070360 A1 | 4/2004 | E. Schulz et al. | | |
| 2007/0119634 A1 * | 5/2007 | Egami et al. | ................. | 180/2.2 |
| 2007/0194763 A1 * | 8/2007 | Egami et al. | .................... | 322/59 |

(Continued)

FOREIGN PATENT DOCUMENTS

EP  1107446 A2  6/2001

(Continued)

OTHER PUBLICATIONS

"Position and Speed Sensorless Control for IPMSM Based on Estimation of Position Error", Sigeo Morimoto et al., T.IEE Japan, vol. 122-D, No. 7, 2002, pp. 722-729, published in 2002.

(Continued)

*Primary Examiner*—Paul Ip
(74) *Attorney, Agent, or Firm*—NDQ&M Watchstone LLP

(57) ABSTRACT

Let the rotating axis whose direction coincides with the direction of the current vector that achieves maximum torque control be called the qm-axis, and the rotating axis perpendicular to the qm-axis be called the dm-axis. A motor control device switches its operation between low-speed sensorless control and high-speed sensorless control according to the rotation speed of the rotor. In low-speed sensorless control, the magnetic salient pole of the motor is exploited, and the d-q axes are estimated by, for example, injection of a high-frequency rotating voltage. In high-speed sensorless control, the dm-qm axes are estimated based on, for example, the induction voltage produced by the rotation of the rotor. During high-speed sensorless control, the γ(dm)-axis current is kept at zero irrespective of the δ(qm)-axis current.

9 Claims, 23 Drawing Sheets

U.S. PATENT DOCUMENTS

2007/0241703 A1 * 10/2007 Yamada et al. .............. 318/254

FOREIGN PATENT DOCUMENTS

| EP | 1133050 | 9/2001 |
|---|---|---|
| JP | 10-094298 A | 4/1998 |
| JP | 11-018499 A | 1/1999 |
| JP | 2001-190099 A | 7/2001 |
| JP | 3411878 B2 | 6/2003 |
| WO | 0207297 | 1/2002 |
| WO | 2005099082 A1 | 10/2005 |

OTHER PUBLICATIONS

European Corresponding Application No. 07111099.3, Extended Examination Search Report, dated Sep. 9, 2009.

* cited by examiner $\Delta\theta = 0°$ $\Delta\theta \ne 0°$

MOTOR CONTROL DEVICE

This nonprovisional application claims priority under 35 U.S.C. §119(a) on Patent Application No. 2006-177989 filed in Japan on Jun. 28, 2006, the entire contents of which are hereby incorporated by reference.

BACKGROUND OF THE INVENTION

1. Field of the Invention

The present invention relates to a motor control device for controlling the operation of a motor. The present invention also relates to a motor drive system incorporating such a motor control device.

2. Description of Related Art

There have conventionally been developed motor control devices (position-sensorless control devices) that estimate the rotor position of a motor without the use of a rotor position sensor and controls the motor based on the so estimated rotor position. Sensorless control performed in such motor control devices divides into high-speed sensorless control suitable for a motor in high-speed rotation and low-speed sensorless control suitable for a motor in low-speed rotation or at a standstill.

High-speed sensorless control generally adopts a method relying on the induced voltage (in other words, electromotive force) that appears as the rotor rotates. With this method, however, it is difficult to accurately estimate the position and speed of the rotor in low-speed rotation or at a standstill. For this reason, with the rotor in low-speed rotation or at a standstill, low-speed sensorless control is used that relies on the magnetic salient pole and magnetic saturation of the rotor.

A motor control device is therefore often configured so as to be capable of switching among a plurality of control methods, including one for high-speed sensorless control and another for low-speed sensorless control, so as to be thereby able to achieve stable control in a wide range of speed. Such switching is performed, for example, according to the rotation speed of the rotor.

On the other hand, there has conventionally been disclosed a method whereby a phase generated by a phase determination method for a low-frequency region and a phase generated by a phase determination method for a high-frequency region are subjected to averaging with different weights given at different frequencies, and the resulting phase is estimated to be the phase in a d-q coordinate system.

Now, with reference to FIG. 37, common sensorless control (e.g., high-speed sensorless control) will be described.

FIG. 37 is a block diagram of a conventional motor control device 103. In the configuration shown in FIG. 37, the axes estimated, for control purposes, to correspond to the d-axis and q-axis assumed for vector control of a motor are shown as the γ-axis and δ-axis, respectively. FIG. 39 shows the relationship among the d-axis, q-axis, γ-axis, and δ-axis. In FIG. 39, the symbol $E_{ex}$ represents the voltage vector generally called the extension induction voltage (extended electromotive force).

A current detector 11 detects the U-phase current $i_u$ and V-phase current $i_v$ in the motor current supplied from a PWM inverter 2 to a salient-pole motor 1. A coordinate converter 12 converts the U-phase current $i_u$ and V-phase current $i_v$ into a γ-axis current $i_\gamma$ and a δ-axis current $i_\delta$. A position/speed estimator 120 (hereinafter referred to simply as "the estimator 120") estimates and outputs an estimated rotor position $\theta_e$ and an estimated motor speed $\omega_e$.

A subtracter 19 subtracts the estimated motor speed $\omega_e$ fed from the estimator 120 from a specified motor speed value $\omega^*$, and outputs the result of the subtraction. Based on the result $(\omega^* - \omega_e)$ of the subtraction by the subtracter 19 etc., a speed controller 17 creates a specified δ-axis current value $i_\delta^*$ to be followed by the δ-axis current $i_\delta$. Based on the specified δ-axis current value $i_\delta^*$ etc., a magnetic flux controller 116 outputs a specified γ-axis current value $i_\gamma^*$ to be followed by the γ-axis current $i_\gamma$. A current controller 15 outputs a specified γ-axis voltage value $v_\gamma^*$ and a specified δ-axis voltage value $v_\delta^*$ such that the current error $(i_\gamma^* - i_\gamma)$ and current error $(i_\delta^* - i_\delta)$ fed from subtracters 13 and 14 both converge to zero.

Based on the estimated rotor position $\theta_e$ fed from the estimator 120, a coordinate converter 18 performs reverse conversion of the specified γ-axis voltage value $v_\gamma^*$ and the specified δ-axis voltage value $v_\delta^*$ to create specified three-phase voltage values composed of a specified U-phase voltage value $v_u^*$, a specified V-phase voltage value $v_v^*$, and a specified W-phase voltage value $v_w^*$; the coordinate converter 18 feeds these to the PWM inverter 2. Based on these specified three-phase voltage values ($v_u^*$, $v_v^*$, and $v_w^*$), the PWM inverter 2 creates pulse-width-modulated signals, and supplies the motor 1 with a motor current commensurate with the specified three-phase voltage values to thereby drive the motor 1.

FIG. 38 shows the internal configuration of the estimator 120. The estimator 120 includes an axis error estimator 130, a proportional-plus-integral calculator 131, and an integrator 132. The axis error estimator 130 estimates the axis error $\Delta\theta$ between the d-axis and γ-axis. The axis error estimator 130 calculates the axis error $\Delta\theta$ according to, for example, formula (1) below. Here, $L_d$ and $L_q$ represent the d-axis inductance and q-axis inductance of the motor 1, and $R_a$ represents the motor resistance of the motor 1; s represents the Laplace operator. There have been proposed various methods for estimating the rotor position, of which many use, as an operation parameter, the value of the q-axis inductance of the motor in the estimation formula, as in formula (1) below.

$$\Delta\theta = \tan^{-1}\left(\frac{-E_{ex\gamma}}{E_{ex\delta}}\right) = \tan^{-1}\left(\frac{-(v_\gamma^* - (R_a + L_d s)i_\gamma + \omega_e L_q i_\delta)}{v_\delta^* - (R_a + L_d s)i_\delta - \omega_e L_q i_\gamma}\right) \quad (1)$$

Formula (1) above is a formula for calculating the axis error $\Delta\theta$. In formula (1), $E_{ex\gamma}$ and $E_{ex\delta}$ represent the γ-axis component and δ-axis component, respectively, of the extension induction voltage $E_{ex}$.

To achieve a PLL (phase-locked loop), the proportional-plus-integral calculator 131 cooperates with different parts of the motor control device 103 to perform proportional-plus-integral control, and thereby calculates the estimated motor speed $\omega_e$ such that the axis error $\Delta\theta$ calculated by the axis error estimator 130 converges to zero. The integrator 132 integrates the estimated motor speed $\omega_e$ outputted from the proportional-plus-integral calculator 131 to calculate the estimated rotor position $\theta_e$. The estimated motor speed $\omega_e$ outputted from the proportional-plus-integral calculator 131 and the estimated rotor position $\theta_e$ outputted from the integrator 132 are, as the output values of the estimator 120, fed to those parts of the motor control device 103 which require those values.

With the motor control device 103 configured as described above, the axis error $\Delta\theta$ between the d-axis and γ-axis converges to zero, and this allows stable motor control. Incidentally, while the axis error $\Delta\theta$ is kept equal to zero, the d-axis current $i_d$ follows the specified γ-axis current value $i_\gamma^*$, and the q-axis current $i_q$ follows the specified δ-axis current value $i_\delta^*$.

The formula for calculating the d-axis current $i_d$ to achieve maximum torque control exploiting a reluctance torque is well known. In the motor control device 103 configured as described above, to perform maximum torque control, the magnetic flux controller 116 calculates the specified γ-axis current value $i_\gamma^*$ according to formula (2) below. Here, $\Phi_a$ represents the armature flux linkage ascribable to the permanent magnet.

$$i_\gamma^* = \frac{\Phi_a}{2(L_q - L_d)} - \sqrt{\frac{\Phi_a^2}{4(L_q - L_d)^2} + i_\delta^{*2}} \qquad (2)$$

Maximum torque control according to formula (2) presupposes that the axis error Δθ is kept equal to zero. On the other hand, calculating the axis error Δθ according to formula (1) above requires, as a calculator parameter (motor parameter), the value of the q-axis inductance $L_q$. Accordingly, in general, to perform maximum torque control, the actual value of the q-axis inductance $L_q$ of the motor 1 is monitored and, by use of the actual value of the q-axis inductance $L_q$ as it is, the axis error Δθ (and hence the estimated rotor position $\theta_e$) is calculated.

Moreover, to achieve high-efficiency operation through maximum torque control or the like exploiting a reluctance torque, as will be understood from formula (2) above, a d-axis current $i_d$ commensurate with the q-axis current $i_q$ needs to be passed through the motor. Accordingly, to perform high-efficiency operation by use of the motor control device 103 shown in FIG. 37, the specified γ-axis current value $i_\gamma^*$ is calculated according to formula (2).

Moreover, the formula for calculating the specified γ-axis current value $i_\gamma^*$ for maximum torque control or the like contains a plurality of motor parameters whose true values are unknown, and thus, if there are errors between the motor parameters (calculation parameters) used to calculate the specified γ-axis current value $i_\gamma^*$ and the true motor parameters, it is impossible to perform motor control as desired. For this reason, in the motor control device 103 shown in FIG. 37, adjustments are made beforehand to minimize such errors.

There has conventionally been disclosed, also, the relationship between the errors in the calculation parameters used to estimate the rotor position and the error in the estimated position (axis error).

While the description thus far given with reference to FIGS. 37 to 39 deals with the operation of common sensorless control, conventional motor control devices that use a plurality of control methods switch among different control methods within a single coordinate system so that the rotation axes (d-q axes) to be estimated do not change between before and after a switch. From the perspective of easy adjustment of the operation parameters, reduction of calculation amount, or any other benefit, however, switching within a single coordinate system is not always be the optimum choice.

SUMMARY OF THE INVENTION

According to one aspect of the present invention, a motor control device is provided with: an estimator that estimates the rotor position of a motor; and a controller that controls the motor based on the estimated rotor position. Here, let two mutually perpendicular rotating axes that rotate as the rotor of the motor rotates be called the $x_1$-axis and the $y_1$-axis, let a rotating axis different from the $x_1$-axis be called the $x_2$-axis, and let the rotating axis perpendicular to the $x_2$-axis be called the $y_2$-axis, then the control performed by the controller can be switched between a first type of control by which, for the purpose of controlling the motor, the controller breaks down the motor current flowing through the motor into an $x_1$-axis component parallel to the $x_1$-axis and a $y_1$-axis component parallel to the $y_1$-axis, and a second type of control by which, for the purpose of controlling the motor, the controller breaks down the motor current into an $x_2$-axis component parallel to the $x_2$-axis and a $y_2$-axis component parallel to the $y_2$-axis.

Specifically, for example, the estimation processing performed by the estimator can be switched between a first type of estimation processing whereby the estimator makes the controller perform the first type of control and a second type of estimation processing whereby the estimator makes the controller perform the second type of control, and the estimation processing actually performed by the estimator is switched between the first and second types of estimation processing according to speed information representing the rotation speed of the rotor.

Specifically, for example, let the axis parallel to the magnetic flux produced by the permanent magnet forming the rotor be called the d-axis, let the axis leading the d-axis by the electrical angle of 90 degrees be called the q-axis, let the rotating axis whose direction coincides with the direction of the current vector that achieves maximum torque control, or a rotating axis further leading that rotating axis in phase, be called the qm-axis, and let the rotating axis perpendicular to the qm-axis be called the dm-axis, then the $x_1$-axis and the $y_1$-axis are the d-axis and the q-axis, respectively, or axes based on a given specified speed value, and the $x_2$-axis and the $y_2$-axis are the dm-axis and the qm-axis, respectively.

For example, when the estimation processing actually performed by the estimator is switched between the first and second types of estimation processing, a shift from one type of estimation processing to the other is made through estimation processing whereby the results of the first and second types of estimation processing are taken into consideration according to the speed information or according to the length of time that has passed since the start of the switching.

For example, the estimator is provided with: a first estimation processor that derives a value for estimating the phase of the $x_1$-axis relative to a predetermined fixed axis; and a second estimation processor that derives a value for estimating the phase of the $x_2$-axis relative to the fixed axis. Here, the phase of the $x_1$-axis estimated based on the value derived by the first estimation processor represents the rotor position as supposed to be estimated when the first type of estimation processing is performed, and the phase of the $x_2$-axis estimated based on the value derived by the second estimation processor represents the rotor position as supposed to be estimated when the second type of estimation processing is performed. Moreover, the second estimation processor can derive a value for estimating the phase of the $x_1$-axis by using a first predetermined inductance as a calculation parameter corresponding to a q-axis inductance of the motor and, when deriving the value for estimating the phase of the $x_2$-axis, uses, as the calculation parameter, a second predetermined inductance different from the first inductance. Furthermore, when the estimation processing actually performed by the estimator is switched from the first estimation processing to the second estimation processing, the calculation parameter used by the second estimation processor is temporarily made equal to the first inductance and is then made to vary toward the second inductance so as to eventually converge to the second inductance, and based on the value derived by the second estimation processor while the calculation parameter is so varying, the rotor position is estimated during the switching.

Alternatively, for example, the estimator is provided with: a first estimation processor that derives a value for estimating the phase of the $x_1$-axis relative to a predetermined fixed axis, and a second estimation processor that derives a value for estimating a phase of the $x_2$-axis relative to the fixed axis. Here, the phase of the $x_1$-axis estimated based on the value derived by the first estimation processor represents the rotor position as supposed to be estimated when the first type of estimation processing is performed, and the phase of the $x_2$-axis estimated based on the value derived by the second estimation processor represents the rotor position as supposed to be estimated when the second type of estimation processing is performed. Moreover, when the estimation processing actually performed by the estimator is switched from the first estimation processing to the second estimation processing, the first estimation processor can derive a value for temporarily estimating the phase of the $x_2$-axis. Furthermore, when the estimation processing actually performed by the estimator is switched from the first estimation processing to the second estimation processing, prior to the switching, the value derived by the first estimation processor is temporarily made to converge to the value derived by the second estimation processor for estimating the phase of the $x_2$-axis, and, after completion of the convergence, the switching from the first estimation processing to the second estimation processing is actually performed.

For example, let the axis parallel to the magnetic flux produced by the permanent magnet forming the rotor be called the d-axis, and let the axis estimated, for control purposes, as corresponding to the d-axis be called a γ-axis, then, when the control actually performed by the controller is switched between the first and second types of control, the specified γ-axis current value that should be followed by the γ-axis component of the motor current is switched between a specified current value for the first type of control and a specified current value for the second type of control.

For example, when the control actually performed by the controller is switched between the first and second types of control, the specified γ-axis current value is derived based on both the specified current values for the first and second types of control.

According to another aspect of the present invention, a motor drive system is provided with: a motor; an inverter that drives the motor; and any of the motor control devices described above which controls the motor by controlling the inverter.

DETAILED DESCRIPTION OF PREFERRED EMBODIMENTS

Hereinafter, embodiments of the present invention will be described specifically with reference to the accompanying drawings. Among these drawings, such parts as appear more than once are identified with common reference designations.

The switching among different control methods—the feature with which one of the main objects of the invention is achieved—will be dealt with in the second and following embodiments. To begin with, for easy understanding of the description of the second and following embodiments, a first embodiment of the invention will be described as a technology that the second embodiment presupposes.

First Embodiment

Figure 1:
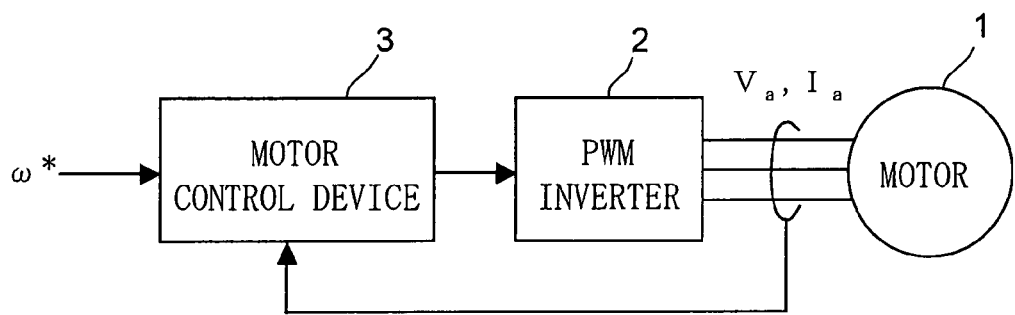
FIG. 1 is a block diagram showing an outline of the configuration of a motor drive system according to a first embodiment of the invention.

FIG. 1 is a block configuration diagram of a motor drive system according to a first embodiment of the invention. The reference numeral 1 represents a three-phase permanent-magnet synchronous motor 1 (hereinafter referred to simply as "the motor 1") that has a permanent magnet on a rotor (unillustrated) and that has an armature winding on a stator (unillustrated). The motor 1 is a salient-pole motor (a motor having a salient pole) as exemplified by an interior permanent magnet synchronous motor.

The reference numeral 2 represents a PWM (pulse-width modulation) inverter that supplies the motor 1 with three-phase alternating-current voltages of U-, V-, and W-phases according to the position of the rotor of the motor 1. The voltage supplied to the motor 1 is referred to as the motor voltage (armature voltage) $V_a$, and the current supplied from the PWM inverter 2 to the motor 1 is referred to as the motor current (armature current) $I_a$.

The reference numeral 3 represents a motor control device (position-sensorless control device) that estimates the rotor position etc. of the motor 1 by use of the motor current $I_a$ and that feeds the PWM inverter 2 with a signal for making the motor 1 rotate at the desired rotation speed. The desired rotation speed here is fed, as a specified motor speed value ω*, from an unillustrated CPU (central processing unit) or the like to the motor control device 3.

Figure 2:
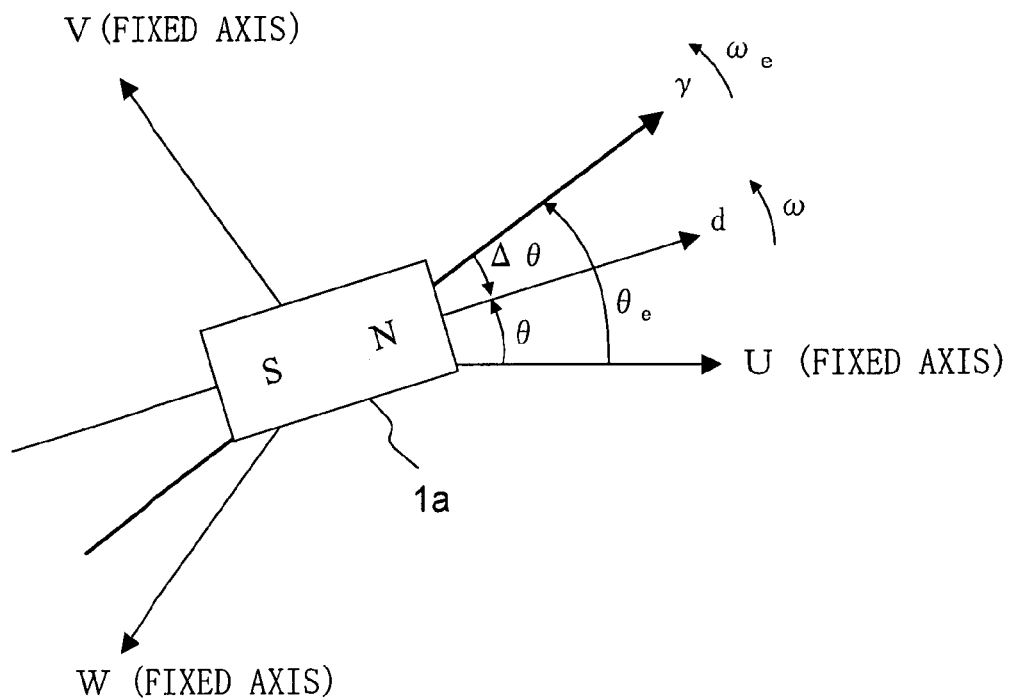
FIG. 2 is an analysis model diagram of the motor in the first embodiment of the invention.

FIG. 2 is an analysis model diagram of the motor 1. In the following description, "the armature winding" denotes the one provided in the motor 1. FIG. 2. shows the armature winding fixed axes of U-, V-, and W-phases. The reference numeral 1a represents the permanent magnet constituting the rotor of the motor 1. In a rotating coordinate system that rotates at the same speed as the magnetic flux produced by the permanent magnet 1a, the direction of the magnetic flux produced by the permanent magnet 1a is assumed to be the d-axis, and the axis estimated, for control purposes, to correspond to the d-axis is referred to as the γ-axis. Moreover, although not illustrated, the direction at a phase leading the d-axis by an electrical angle of 90 degrees is assumed to be the q-axis, and the axis estimated at a phase leading the γ-axis by an electrical angle of 90 degrees is referred to as the δ-axis. The rotating coordinate system that corresponds to the actual axes is the one having the d-axis and q-axis as its coordinate axes, and these coordinate axes are referred to as the d-q axes. The rotating coordinate system estimated for control purposes (the estimated rotating coordinate system) is the one having the γ-axis and δ-axis as its coordinate axes, and these coordinate axes are referred to as the γ-δ axes.

The d-q axes is rotating, and its rotation speed is called the actual motor speed ω. The γ-δ axes also is rotating, and its rotation speed is called the estimated motor speed $ω_e$. Moreover, with regard to the rotating d-q axes, the phase of the d-axis at a given moment is represented by θ (the actual rotor position θ) relative to the U-phase armature winding fixed axis. Likewise, with regard to the rotating γ-δ axes, the phase of the γ-axis at a given moment is represented by $θ_e$ (the estimated rotor position $θ_e$) relative to the U-phase armature winding fixed axis. Then, the axis error Δθ between the d-axis and the γ-axis (the axis error Δθ between the d-q axes and the γ-δ axes) is given by $Δθ=θ-θ_e$.

In the following description, the γ-axis component, δ-axis component, d-axis component, and q-axis component of the motor voltage $V_a$ are referred to as the γ-axis voltage $v_γ$, δ-axis voltage $v_δ$, d-axis voltage $v_d$, and q-axis voltage $v_q$, respectively, and the γ-axis component, δ-axis component, d-axis component, and q-axis component of the motor current $I_a$ are referred to as the γ-axis current $i_γ$, δ-axis current $i_δ$, d-axis current $i_d$, and q-axis current $i_q$, respectively.

Moreover, in the following description, $R_a$ represents the motor resistance (the resistance of the armature winding of the motor 1); $L_d$ and $L_q$ represent the d-axis inductance (the d-axis component of the inductance of the armature winding of the motor 1) and the q-axis inductance (the q-axis component of the inductance of the armature winding of the motor 1), respectively; and $Φ_a$ represents the armature flux linkage ascribable to the permanent magnet 1a. Incidentally, the values of $L_d$, $L_q$, $R_a$, and $Φ_a$ are determined at the stage of the fabrication of the motor drive system, and those values are used in the calculations performed by the motor control device. Moreover, in the relevant formulae presented below, s represents the Laplace operator.

Figure 3:
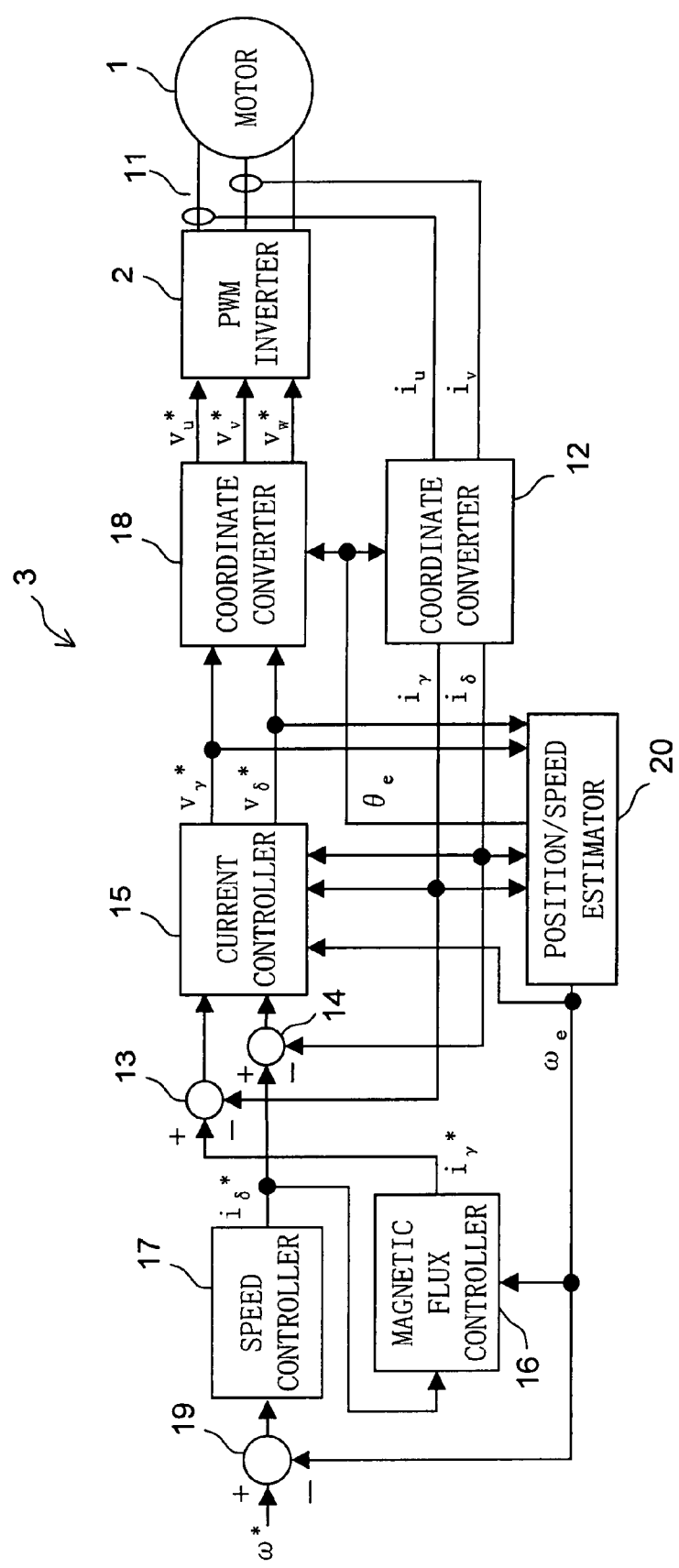
FIG. 3 is a configuration block diagram of the motor drive system shown in FIG. 1.

FIG. 3 is a configuration block diagram of the motor drive system, and shows the internal configuration of the motor control device 3 shown in FIG. 1. The motor control device 3 includes a current detector 11, a coordinate converter 12, a subtracter 13, a subtracter 14, a current controller 15, a magnetic flux controller 16, a speed controller 17, a coordinate converter 18, a subtracter 19, and a position/speed estimator 20 (hereinafter referred to simply as "the estimator 20").

These parts constituting the motor control device 3 can freely use, whenever necessary, any of the values generated within the motor control device 3.

The current detector 11 includes, for example, Hall devices or the like, and detects the U-phase current $i_u$ and V-phase current $i_v$, which are the fixed axis components of the motor current $I_a$ supplied from the PWM inverter 2 to the motor 1. Receiving the results of the detection of the U-phase current $i_u$ and V-phase current $i_v$ by the current detector 11, the coordinate converter 12 converts them into the γ-axis current $i_\gamma$ and δ-axis current $i_\delta$ by use of the estimated rotor position $\theta_e$ fed from the estimator 20. The conversion here is performed according to formula (3) below.

$$\begin{bmatrix} i_\gamma \\ i_\delta \end{bmatrix} = \sqrt{2}\begin{bmatrix} \sin(\theta_e + \pi/3) & \sin\theta_e \\ \cos(\theta_e + \pi/3) & \cos\theta_e \end{bmatrix}\begin{bmatrix} i_u \\ i_v \end{bmatrix} \quad (3)$$

The estimator 20 estimates and outputs the estimated rotor position $\theta_e$ and the estimated motor speed $\omega_e$. The method by which the estimated rotor position $\theta_e$ and the estimated motor speed $\omega_e$ are estimated will be described in detail later.

The subtracter 19 subtracts the estimated motor speed $\omega_e$ fed from the estimator 20 from the specified motor speed value $\omega^*$, and outputs the result of the subtraction (the speed error). Based on the result ($\omega^* - \omega_e$) of the subtraction by the subtracter 19, the speed controller 17 creates a specified δ-axis current value $i_\delta^*$. This specified δ-axis current value $i_\delta^*$ represents the current value to be followed by the δ-axis current $i_\delta$, which is the δ-axis component of the motor current $I_a$. The magnetic flux controller 16 outputs a specified γ-axis current value $i_\gamma^*$. This specified γ-axis current value $i_\gamma^*$ represents the current value to be followed by the γ-axis current $i_\gamma$, which is the γ-axis component of the motor current $I_a$. In this embodiment, the specified γ-axis current value $i_\gamma^*$ is kept equal to zero, as will be described in detail later in connection with the estimator 20.

The subtracter 13 subtracts the γ-axis current $i_\gamma$ outputted from the coordinate converter 12 from the specified γ-axis current value $i_\gamma^*$ outputted from the magnetic flux controller 16, and thereby calculates the current error ($i_\gamma^* - i_\gamma$). The subtracter 14 subtracts the δ-axis current $i_\delta$ outputted from the coordinate converter 12 from the specified δ-axis current value $i_\delta^*$ outputted from the speed controller 17, and thereby calculates the current error ($i_\delta^* - i_\delta$).

Receiving the current errors calculated by the subtracters 13 and 14, the γ-axis current $i_\gamma$ and δ-axis current $i_\delta$ from the coordinate converter 12, and the estimated motor speed $\omega_e$ from the estimator 20, the current controller 15 outputs a specified γ-axis voltage value $v_\gamma^*$ and a specified δ-axis voltage value $v_\delta^*$ such that the γ-axis current $i_\gamma$ follows the specified γ-axis current value $i_\gamma^*$ and in addition that the δ-axis current $i_\delta$ follows the specified δ-axis current value $i_\delta^*$.

Based on the estimated rotor position $\theta_e$ fed from the estimator 20, the coordinate converter 18 performs reverse conversion of the specified γ-axis voltage value $v_\gamma^*$ and the specified δ-axis voltage value $v_\delta^*$ to create specified three-phase voltage values composed of a specified U-phase voltage value $v_u^*$, a specified V-phase voltage value $v_v^*$, and a specified W-phase voltage value $v_w^*$, which represent the U-, V-, and W-phase components of the motor voltage $V_a$; the coordinate converter 18 feeds these to the PWM inverter 2. The reverse conversion here is performed according to formula (4) below, which consists of two equations.

$$\begin{bmatrix} v_u^* \\ v_v^* \end{bmatrix} = \sqrt{\frac{2}{3}}\begin{bmatrix} \cos\theta_e & -\sin\theta_e \\ \cos(\theta_e - 2\pi/3) & -\sin(\theta_e - 2\pi/3) \end{bmatrix}\begin{bmatrix} v_\gamma^* \\ v_\delta^* \end{bmatrix} \quad (4)$$

$$v_w^* = -(v_u^* + v_v^*)$$

Based on the specified three-phase voltage values ($v_u^*$, $v_v^*$, and $v_w^*$), which represent the voltages to be applied to the motor 1, the PWM inverter 2 creates pulse-width-modulated signals, and supplies the motor 1 with a motor current $I_a$ commensurate with the specified three-phase voltage values to thereby drive the motor 1.

Figure 4:
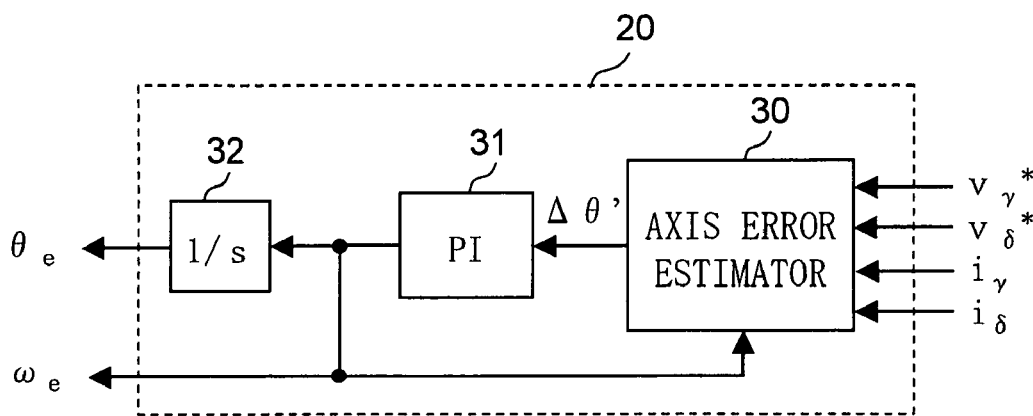
FIG. 4 is an internal block diagram of the position/speed estimator shown in FIG. 3.

FIG. 4 shows an example of the internal configuration of the estimator 20. The estimator 20 shown in FIG. 4 includes an axis error estimator 30, a proportional-plus-integral calculator 31, and an integrator 32.

Figure 38:
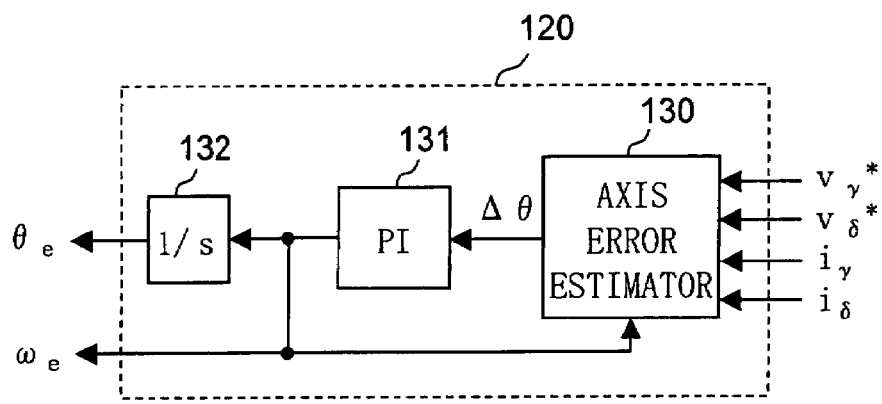
FIG. 38 is an internal block diagram of the position/speed estimator shown in FIG. 37.
Figure 39:
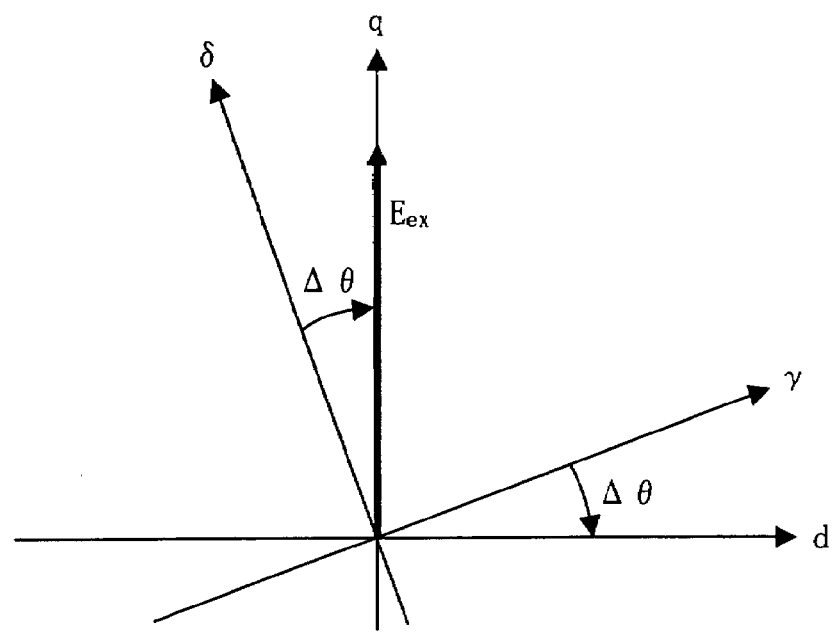
FIG. 39 is a vector diagram illustrating the operation of the motor shown in FIG. 37.

The axis error estimator 30 calculates an axis error $\Delta\theta'$. As will become clear later, this axis error $\Delta\theta'$ is different from the axis error $\Delta\theta$. Whereas the axis error estimator 130 shown in FIG. 38 calculates the axis error $\Delta\theta$ according to formula (1) above, the axis error estimator 30 shown in FIG. 4 calculates the axis error $\Delta\theta'$ according to formula (5) below.

$$\Delta\theta' = \tan^{-1}\left(\frac{-(v_\gamma^* - (R_a + L_d s)i_\gamma + \omega_e L i_\delta)}{v_\delta^* - (R_a + L_d s)i_\delta - \omega_e L i_\gamma}\right) \quad (5)$$

Formula (5) is obtained by replacing $\Delta\theta$ and $L_q$ in formula (1) above with $\Delta\theta'$ and L, respectively. Thus, when estimating the axis error $\Delta\theta'$, the axis error estimator 30 handles L as, among calculation parameters for estimating the rotor position, one corresponding to the q-axis inductance. The method by which the value of this calculation parameter L is set, and the significance of the axis error $\Delta\theta'$ in relation to that method, will be described in detail later.

To achieve a PLL (phase-locked loop), the proportional-plus-integral calculator 31 cooperates with different parts of the motor control device 3 to perform proportional-plus-integral control, and thereby calculates the estimated motor speed $\omega_e$ such that the axis error $\Delta\theta'$ calculated by the axis error estimator 30 converges to zero. The integrator 32 integrates the estimated motor speed $\omega_e$ outputted from the proportional-plus-integral calculator 31 to calculate the estimated rotor position $\theta_e$. The estimated motor speed $\omega_e$ outputted from the proportional-plus-integral calculator 31 and the estimated rotor position $\theta_e$ outputted from the integrator 32 are, as the output values of the estimator 20, fed to those parts of the motor control device 3 which require those values.

Figure 37:
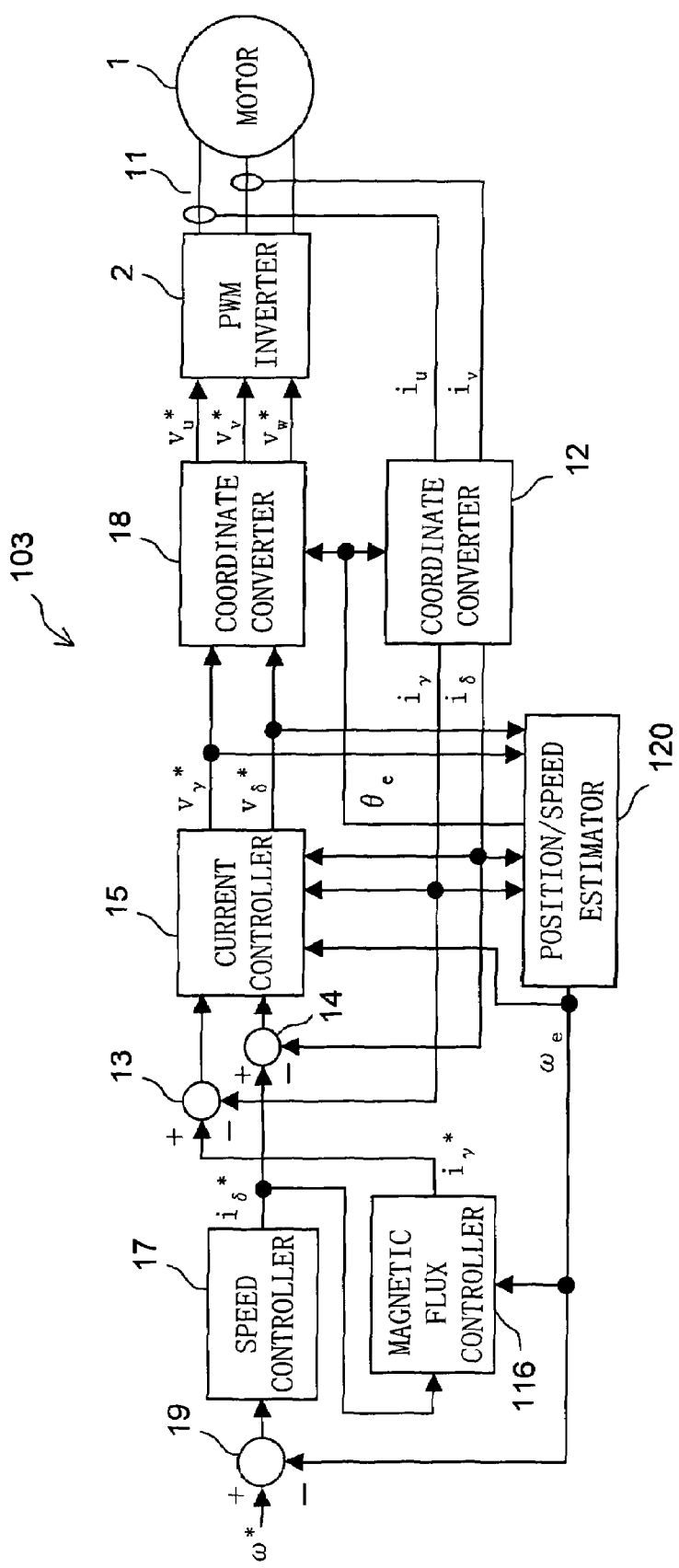
FIG. 37 is a configuration block diagram of a conventional motor control device.

If the true value (actual value) of the q-axis inductance is used as L in formula (5), that is, if $L = L_q$, then $\Delta\theta' = \Delta\theta$, and thus the PLL control by the proportional-plus-integral calculator 31 etc. makes the axis error $\Delta\theta'(=\Delta\theta)$ converge to zero (i.e., the same control as achieved with the configuration shown in FIG. 37). According to a feature characteristic to this embodiment, however, the calculation parameter L is set so as to fulfill formula (6) below. Specifically, a value intermediate between the actual q-axis inductance (i.e., $L_q$) and the actual d-axis inductance (i.e., $L_d$) of the motor 1 is adopted as an operation parameter corresponding to the q-axis inductance, and then the axis error is calculated. Here, needless to say, $L_d < L_q$ holds.

$$L_d \leq L < L_q \quad (6)$$

Preferably, the calculation parameter L is set so as to fulfill formula (7) below.

$$L_d \leq L < (L_d + L_q)/2 \tag{7}$$

Quite naturally, the axis error $\Delta\theta'$ obtained when L set as described above is adopted as the calculation parameter corresponding to the q-axis inductance differs from the axis error $\Delta\theta$. Thus, even when PLL control is performed such that the axis error $\Delta\theta'$ converges to zero, a deviation (a non-zero axis error) arises between the d-axis and $\gamma$-axis.

In this embodiment, this deviation is produced intentionally, and is exploited positively while the specified $\gamma$-axis current value $i_\gamma^*$ outputted from the magnetic flux controller 16 is made equal to zero. In this way, control approximate to maximum torque control is achieved. Now, this control will be discussed.

First, as disclosed in "Position and Speed Sensorless Control for IPMSM Based on Estimation of Position Error", Sigeo Morimoto et al., T.IEE Japan, Vol. 122-D, No. 7, 2002, pp. 722-729 (hereinafter referred to as "Non-patent Document 1"), the relationship between the errors in the calculation parameters used to estimate the rotor position (i.e., to calculate the estimated rotor position $\theta_e$) and the error in the estimated position (axis error) is expressed by formula (8) below. Here, $R_a'$ represents the value of the motor resistance as a calculation parameter used in the formula for estimating the rotor position, and $(R_a - R_a')$ represents the error of this calculation parameter from the true motor resistance $R_a$; $L_q'$ represents the value of the q-axis inductance as a calculation parameter used in the formula for estimating the rotor position, and $(L_q - L_q')$ represents the error of this calculation parameter from the true q-axis inductance.

$$\frac{R_a - R_a'}{\omega} i_\gamma - (L_q - L_q') i_\delta = \sin\Delta\theta \{\Phi_a + (L_d - L_q)(i_\gamma \cos\Delta\theta + i_\delta \sin\Delta\theta)\} \tag{8}$$

Now, suppose that $L_q'=L$; that is, suppose that, when the rotor position is estimated, an error corresponding to $(L_q-L)$ is given intentionally. Estimating the axis error $\Delta\theta'$ according to formula (5) above is equivalent to estimating the axis error with an error corresponding to $(L_q-L)$ given intentionally. Moreover, assume that $(R_a-R_a')$ is equal to zero. Furthermore, consider a case where, as mentioned above, the specified $\gamma$-axis current value $i_\gamma^*$ to be followed by the $\gamma$-axis current $i_\gamma$ is made equal to zero; that is, assume that, in formula (8), $i_\gamma=0$. Then, formula (8) is rearranged into formula (9) below.

$$\frac{i_d}{\sqrt{i_d^2 + i_q^2}} \{\Phi_a + (L_d - L_q) i_d\} + (L_q - L) \sqrt{i_d^2 + i_q^2} = 0 \tag{9}$$

Substituting formula (10), which gives the d-axis current $i_d$ that achieves maximum torque control, in formula (9), and solving the resulting formula with respect to L gives formula (11) below. Incidentally, formula (10) is well known, and supplying the motor 1 with a d-axis current $i_d$ fulfilling formula (10) according to q-axis current $i_q$ achieves maximum torque control.

$$i_d = \frac{\Phi_a}{2(L_q - L_d)} - \sqrt{\frac{\Phi_a^2}{4(L_q - L_d)^2} + i_q^2} \tag{10}$$

$$L = L_q + \frac{-2(L_q - L_d)^3 i_q^2}{\Phi_a^2 - \Phi_a \sqrt{\Phi_a^2 + 4(L_d - L_q)^2 i_q^2 + 4(L_d - L_q)^2 i_q^2}} \tag{11}$$

As will be clear from how formula (11) is derived, L given by formula (11) represents the value of the q-axis inductance as a calculation parameter to be adopted by the axis deviation estimator 30 to achieve maximum torque control in an ideal fashion in a case where the specified $\gamma$-axis current value $i_\gamma^*$ is made equal to zero.

Figure 5:
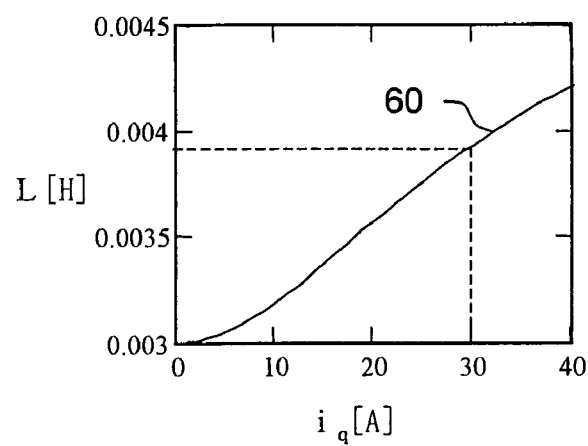
FIG. 5 is a diagram showing the relationship between the q-axis current that achieves maximum torque control and the q-axis inductance as a calculation parameter, as observed in the condition that makes the γ-axis current equal to zero.

L given by formula (11) is a function of the q-axis current $i_q$. To make the description specific, the following description deals with a numerical example where $\Phi_a=0.2411$ Vs/rad, $L_d=0.003$ H, and $L_q=0.008$ H. The relationship between $i_q$ and L in this case is represented by a curve 60 in FIG. 5. In a case where the specified $\gamma$-axis current value $i_\gamma^*$ is made equal to zero, the value of L that achieves maximum torque control is largely in the range of 0.003 H to 0.0042 H when 1 A$\leq i_q \leq$40 A. That is, in a case where the specified $\gamma$-axis current value $i_\gamma^*$ is made equal to zero, the value of L that achieves maximum torque control falls notably closer to $L_d$ (in the case under discussion, 0.003 H) than to $L_q$ (in the case under discussion, 0.008 H).

Figure 6:
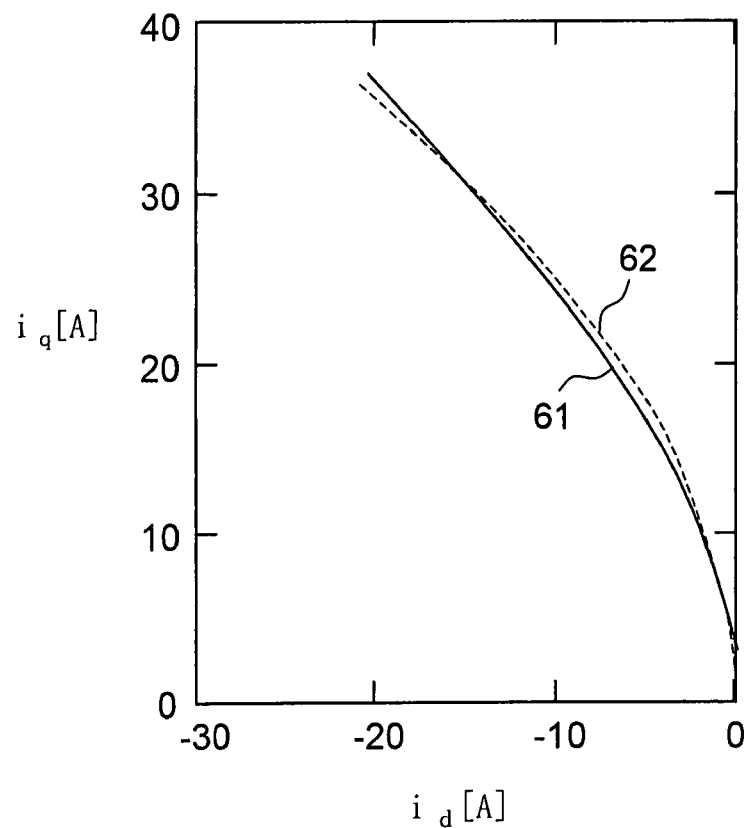
FIG. 6 is a diagram showing a comparison between ideal maximum torque control and the control in the motor drive system shown in FIG. 1.

In view of what has just been described, in this embodiment, a calculation parameter L that fulfills formula (6) or (7) above is adopted, and in addition specified $\gamma$-axis current value $i_\gamma^*$ is made equal to zero, to achieve control close to maximum torque control. For example, in the numerical example described above, the relationship between the d-axis current $i_d$ and q-axis current $i_q$ flowing through the motor 1 when the calculation parameter L is kept fixed at 0.0039 H irrespective of $i_q$ is as represented by a broken line 62 in FIG. 6. The solid line 61 there represents the relationship between the d-axis current $i_d$ and q-axis current $i_q$ as observed in a case where maximum torque control is performed in an ideal fashion. FIG. 6 shows that the broken line 62 and the solid line 61 describe very similar curves.

The reason that a d-axis current $i_d$ commensurate with the q-axis current $i_q$ flows despite the specified $\gamma$-axis current value $i_\gamma^*$ being equal to zero is that there is a deviation between the d-axis and $\gamma$-axis resulting from the adoption, as a calculation parameter corresponding to the q-axis inductance, of the calculation parameter L that fulfills formula (6) or (7). Incidentally, in the curve 60 shown in FIG. 5, when $i_q=30$ A, L=0.0039 H; thus, quite naturally, the solid line 61 and the broken line 62 in crosses each other at $i_q=30$ A.

To make the description specific, the description thus far given deals with an example where the specified $\gamma$-axis current value $i_\gamma^*$ is made equal to zero. Here, however, the specified $\gamma$-axis current value $i_\gamma^*$ does not necessarily have to be exactly equal to zero, but simply needs to be close to zero (i.e., $i_\gamma^* \approx 0$). In other words, whenever "zero" is mentioned in the discussion of the specified $\gamma$-axis current value $i_\gamma^*$, it should be interpreted to mean "substantially zero" covering a certain range around zero. This is because, even if $i_\gamma^*$ is not exactly equal to zero, when it has a value that can be considered to be substantially zero, it is possible to achieve control close to maximum torque control.

Figure 7:
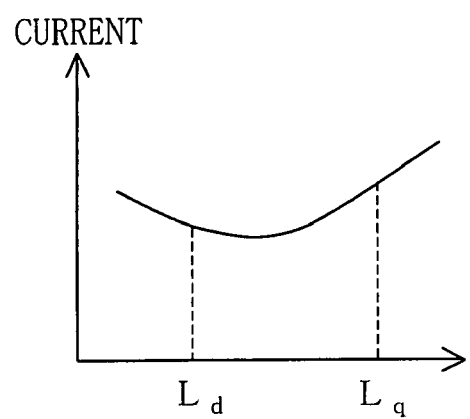
FIG. 7 is a diagram showing the relationship between the q-axis inductance as an operation parameter and the motor current, as observed in the conditions that makes the γ-axis current equal to zero.

To achieve control approximate to maximum torque control as described above, the value of the calculation parameter L is set within the range that fulfills formula (6) or (7) above. Specifically, the specified $\gamma$-axis current value $i_\gamma^*$ is set at a predetermined value equal or close to zero, and thereby the $\gamma$-axis current $i_\gamma$ is set approximately equal to that predetermined value, so that the motor 1 is given a predetermined load torque. Then, in this state, the value of the calculation parameter L is set within the range that fulfills formula (6) or (7) above such that the magnitude of the motor current $I_a$ is at its minimum. As shown in FIG. 7, the value of L that puts the magnitude of the motor current $I_a$ at its minimum when $i_\gamma^* \approx 0$ falls between $L_d$ and $L_q$, and, when L has that value, it fulfills formula (7) above irrespective of the values of $\Phi_a$, $L_d$, and $L_q$.

When L is thus given the value that puts the magnitude of the motor current $I_a$ at its minimum when $i_\gamma^* \approx 0$, at that predetermined load torque, L serves as a calculation parameter that achieves maximum torque control in an ideal fashion. Incidentally, such a value of the calculation parameter L is searched for and determined at the stage of designing.

As described above, setting the value of the q-axis inductance as a calculation parameter for estimating the rotor position appropriately beforehand eliminates the need to constantly calculate the specified γ-axis current value $i_\gamma^*$, and makes it possible to achieve control close to maximum torque control simply by making $i_\gamma^* \approx 0$. Thus, first of all, the amount of calculation needed to achieve maximum torque control can be reduced. Moreover, whereas conventional examples like the one shown in FIGS. 37 and 38 require both adjustment of calculation parameters for estimating the rotor position and adjustment of calculation parameters for achieving maximum torque control, this embodiment only requires adjustment of the calculation parameter L for estimating the rotor position to achieve control close to maximum torque control. Thus, second, the time required for adjustment can be reduced greatly, leading to higher efficiency in terms of use of time.

Although the above description deals with an example where the calculation parameter L is kept at a fixed value (in the above example, L=0.0039 H) irrespective of the value of the q-axis current $i_q$, it is also possible, instead, to vary the calculation parameter L according to the value of the q-axis current $i_q$ (according to the value of the specified δ-axis current value $i_\delta^*$). For example, by varying the calculation parameter L according to the value of the q-axis current $i_q$ (according to the value of the specified δ-axis current value $i_\delta^*$) such that it traces the curve 60 in FIG. 5, even with $i_\gamma^* \approx 0$, it is possible to achieve maximum torque control in an ideal fashion (in this case, the solid line 61 and the broken line 62 in FIG. 6 completely overlap). Incidentally, how the calculation parameter L is varied according to the value of the q-axis current $i_q$ (according to the value of the specified δ-axis current value $i_\delta^*$) is studied beforehand at the stage of designing.

Although the above description deals with a method for achieving maximum torque control or control approximate to maximum torque control, it is also possible, depending on the method by which the calculation parameter L is set, to perform another type of control exploiting a reluctance torque.

For example, the specified δ-axis current value $i_\gamma^*$ is set at a predetermined value equal or close to zero, and thereby the γ-axis current $i_\gamma$ is set approximately equal to that predetermined value, so that the motor 1 is put into a predetermined load condition. Then, in this state, the value of the calculation parameter L is set within the range that fulfills formula (6) or (7) above such that the loss (copper loss and iron loss) in the motor 1 is at its minimum. As in maximum torque control, the value of L that puts the loss at its minimum when $i_\gamma^* \approx 0$ falls between $L_d$ and $L_q$, and, when L has that value, it fulfills formula (7) above irrespective of the values of $\Phi_a$, $L_d$, and $L_q$.

When L is thus given the value that puts the loss at its minimum when $i_\gamma^* \approx 0$, in that predetermined load condition, L serves as a calculation parameter that achieves maximum efficiency control. Incidentally, such a value of the calculation parameter L is searched for and determined at the stage of designing. The above "predetermined load condition" is, for example, one in which the motor 1 is rotated at a predetermined rotation speed, or one in which the motor 1 is given a predetermined load torque.

The current controller 15 performs the necessary calculations according to formulae (12a) and (12b) below, which consist of two equations. The speed controller 17 and the proportional-plus-integral calculator 31 perform the necessary calculations according to formulae (13) and (14) below, respectively.

$$v_\gamma^* = \left(K_{cp} + \frac{K_{ci}}{s}\right)(i_\gamma^* - i_\gamma) - \omega_e L_q i_\delta \tag{12a}$$

$$v_\delta^* = \left(K_{cp} + \frac{K_{ci}}{s}\right)(i_\delta^* - i_\delta) + \omega_e (L_d i_\gamma + \Phi_a) \tag{12b}$$

$$i_\delta^* = (K_{sp} + K_{is}/s) \cdot (\omega^* - \omega_e) \tag{13}$$

$$\omega_e = (K_p + K_i/s) \cdot \Delta\theta' \tag{14}$$

Here, $K_{cp}$, $K_{sp}$ and $K_p$ are coefficients of proportionality, and $K_{ci}$, $K_{si}$, and $K_i$ are coefficients of integration. These all have values set beforehand at the stage of the designing of the motor drive system.

Estimator: The method by which the estimator 20 has been described to estimate the rotor position is merely one example among various estimation methods that can be adopted. Any estimation method can be adopted that estimates the rotor position (i.e., calculates the estimated rotor position $\theta_e$) by use of a calculation parameter corresponding to the q-axis inductance of the motor 1.

For example, the rotor position may be estimated by use of the method disclosed in Non-patent Document 1 mentioned above. According to Non-patent Document 1, the axis error $\Delta\theta$ is calculated according to formula (15) below. Considered in terms of the designations and symbols used in the description of this embodiment, $e_\gamma$ and $e_\delta$ represent the γ-axis component and δ-axis component, respectively, of the induction voltage (in other words, electromotive force) produced by the rotation of the motor 1 and the armature flux linkage $\Phi_a$ ascribable to the permanent magnet 1a. Moreover, s represents the Laplace operator, and g represents the gain of a disturbance observer.

$$\Delta\theta = \tan^{-1}\left(\frac{-e_\gamma}{e_\delta}\right) \tag{15}$$

$$= \tan^{-1} \frac{-\frac{g}{s+g}(v_\gamma + \omega_e L_q i_\delta - (L_d s + R_a)i_\gamma)}{\frac{g}{s+g}(v_\delta - \omega_e L_q i_\gamma - (L_d s + R_a)i_\delta)}$$

In a case where a method that estimates the axis error from the induction voltage as expressed by formula (15) is applied to the axis error estimator 30 shown in FIG. 4, the axis error estimator 30 can calculate the axis error $\Delta\theta'$ according to formula (16) below. Formula (16) is obtained by replacing $\Delta\theta$ and $L_q$ in formula (15) above with $\Delta\theta'$ and L, respectively. Then, as in the configuration shown in FIG. 4, the proportional-plus-integral calculator 31 calculates the estimated motor speed $\omega_e$ and the integrator 32 calculates the estimated rotor position $\theta_e$ such that the axis error $\Delta\theta'$ converges to zero. This produces a deviation between the d-axis and γ-axis.

$$\Delta\theta' = \tan^{-1}\left(\frac{-e_\gamma}{e_\delta}\right) \quad (16)$$

$$= \tan^{-1}\frac{-\dfrac{g}{s+g}(v_\gamma + \omega_e L i_\delta - (L_d s + R_a)i_\gamma)}{\dfrac{g}{s+g}(v_\delta - \omega_e L i_\gamma - (L_d s + R_a)i_\delta)}$$

Alternatively, the rotor position may be estimated by use of any other method, such as the one disclosed in JP-A-2004-096979.

Instead of the configuration shown in FIG. 4, a configuration may be adopted that estimates the axis error (rotor position) from the flux linkage that produces the induction voltage. Now, a description will be given of this method. To begin with, the extension induction voltage equation on the real axes is generally given as formula (17) below. The term $E_{ex}$ in formula (17) is given by formula (18), and is called the extension induction voltage (extended electromotive force). In the following formulae, p represents the differential operator.

$$\begin{bmatrix} v_d \\ v_q \end{bmatrix} = \begin{bmatrix} R_a + pL_d & -\omega L_q \\ \omega L_q & R_a + pL_d \end{bmatrix}\begin{bmatrix} i_d \\ i_q \end{bmatrix} + \begin{bmatrix} 0 \\ E_{ex} \end{bmatrix} \quad (17)$$

$$E_{ex} = \omega((L_d - L_q)i_d + \Phi_a) - (L_d - L_q)(p\, i_q) \quad (18)$$

Performing coordinate conversion such that formula (17) on the real axes is converted to one on the control axes gives formula (19) below.

$$\begin{bmatrix} v_\gamma \\ v_\delta \end{bmatrix} = \begin{bmatrix} R_a + pL_d & -\omega L_q \\ \omega L_q & R_a + pL_d \end{bmatrix}\begin{bmatrix} i_\gamma \\ i_\delta \end{bmatrix} + E_{ex}\begin{bmatrix} -\sin\Delta\theta \\ \cos\Delta\theta \end{bmatrix} + (\omega_e - \omega)L_d\begin{bmatrix} -i_\delta \\ i_\gamma \end{bmatrix} \quad (19)$$

On the other hand, the magnetic flux calculated with the transient term (the second term of the right side) of formula (18)—which expresses the extension induction voltage $E_{ex}$—ignored is defined as the extension magnetic flux $\Phi_{ex}$, which is thus given by formula (20) below.

$$\Phi_{ex} = (L_d - L_q)i_d + \Phi_a \quad (20)$$

When the motor speed and (or) the load are fixed, variations in the magnitude and phase of the motor current are very small. Thus, the second term of the right side of formula (18), which is a differential term of the q-axis current, is sufficiently smaller than $\omega\Phi_{ex}$, and can be regarded as zero. Moreover, so long as the motor 1 is being driven without synchronization failure, the actual motor speed ω and the estimated motor speed $\omega_e$ have mutually close values. Thus, the third term of the right side of formula (19) also is sufficiently smaller than $\omega\Phi_{ex}$, and can be regarded as zero. Accordingly, when the second term of the right side of formula (18) and the third term of the right side of formula (19) are formula (19) is rearranged as formula (21) below.

$$\begin{bmatrix} v_\gamma \\ v_\delta \end{bmatrix} = \begin{bmatrix} R_a + pL_d & -\omega L_q \\ \omega L_q & R_a + pL_d \end{bmatrix}\begin{bmatrix} i_\gamma \\ i_\delta \end{bmatrix} + E_{ex}\begin{bmatrix} -\sin\Delta\theta \\ \cos\Delta\theta \end{bmatrix} \quad (21)$$

-continued $$= \begin{bmatrix} R_a + pL_d & -\omega L_q \\ \omega L_q & R_a + pL_d \end{bmatrix}\begin{bmatrix} i_\gamma \\ i_\delta \end{bmatrix} + \omega\Phi_{ex}\begin{bmatrix} -\sin\Delta\theta \\ \cos\Delta\theta \end{bmatrix}$$

Figure 8:
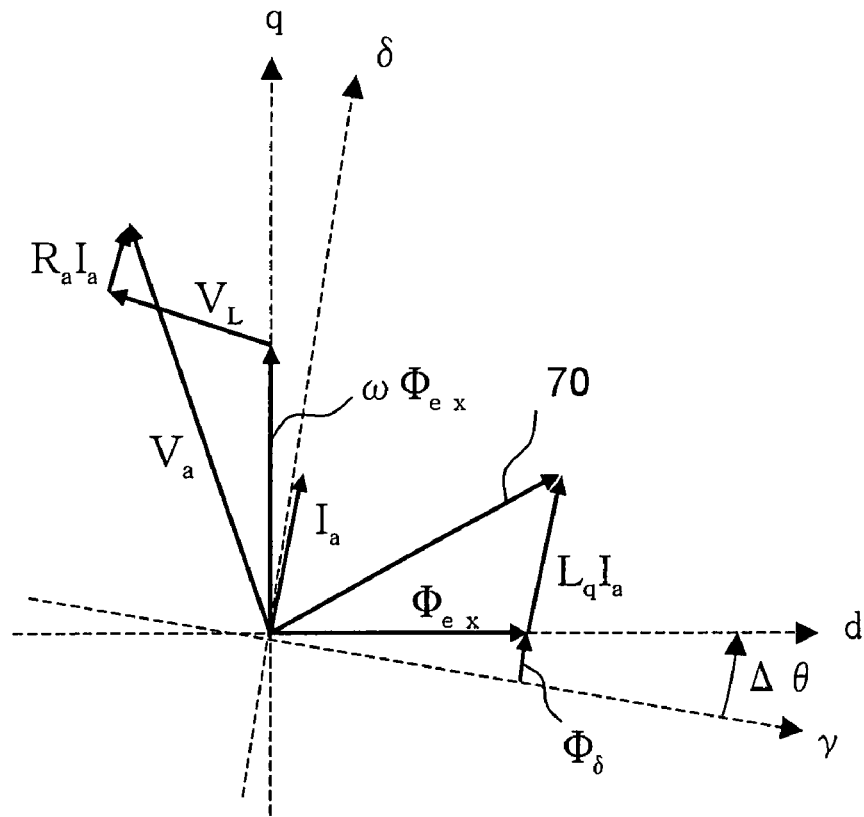
FIG. 8 is a vector diagram illustrating the operation of the motor shown in FIG. 1.

FIG. 8 is a vector diagram showing the relationship among the voltages at different parts in the motor 1 etc. The motor voltage $V_a$ is given as the sum of the extension induction voltage $E_{ex} = \omega\Phi_{ex}$, the voltage drop vector $R_a \cdot I_a$ across the motor resistance $R_a$, and the voltage drop vector $V_L$ across the inductance of the armature winding. Since the extension magnetic flux $\Phi_{ex}$ is the sum of the magnetic flux $\Phi_a$ produced by the permanent magnet and the magnetic flux $(L_d - L_q)\, i_d$ produced by the d-axis current, the direction of the vector coincides with that of the d-axis. The vector represented by $L_q \cdot I_a$ is the vector of the magnetic flux produced by the q-axis inductance and the motor current $I_a$, and the reference numeral 70 represents the composite magnetic flux vector of $\Phi_{ex}$ and $L_q \cdot I_a$.

The symbol $\Phi_\delta$ represents the δ-axis component of the extension magnetic flux $\Phi_{ex}$. Thus, $\Phi_\delta = \Phi_{ex} \cdot \sin\Delta\theta$ holds. Unfolding and rearranging the first row of the matrix in formula (21) above gives formula (22) below.

$$\Phi_{ex}\sin\Delta\theta = -\left(\frac{v_\gamma - (L_d s + R_a)i_\gamma}{\omega} + L_q i_\delta\right) \quad (22)$$

Generally, the magnetic flux produced by the permanent magnet is sufficiently larger than that produced by the d-axis current, that is, $\Phi_a \gg (L_d - L_q)\, i_d$ produced. Thus, $\Phi_{ex}$ can be regarded as fixed, that is, $\Phi_{ex} \approx \Phi_a$. If, in addition, the axis error $\Delta\theta$ is so small as to permit the approximation $\sin\Delta\theta \approx \Delta\theta$, then, with reference to formula (22), formula (23) below holds.

$$\Phi_\delta = \Phi_{ex}\sin\Delta\theta \quad (23)$$
$$= -\left(\frac{v_\gamma - (L_d s + R_a)i_\gamma}{\omega} + L_q i_\delta\right)$$
$$\approx \Phi_a \sin\Delta\theta$$
$$\approx \Phi_a \Delta\theta$$

As will be understood from formula (23), $\Phi_\delta$ is approximated as equal to the δ-axis component of the armature flux linkage $\Phi_a$ (the δ-axis magnetic flux, which is the magnetic flux component of the permanent magnet 1a (FIG. 2) parallel to the δ-axis). That is, an approximation is made such that $\Phi_\delta \approx$ (a fixed value)$\times \Delta\theta$. Thus, also by performing control such that $\Phi_\delta$ converges to zero, it is possible to make the axis error $\Delta\theta$ converge to zero. That is, it is possible to estimate the rotor position and the motor speed based on $\Phi_\delta$.

Figure 9:
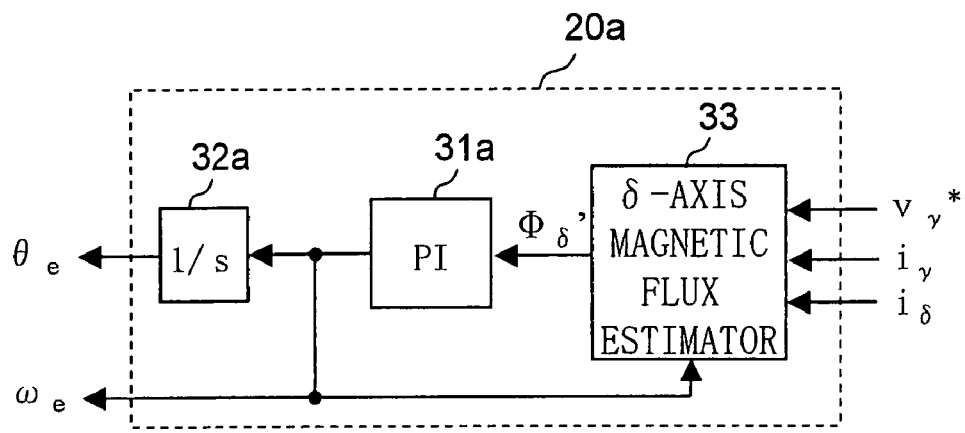
FIG. 9 is a diagram showing a modified example of the position/speed estimator shown in FIG. 3.

Accordingly, the estimator 20 shown in FIGS. 3 and 4 can be replaced with the estimator 20a shown in FIG. 9. The estimator 20a includes a δ-axis magnetic flux estimator 33, a proportional-plus-integral calculator 31a, and an integrator 32a. To make the axis error $\Delta\theta$ converge to zero, the δ-axis magnetic flux estimator 33 has simply to estimate the δ-axis magnetic flux $\Phi_\delta$; here, on the same principle as described above, to intentionally produce a deviation between the d-axis and γ-axis, the δ-axis magnetic flux estimator 33 estimates the δ-axis magnetic flux $\Phi_\delta'$ according to formula (24) below. That is, the δ-axis magnetic flux estimator 33 estimates the δ-axis magnetic flux $\Phi_\delta'$ by use of, as a calculation parameter corresponding to the q-axis inductance, a value of L that fulfills formula (6) or (7) above, instead of the actual value of $L_q$.

$$\Phi'_\delta = -\left(\frac{v^*_\gamma - (L_d s + R_a)i_\gamma}{\omega_e} + Li_\delta\right) \quad (24)$$

The proportional-plus-integral calculator 31a is similar to the proportional-plus-integral calculator 31 shown in FIG. 4; specifically it cooperates with different parts of the motor control device 3 to perform proportional-plus-integral control, and thereby calculates the estimated motor speed $\omega_e$ such that the δ-axis magnetic flux $\Phi_\delta'$ calculated by the δ-axis magnetic flux estimator 33 converges to zero. The integrator 32a integrates the estimated motor speed $\omega_e$ outputted from the proportional-plus-integral calculator 31a to calculate the estimated rotor position $\theta_e$. The estimated motor speed $\omega_e$ outputted from the proportional-plus-integral calculator 31a and the estimated rotor position $\theta_e$ outputted from the integrator 32a are, as the output values of the estimator 20a, fed to those parts of the motor control device 3 which require those values.

As will be understood from formula (24), the term including $L_d$ is multiplied by $i_\gamma$, and thus the value of the term is comparatively small. That is, the estimation of the rotor position is little influenced by the d-axis inductance $L_d$ (because the value of $i_\gamma$ is notably smaller than that of $i_\delta$). In view of this, in formula (24) used for estimation, L may be used as the value of $L_d$. This makes it possible to operate a salient-pole motor with high efficiency by the same control as when operating a non-salient-pole motor that does not exploit a reluctance torque (such as a surface permanent magnet synchronous motor). This eliminates the need to change control to cope with different types of magnet fitting, and thus helps achieve higher compatibility. High compatibility is achieved also in cases where formulae (5), (16), etc. are used.

Although formula (23) uses the approximation $\Phi_{ex} \approx \Phi_a$, it is also possible to estimate the δ-axis magnetic flux without using this approximation. In that case, the δ-axis magnetic flux $\Phi_\delta'$ is estimated according to formula (25) below. Also in that case, as a calculation parameter corresponding to the q-axis inductance, instead of the actual value of $L_q$, a value of L that fulfills formula (6) or (7) may be used.

$$\Phi'_\delta = -\frac{\Phi_a}{(L_d - L)i_\gamma + \Phi_a}\left(\frac{v^*_\gamma - (L_d s + R_a)i_\gamma}{\omega_e} + Li_\delta\right) \quad (25)$$

Second Embodiment

Next, a second embodiment of the invention will be described as one involving switching among different control methods—the feature with which one of the main objects of the invention is achieved. Throughout all the embodiments, that is, the first embodiment described above, this embodiment, and the following embodiments described later, unless otherwise described, the same parts are identified by the same reference numerals, and the same values, directions, etc. are identified by the same symbols (such as θ and ω). Accordingly, in principle, no overlapping explanations will be repeated for the parts, values, directions, etc. that bear the same reference numerals and symbols once they have been described.

Figure 10:
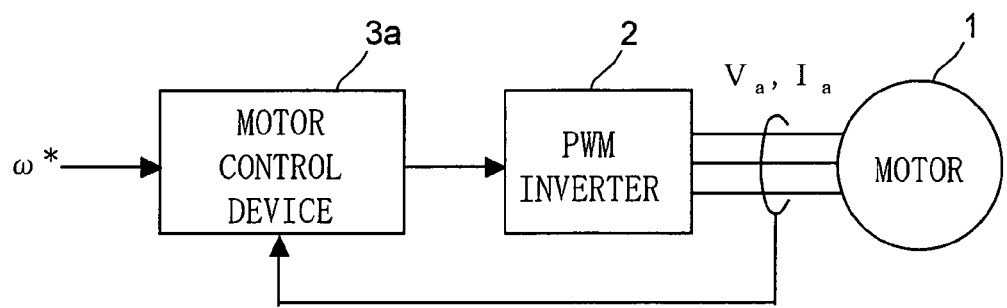
FIG. 10 is a block diagram showing an outline of the configuration of a motor drive system according to a second embodiment of the invention.

FIG. 10 is a block configuration diagram of a motor drive system according to a second embodiment of the invention. The motor drive system according to the second embodiment includes a motor 1, an inverter 2, and a motor control device 3a.

The motor control device 3a estimates the rotor position etc. of the motor 1 by use of the motor current $I_a$ and that feeds the PWM inverter 2 with a signal for making the motor 1 rotate at the desired rotation speed. The desired rotation speed here is fed, as a specified motor speed value ω*, from an unillustrated CPU (central processing unit) or the like to the motor control device 3a.

Figure 11:
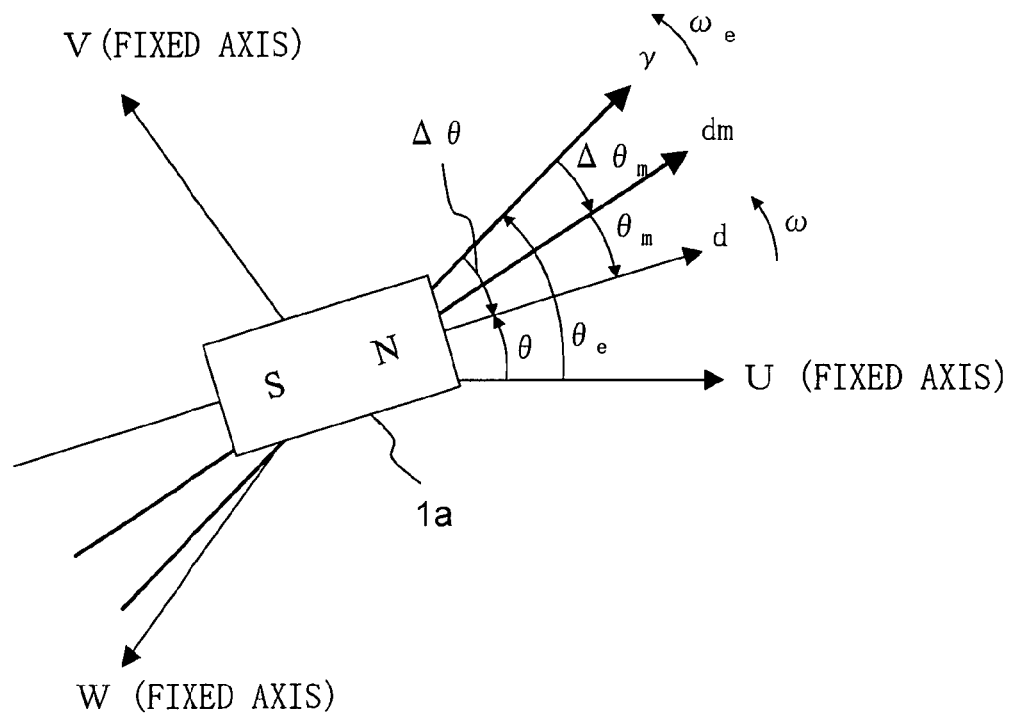
FIG. 11 is an analysis model diagram of the motor in the second embodiment of the invention.
Figure 12:
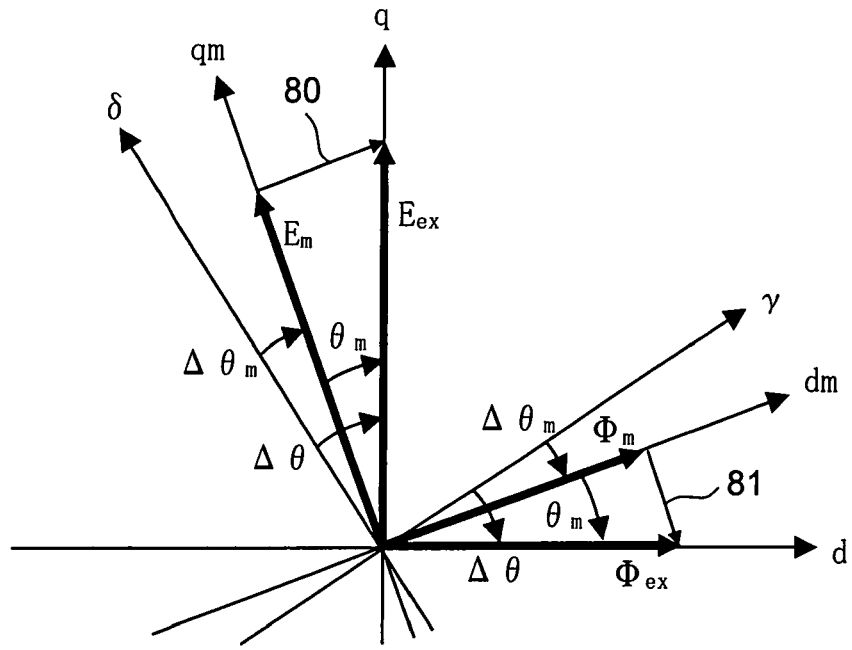
FIG. 12 is an analysis model diagram of the motor in the second embodiment of the invention.

FIGS. 11 and 12 are analysis model diagrams of the motor 1, as applied to this embodiment. FIG. 11. shows the armature winding fixed axes of U-, V-, and W-phases. In this embodiment, the d-axis, q-axis, γ-axis, and δ-axis, the actual rotor position θ, the estimated rotor position $\theta_e$, the axis error Δθ, the actual motor speed ω, and the estimated motor speed $\omega_e$ are defined in the same manner as in the first embodiment (see FIG. 2).

In addition, the rotating axis whose direction coincides with the direction of the current vector to be supplied to the motor 1 to achieve maximum torque control is defined as the qm-axis; the rotating axis that lags behind the qm-axis by an electrical angle of 90 degrees is defined as the dm-axis. The coordinate axes composed of the dm-axis and qm-axis are called the dm-qm axes.

As will be clear from the solid line 61 in FIG. 6 representing the current locus obtained when maximum torque control is achieved, the motor current that achieves maximum torque control has a positive q-axis component and a negative d-axis component. Thus, the qm-axis leads the q-axis in phase. In FIGS. 11 and 12, a rotation counter-clockwise means a lead in phase.

The phase (angle) of the q-axis relative to the qm-axis is represented by $\theta_m$, and the phase (angle) of qm-axis relative to the δ-axis is represented by $\Delta\theta_m$. In this case, needless to say, the phase of the d-axis relative to the dm-axis also is $\theta_m$, and the phase of dm-axis relative to the γ-axis also is $\Delta\theta_m$. What $\theta_m$ represents is the angle by which the qm-axis (dm-axis) leads the q-axis (d-axis). What $\Delta\theta_m$ represents is the axis error between the qm-axis and the δ-axis (the axis error between the dm-qm axes and the γ-δ axes). The axis error Δθ between the d-axis and γ-axis is given by $\Delta\theta = \Delta\theta_m + \theta_m$.

As described above, the dm-axis leads the d-axis in phase, and here it is assumed that $\theta_m$ has a negative value. Likewise, when the γ-axis leads the dm-axis in phase, $\Delta\theta_m$ has a negative value. The vectors (such as $E_m$) shown in FIG. 12 will be described later.

The dm-axis component and qm-axis component of the motor current $I_a$ are referred to as the dm-axis current $i_{dm}$ and qm-axis current $i_{qm}$, respectively. The dm-axis component and qm-axis component of the motor voltage $V_a$ are referred to as the dm-axis voltage $v_{dm}$ and qm-axis voltage $v_{qm}$, respectively.

The motor control device according to this embodiment switches control methods between when the motor 1 is at a standstill or in low-speed rotation and when the motor 1 is in high-speed rotation. The control performed at a standstill or in low-speed rotation is called the low-speed control (low-speed sensorless control), and the control performed in high-speed rotation is called the high-speed control (high-speed sensorless control).

In low-speed control, the axis error Δθ between the d-axis and γ-axis is estimated and the γ-axis, which is an estimated axis, is made to converge to the d-axis (i.e., the axis error Δθ is made to converge to zero). Moreover, the motor 1 is controlled with the motor current $I_a$ broken down into the d-axis component and q-axis component. On the other hand, in high-speed control, the axis error $\Delta\theta_m$ between the dm-axis and γ-axis is estimated and the γ-axis, which is an estimated axis, is made to converge to the dm-axis (i.e., the axis error $\Delta\theta_m$ is made to converge to zero). Moreover, the motor 1 is controlled with the motor current $I_a$ broken down into the dm-axis component and qm-axis component.

As described previously, to achieve maximum torque control, conventional motor control devices require both adjustment of parameters for estimation for keeping the axis error equal to zero and adjustment of parameters for achieving maximum torque control. Also in a case where maximum torque control is achieved by use of the high-speed control according to this embodiment, it is necessary to adjust parameters for estimation for estimating the axis error $\Delta\theta_m$ (for making the axis error $\Delta\theta_m$ converge to zero), but here doing so simultaneously completes the adjustment of parameters for achieving maximum torque control (see the definition of the qm-axis). That is, adjustment of parameters for estimating the axis error simultaneously serves as adjustment of parameters for achieving maximum torque control. This permits extremely easy adjustment.

Figure 13:
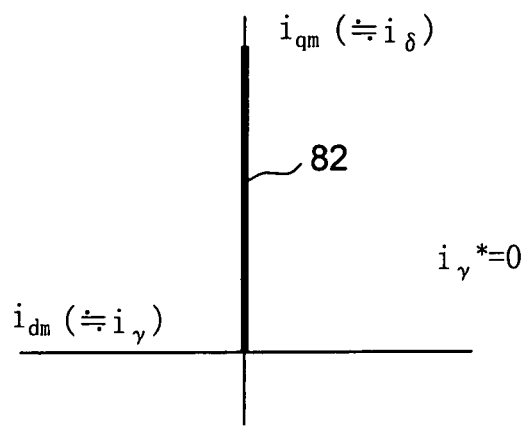
FIG. 13 is a diagram showing an example of the current locus of the motor current flowing through the motor shown in FIG. 10.

Moreover, as will be clear from the definition of the qm-axis, the current locus of the motor current $I_a$ as observed when maximum torque control is performed traces the qm-axis as indicated by a solid line 82 in FIG. 13. Thus, to achieve maximum torque control, there is no need to perform the complicated calculation expressed by formula (2) above to calculate specified γ-axis current value $i_γ^*$. This helps reduce the load of calculation. Specifically, when high-speed control is performed, the specified γ-axis current value $i_γ^*$ is set at a predetermined value equal or close to zero irrespective of the value of $i_δ$.

Now, the theoretical formula of the control based on the dm-qm axes (corresponding to the high-speed control mentioned above) will be described by use of a voltage equation. To begin with, the extension induction voltage equation on the real axes is given as formula (26) below, and the extension induction voltage $E_{ex}$ is given by formula (27) below. Formula (26) is the same as formula (17) above, and formula (27) is the same as formula (18) above. In the following formulae, p represents the differential operator.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (26)$$

$$E_{ex} = \omega((L_d - L_q)i_d + \Phi_a) - (L_d - L_q)(p\,i_q) \quad (27)$$

Performing coordinate conversion such that formula (26) on the real axes is converted to one on the control axes gives formula (28) below. Ignoring the third term of the right side of formula (28) for the sake of simplification gives formula (29) below $$\begin{bmatrix} v_γ \\ v_δ \end{bmatrix} = \begin{bmatrix} R_a + pL_d & -\omega L_q \\ \omega L_q & R_a + pL_d \end{bmatrix} \begin{bmatrix} i_γ \\ i_δ \end{bmatrix} + E_{ex}\begin{bmatrix} -\sin\Delta\theta \\ \cos\Delta\theta \end{bmatrix} - (p\Delta\theta)L_d\begin{bmatrix} -i_δ \\ i_γ \end{bmatrix} \quad (28)$$

$$\begin{bmatrix} v_γ \\ v_δ \end{bmatrix} = \begin{bmatrix} R_a + pL_d & -\omega L_q \\ \omega L_q & R_a + pL_d \end{bmatrix} \begin{bmatrix} i_γ \\ i_δ \end{bmatrix} + E_{ex}\begin{bmatrix} -\sin\Delta\theta \\ \cos\Delta\theta \end{bmatrix} \quad (29)$$

Rearranging formula (29) in terms of the dm-qm axes gives the formula (30).

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex}\begin{bmatrix} -\sin\theta_m \\ \cos\theta_m \end{bmatrix} \quad (30)$$

Here, assume that formula (31) holds. Then, since $i_d = i_{qm} \cdot \sin\theta_m$, formula (32) holds.

$$L_{q1}i_{qm} = \sin\theta_m\{(\Phi_a + (L_d - L_q)i_d\} \quad (31)$$

$$L_{q1}i_{qm} = \sin\theta_m\{(\Phi_a + (L_d - L_q)i_d\} = \sin\theta_m\{\Phi_a + (L_d - L_q) i_{qm}\sin\theta_m\} \quad (32)$$

Rearranging formula (30) using formula (32) gives formula (33). Here, $E_m$ is given by formula (34). $L_{q1}$ represents an imaginary inductance that depends on $\theta_m$. $L_{q1}$ is determined for the sake of convenience to deal with $E_{ex} \cdot \sin\theta_m$ in the second term of the right side of formula (30) as a voltage drop ascribable to an imaginary inductance. $L_{q1}$ has a negative value.

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix} \begin{bmatrix} i_{dm} \\ i_{qm} \end{bmatrix} + E_m\begin{bmatrix} 0 \\ 1 \end{bmatrix} \quad (33)$$

$$E_m = (\omega((L_d - L_q)i_d + \Phi_a) - (L_d - L_q)(p\,i_q))\cos\theta_m = E_{ex}\cos\theta_m \quad (34)$$

Here, an approximation is made such that the equation $L_m = L_q + L_{q1}$ holds (since $\theta_m$ depends on $i_q$ and $i_{qm}$, $L_{q1}$ depends on $i_q$ and $i_{qm}$; in addition, under the influence of magnetic saturation, $L_q$ also depends on $i_q$ and $i_{qm}$; the dependence of $L_{q1}$ on $i_q$ and the dependence of $L_q$ on $i_q$ are integrated into $L_m$, and the influence of $i_q$ and $i_{qm}$ is taken into consideration at the time of estimation). Now, formula (33) is rearranged into formula (35) below. Incidentally, as will be described later, $L_m$ corresponds to the calculation parameter L in the first embodiment.

$$\begin{bmatrix} v_{dm} \\ v_{qm} \end{bmatrix} = \begin{bmatrix} R_a + pL_d & -\omega L_m \\ \omega L_q & R_a + pL_d \end{bmatrix} \begin{bmatrix} i_{dm} \\ i_{qm} \end{bmatrix} + E_m\begin{bmatrix} 0 \\ 1 \end{bmatrix} \quad (35)$$

Further rearranging the formula (35) gives formula (36) below. Here, $E_{exm}$ is given by formula (37) below.

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m \end{bmatrix} + \omega(L_q - L_m)\begin{bmatrix} 0 & 0 \\ 1 & 0 \end{bmatrix}\begin{bmatrix} i_{dm} \\ i_{qm} \end{bmatrix}$$

$$= \begin{bmatrix} R_a + pL_d & -\omega L_m \\ \omega L_m & R_a + pL_d \end{bmatrix}\begin{bmatrix} i_{dm} \\ i_{qm} \end{bmatrix} + \begin{bmatrix} 0 \\ E_m + \omega(L_q - L_m)i_{dm} \end{bmatrix}$$

$$= \begin{bmatrix} R_a + pL_d & -\omega L_m \\ \omega L_m & R_a + pL_d \end{bmatrix}\begin{bmatrix} i_{dm} \\ i_{qm} \end{bmatrix} + \begin{bmatrix} 0 \\ E_{exm} \end{bmatrix} \quad (36)$$

$$E_{exm} = (\omega((L_d - L_q)i_d + \Phi_a) - (L_d - L_q)(p\,i_q))\cos\theta_m + \omega(L_q - L_m)i_{dm} \quad (37)$$
$$= E_m + \omega(L_q - L_m)i_{dm}$$

When there is an axis error $\Delta\theta_m$ between the γ-δ axes and the dm-qm axes, formula (36) is rearranged into formula (38) below. That is, performing coordinate conversion such that formula (36) on the dm-qm axes is converted to one on the γ-δ axes, as formula (26) is to formula (28), gives formula (38).

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\gamma \\ i_\delta \end{bmatrix} + \quad (38)$$

$$E_{exm} \begin{bmatrix} -\sin\Delta\theta_m \\ \cos\Delta\theta_m \end{bmatrix} - (p\Delta\theta_m)L_d \begin{bmatrix} -i_\delta \\ i_\gamma \end{bmatrix}$$

When approximations are made such that $p\,\Delta\theta_m \approx 0$, $i_{dm} \approx 0$, and $(L_d - L_q)(p\,i_q) \approx 0$, then $E_{exm}$ given by formula (37) is approximated as given by formula (39).

$$\begin{aligned} E_{exm} &= (\omega((L_d - L_q)i_d + \Phi_a) - (L_d - L_q)(pi_q)) \quad (39) \\ &\quad \cos\theta_m + \omega(L_q - L_m)i_{dm} \\ &\approx (\omega((L_d - L_q)i_\delta\sin\theta_m + \Phi_a) - (L_d - L_q)(pi_q)) \\ &\quad \cos\theta_m + \omega(L_q - L_m)i_{dm} \\ &\approx \omega((L_d - L_q)i_\delta\sin\theta_m + \Phi_a)\cos\theta_m \end{aligned}$$

Substituting $L_m = L_q + L_{q1}$ in formula (32), then solving the resulting formula with respect to $\theta_m$, and then assuming that $i_\delta \approx i_{qm}$ gives formula (40) below. As expressed by formula (40), $\theta_m$ is a function of $i_\delta$, and therefore $E_{exm}$ also is a function of $i_\delta$.

$$\theta_m = \sin^{-1}\left(\frac{\Phi_a - \sqrt{\Phi_a^2 + 4(L_q - L_m)(L_q - L_d)i_\delta^2}}{2i_\delta(L_q - L_d)}\right) \quad (40)$$

Now, with reference to FIG. 12, a description will be given of the relationship among $E_{ex}$, $E_m$, and $E_{exm}$. Consider $E_{ex}$, $E_m$, and $E_{exm}$ to be voltage vectors in a rotating coordinate system. Then, $E_{ex}$ can be called an extension induction voltage vector. The extension induction voltage vector $E_{ex}$ is an induction voltage vector on the q-axis. Moreover, consider the extension induction voltage vector $E_{ex}$ to be broken down into an induction voltage vector on the qm-axis and an induction voltage vector on the dm-axis. As will be understood from formula (34) above, of these broken down induction voltage vectors, the induction voltage vector on the qm-axis is $E_m$; on the other hand, the induction voltage vector on the dm-axis ($E_{ex} \cdot \sin\theta_m$) represented by the reference numeral 80 in FIG. 12 is a voltage drop vector ascribable to the imaginary inductance $L_{q1}$.

As will be understood from a comparison between formulae (34) and (37), $E_{exm}$ is the sum of $E_m$ and $\omega(L_q - L_m)i_{dm}$. Thus, in the rotating coordinate system, like $E_m$, $E_{exm}$ also is an induction voltage vector on the qm-axis. When maximum torque control is performed, since $i_{dm} \approx 0$ as described above, $E_{exm}$ (substantially) coincides with $E_m$.

Next, with reference to FIG. 12, a description will be given also of the magnetic flux corresponding to $E_{ex}$, $E_m$, and $E_{exm}$. $E_{ex}$ is an induction voltage generated by the $\Phi_{ex}$, which is the flux linkage of the motor 1, and the rotation of the motor 1 (see formula (20) above). Put conversely, $\Phi_{ex}$ is calculated by dividing $E_{ex}$ by $\omega$ (provided that the transient term (the second term of the right side) of $E_{ex}$ given by formula (27) is ignored).

When $\Phi_{ex}$ is considered to be a flux linkage vector in a rotating coordinate system, the flux linkage vector $\Phi_{ex}$ is a flux linkage vector on the d-axis. The flux linkage vector $\Phi_{ex}$ is considered to be broken down into a flux linkage vector on the qm-axis and a flux linkage vector on the dm-axis. When, of these broken down flux linkage vectors, the flux linkage vector on the dm-axis is represented by $\Phi_m$, then $\Phi_m = E_m/\omega$; on the other hand, the flux linkage vector on the qm-axis ($\Phi_{ex} \cdot \sin\theta_m$), represented by the reference numeral 81 in FIG. 12, is a magnetic flux vector ascribable to the imaginary inductance $L_{q1}$.

Let $\Phi_{exm} = E_{exm}/\omega$, then $\Phi_{exm}$ is the sum of $\Phi_m$ and $(L_q - L_m)i_{dm}$. Thus, in the rotating coordinate system, like $\Phi_m$, $\Phi_{exm}$ is a flux linkage vector on the dm-axis. When maximum torque control is performed, since $i_{dm} \approx 0$ as described above, $\Phi_{exm}$ (substantially) coincides with $\Phi_m$.

Figure 14:
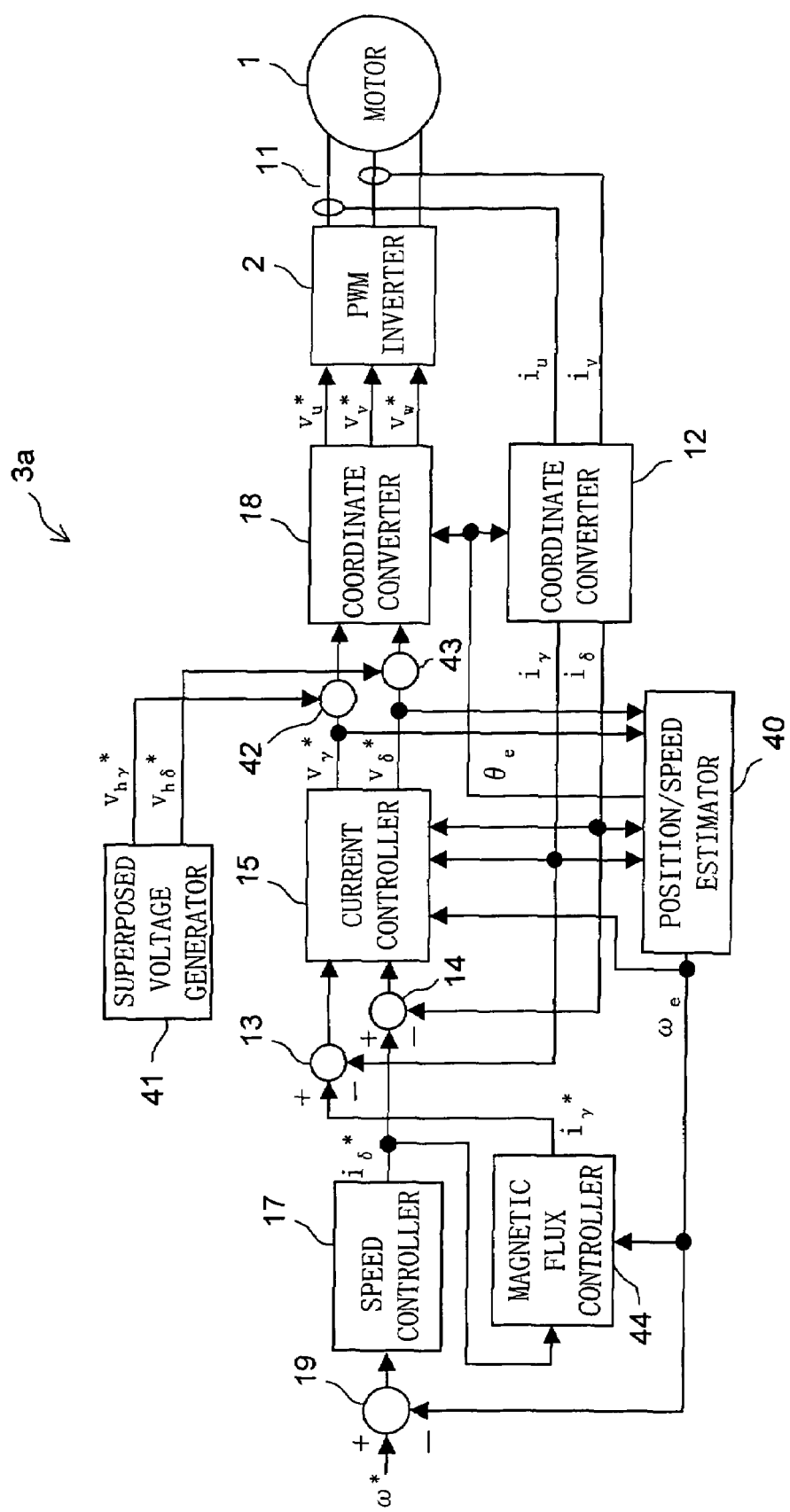
FIG. 14 is a configuration block diagram of the motor drive system shown in FIG. 10.

Specific Configuration—FIG. 14: Next, a specific example of a motor drive system exploiting the formulae noted above will be described. FIG. 14 is a configuration block diagram of a motor drive system, and shows the details of the internal configuration of the motor control device 3a shown in FIG. 10. The motor control device 3a includes a current detector 11, a coordinate converter 12, a subtracter 13, a subtracter 14, a current controller 15, a magnetic flux controller 44, a speed controller 17, a coordinate converter 18, a subtracter 19, a position/speed estimator 40 (hereinafter referred to simply as "the estimator 40"), a superposed voltage generator 41, and adders 42 and 43. These parts constituting the motor control device 3a can freely use, whenever necessary, any of the values generated within the motor control device 3a.

The current detector 11 detects the U-phase current $i_u$ and V-phase current $i_v$, which are the fixed axis components of the motor current $I_a$. Receiving the results of the detection of the U-phase current $i_u$ and V-phase current $i_v$ by the current detector 11, the coordinate converter 12 converts them into the γ-axis current $i_\gamma$ and δ-axis current $i_\delta$ by use of the estimated rotor position $\theta_e$ fed from the estimator 40. As in the first embodiment, the conversion here is performed according to formula (3) above.

The estimator 40 estimates and outputs the estimated rotor position $\theta_e$ and the estimated motor speed $\omega_e$. The method by which the estimator 40 estimates the estimated rotor position $\theta_e$ and the estimated motor speed $\omega_e$ will be described in detail later. The estimator 40 here is so configured as to switch its operation between low-speed estimation processing for achieving low-speed control and high-speed estimation processing for achieving high-speed control according to the rotation speed of the rotor.

The subtracter 19 subtracts the estimated motor speed $\omega_e$ fed from the estimator 40 from the specified motor speed value $\omega^*$, and outputs the result of the subtraction (the speed error). Based on the result ($\omega^* - \omega_e$) of the subtraction by the subtracter 19, the speed controller 17 creates a specified δ-axis current value $i_\delta^*$. Referring to the estimated motor speed $\omega_e$ and the specified δ-axis current value $i_\delta^*$, the magnetic flux controller 44 creates a specified γ-axis current value $i_\gamma^*$.

The subtracter 13 subtracts the γ-axis current $i_\gamma$ outputted from the coordinate converter 12 from the specified γ-axis current value $i_\gamma^*$ outputted from the magnetic flux controller 44, and thereby calculates the current error ($i_\gamma^* 31\ i_\gamma$). The subtracter 14 subtracts the δ-axis current $i_\delta$ outputted from the coordinate converter 12 from the specified δ-axis current value $i_\delta^*$ outputted from the speed controller 17, and thereby calculates the current error ($i_\delta^* - i_\delta$).

Receiving the current errors calculated by the subtracters 13 and 14, the γ-axis current $i_\gamma$ and δ-axis current $i_\delta$ from the coordinate converter 12, and the estimated motor speed $\omega_e$ from the estimator 40, the current controller 15 calculates and outputs a specified γ-axis voltage value $v_\gamma^*$ and a specified δ-axis voltage value $v_\delta^*$ such that the γ-axis current $i_\gamma$ follows the specified γ-axis current value $i_γ^*$ and in addition that the δ-axis current $i_δ$ follows the specified δ-axis current value $i_δ^*$.

The superposed voltage generator 41 generates and outputs superposed voltages to be superposed on the specified γ-axis voltage value $v_γ^*$ and specified δ-axis voltage value $v_δ^*$. These superposed voltages are composed of a γ-axis superposed voltage $v_{hγ}^*$ for $v_γ^*$ (the γ-axis component of the superposed voltages) and a δ-axis superposed voltage $v_{hδ}^*$ for $v_δ^*$ (the δ-axis component of the superposed voltages). The γ-axis superposed voltage $v_{hγ}^*$ and δ-axis superposed voltage $v_{hδ}^*$ are also collectively called the superposed voltages $v_{hγ}^*$ and $v_{hδ}^*$.

In this embodiment, superposed voltages are superposed on the drive voltages, represented by $v_γ^*$ and $v_δ^*$, for driving the motor 1. As the result of the superposition of these superposed voltages, superposed currents commensurate with those superposed voltages are superposed on the drive currents, referred to by the specified γ-axis current value $i_γ^*$ and specified δ-axis current value $i_δ^*$, for driving the motor 1.

The superposed voltages generated by the superposed voltage generator 41 are, for example, high-frequency rotating voltage. Here, "high-frequency" means that the frequency of the superposition voltages is sufficiently higher than the frequency of the drive voltages. Accordingly, the frequency of the superposition currents, which are superposed according to those superposition voltages, is sufficiently higher than the frequency of the drive currents. On the other hand, "rotating voltage" means that the voltage vector locus of the superposition voltages is circular on fixed coordinate axes.

The adder 42 adds the γ-axis superposed voltage $v_{hγ}^*$ to the specified γ-axis voltage value $v_γ^*$ outputted from the current controller 15, and feeds the result $(v_γ^*+v_{hγ}^*)$ of the addition to the coordinate converter 18. The adder 43 adds the δ-axis superposed voltage $v_{hδ}^*$ to the specified δ-axis voltage value $v_δ^*$ outputted from the current controller 15, and feeds the result $(v_δ^*+v_{hδ}^*)$ of the addition to the coordinate converter 18.

Based on the estimated rotor position $θ_e$ fed from the estimator 40, the coordinate converter 18 performs reverse conversion of the specified γ-axis voltage value $v_γ^*$ having $v_{hγ}^*$ superposed on it (i.e., $(v_γ^*+v_{hγ}^*)$) and the specified δ-axis voltage value $v_δ^*$ having $v_{hδ}^*$ superposed on it (i.e., $(v_δ^*+v_{hδ}^*)$) to create specified three-phase voltage values composed of a specified U-phase voltage value $v_u^*$, a specified V-phase voltage value $v_v^*$, and a specified W-phase voltage value $v_w^*$, which represent the U-, V-, and W-phase components of the motor voltage $V_a$; the coordinate converter 18 feeds these to the PWM inverter 2. The reverse conversion here is performed according to formula (4) above, with $v_γ^*$ and $v_δ^*$ replaced with $(v_γ^*+v_{hγ}^*)$ and $(v_δ^*+v_{hδ}^*)$.

Based on the specified three-phase voltage values ($v_u^*$, $v_v^*$, and $v_w^*$), which represent the voltages to be applied to the motor 1, the PWM inverter 2 creates pulse-width-modulated signals, and supplies the motor 1 with a motor current $I_a$ commensurate with the specified three-phase voltage values to thereby drive the motor 1.

Figure 15:
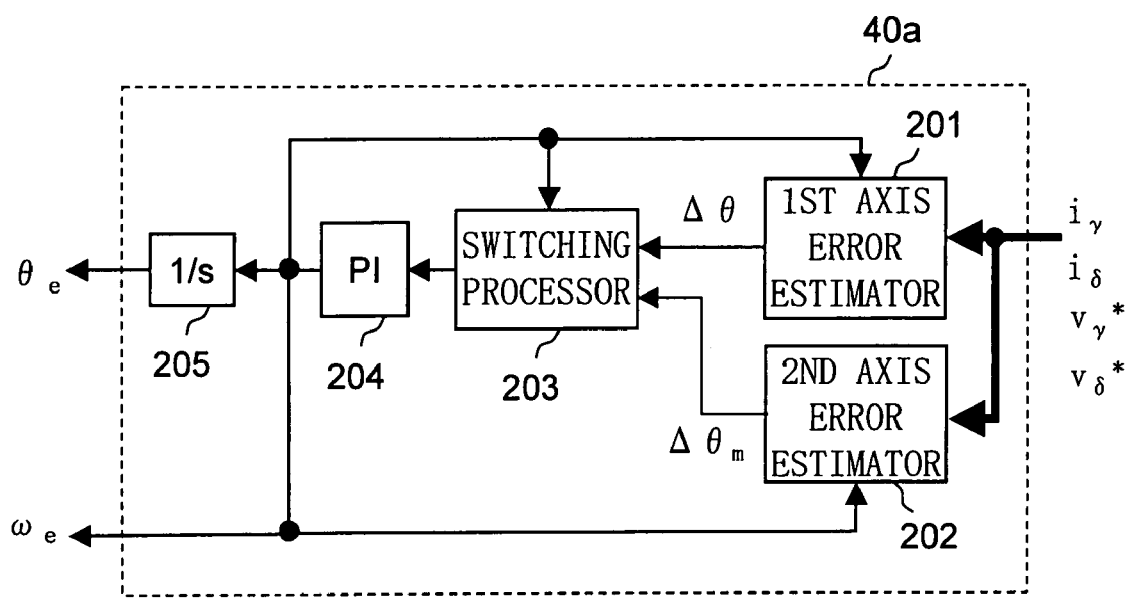
FIG. 15 is an internal block diagram of a position/speed estimator usable as the position/speed estimator shown in FIG. 14 (a first configuration example)

FIG. 15 is an internal block diagram of a position/speed estimator 40a (hereinafter referred to simply as "the estimator 40a") as a first configuration example of the estimator 40 shown in FIG. 14. The estimator 40a can be used as the estimator 40 in FIG. 14.

The estimator 40a includes a first axis error estimator 201, a second axis error estimator 202, a switching processor 203, a proportional-plus-integral calculator 204, and an integrator 205.

By use of all or part of the values of $v_γ^*$, $v_δ^*$, $i_γ$, and $i_δ$, and based on the superposed current components that flow in accordance with the injected high-frequency superposed voltages, the first axis error estimator 201 estimates the axis error $Δθ$ between the d-axis and the γ-axis. Here, the first axis error estimator 201 uses the value of the estimated motor speed $ω_e$ whenever necessary. There have conventionally been proposed many methods for estimating (calculating) the axis error $Δθ$, and the first axis error estimator 201 can adopt any of those. Later on (after the description of the seventh embodiment), examples of methods for estimating the axis error $Δθ$ will be presented. This type of estimation based on high-frequency superposed components and exploiting a magnetic salient pole offers high accuracy even in low-speed rotation.

By use of all or part of the values of $v_γ^*$, $v_δ^*$, $i_γ$, and $i_δ$, and based on the induction voltage generated by the rotation of the rotor etc., the second axis error estimator 202 estimates the axis error $Δθ_m$ between the dm-axis and the γ-axis. Here, the second axis error estimator 202 uses the value of the estimated motor speed $ω_e$ whenever necessary. A plurality of specific examples of the method by which the axis error $Δθ_m$ is estimated (calculated) here will be presented later on (after the description of the seventh embodiment); for example, the second axis error estimator 202 calculates (estimates) the axis error $Δθ_m$ according to formula (A1) below. Formula (A1) is derived from the result of rearrangement of the first and second rows of matrix formula (38) above (provided that the third term of the right side of matrix formula (38) is ignored). The second axis error estimator 202 uses $v_γ^*$, $v_δ^*$, and $ω_e$, as $v_γ$, $v_δ$, and $ω$ in formula (A1) below.

$$\varDelta θ_m = \tan^{-1} \frac{-(v_γ - (R_a + pL_d)i_γ + ωL_m i_δ)}{v_δ - (R_a + pL_d)i_δ - ωL_m i_γ} \quad (A1)$$

In formula (A1), the calculation parameter $L_q$ in formula (1) above is replaced with $L_m$. That is, using $L_q$, which represents the actual value of the q-axis inductance, as the calculation parameter corresponding to the q-axis inductance gives $Δθ$, and using $L_m$ instead gives $Δθ_m$. This type of estimation exploiting an induction voltage or the like offers high accuracy in particular in high-speed rotation. As will be described later in connection with the method for estimating the axis error $Δθ_m$, $L_m$ is given a value equal to or larger than $L_d$ but smaller than $L_q$.

The switching processor 203 receives the axis error $Δθ$ as a first input value and the axis error $Δθ_m$ as a second input value; according to speed information representing the rotation speed of the rotor of the motor 1, the switching processor 203 calculates an output value from the first and second input values and outputs the output value. In the estimator 40a, used as the speed information is the estimated motor speed $ω_e$ calculated by the proportional-plus-integral calculator 204. Instead, the specified motor speed value $ω^*$ may be used as the speed information.

Specifically, for example, the switching processor 203 performs weighted averaging in accordance with the speed information. In this case, if the rotation speed represented by the speed information is lower than a predetermined first threshold speed $V_{TH1}$, the switching processor 203 outputs the first input value as the output value; if it is higher than a predetermined second threshold speed $V_{TH2}$, the switching processor 203 outputs the second input value as the output value. Here, $V_{TH1}<V_{TH2}$ holds.

Figure 16:
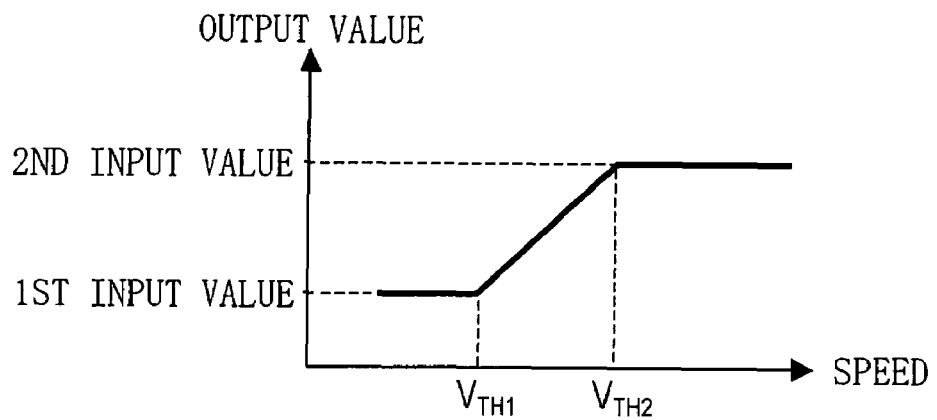
FIG. 16 is a diagram illustrating the operation of the switching processor shown in FIG. 15.

If the rotation speed represented by the speed information is in the range between the first threshold speed $V_{TH1}$ and the second threshold speed $V_{TH2}$, a weighted average of the first and second input values is calculated and outputted as the output value. Specifically, as schematically shown in FIG. 16, when the rotation speed represented by the speed information is in the range between the first threshold speed $V_{TH1}$ and the second threshold speed $V_{TH2}$, the weighted average of the first and second input values is calculated such that, as the rotation speed increases, the contribution of the second input value to the output value increases and that, as the rotation speed decreases, the contribution of the first input value to the output value increases.

Figure 17:
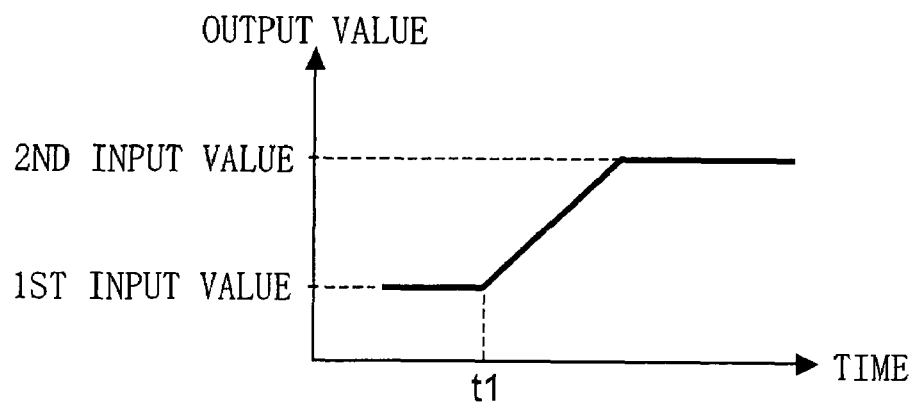
FIG. 17 is a diagram illustrating the operation of the switching processor shown in FIG. 15.

Instead, for example, the weighted averaging by the switching processor 203 may be performed in accordance with the time (length of time) that has passed since the start of switching. Specifically, as schematically shown in FIG. 17, at time point t1 at which the rotation speed represented by the speed information turns from lower than the first threshold speed $V_{TH1}$ to higher than the first threshold speed $V_{TH1}$, the output value starts to be switched from the first input value to the second input value. Just at time point t1, the output value is, for example, equal to the first input value. Then, the weighted average of the first and second input values is calculated such that, as the time that has passed since time point t1 increases, the contribution of the second input value to the output value increases. Then, when a predetermined time has passed since time point t1—the time point at which the switching was started, the output value is made equal to the second input value, and the switching is finished. Similar operations are performed when the rotation speed represented by the speed information turns from higher than the second threshold speed $V_{TH2}$ to lower than the second threshold speed $V_{TH2}$. In a case where weighted averaging is performed in accordance with the time that has passed since the start of switching, the first threshold speed $V_{TH1}$ and the second threshold speed $V_{TH2}$ may be equal.

Here, the first threshold speed $V_{TH1}$ is a rotation speed, for example, in the range from 10 rps (revolutions per second) to 20 rps; the second threshold speed $V_{TH2}$ is a rotation speed, for example, in the range from 20 rps to 30 rps.

In the estimator 40a shown in FIG. 15, the output value of the switching processor 203 is fed to the proportional-plus-integral calculator 204, which functions as a speed estimator. To achieve a PLL (phase-locked loop), the proportional-plus-integral calculator 204 cooperates with different parts of the motor control device 3a to perform proportional-plus-integral control, and thereby calculates the estimated motor speed $\omega_e$ such that the output value of the switching processor 203 converges to zero. The integrator 205 integrates the estimated motor speed $\omega_e$ outputted from the proportional-plus-integral calculator 204 to calculate the estimated rotor position $\theta_e$. The estimated motor speed $\omega_e$ outputted from the proportional-plus-integral calculator 204 and the estimated rotor position $\theta_e$ outputted from the integrator 205 are, as the output values of the estimator 40a, fed to those parts of the motor control device 3a which require those values.

Figure 18:
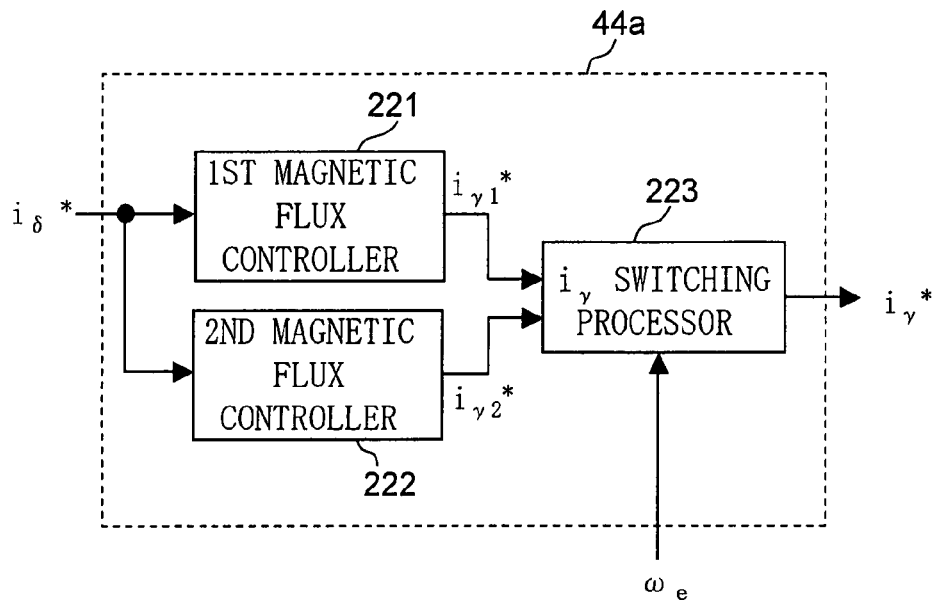
FIG. 18 is an internal block diagram of a magnetic flux controller usable as the magnetic flux controller shown in FIG. 14.

FIG. 18 is an internal block diagram of a magnetic flux controller 44a as an example of the configuration of the magnetic flux controller 44 shown in FIG. 14. The magnetic flux controller 44a can be used as the magnetic flux controller 44 in FIG. 14.

The magnetic flux controller 44a includes a first magnetic flux controller 221, a second magnetic flux controller 222, and a $i_\gamma$ switching controller 223. The first magnetic flux controller 221 and the second magnetic flux controller 222 receive the specified $\delta$-axis current value $i_\delta{}^*$ calculated by the speed controller 17 shown in FIG. 14.

The first magnetic flux controller 221 calculates and outputs the specified $\gamma$-axis current value that achieves low-speed control. The specified $\gamma$-axis current value that is outputted from the first magnetic flux controller 221 is dealt with as one candidate of $i_\gamma{}^*$ outputted from the magnetic flux controller 44a, and is represented by $i_{\gamma 1}{}^*$. As described previously, low-speed control is control based on the d-q axes, and accordingly, to achieve maximum torque control, the first magnetic flux controller 221 calculates $i_{\gamma 1}{}^*$ according to formula (A2) below, as well known.

$$i_{\gamma 1}^* = \frac{\Phi_a}{2(L_q - L_d)} - \sqrt{\frac{\Phi_a^2}{4(L_q - L_d)^2} + i_\delta^{*2}} \qquad (A2)$$

The second magnetic flux controller 222 outputs the specified $\gamma$-axis current value that achieves high-speed control. The specified $\gamma$-axis current value that is outputted from the second magnetic flux controller 222 is dealt with as another candidate of $i_\gamma{}^*$ outputted from the magnetic flux controller 44a, and is represented by $i_{\gamma 2}{}^*$. Since high-speed control is control based on the dm-qm axes, to achieve maximum torque control, $i_{\gamma 2}{}^*$ is set at a predetermined value equal or close to zero irrespective of $i_\delta{}^*$. This is because, so long as the $\gamma$-$\delta$ axes follows the dm-qm axes, the $\gamma$-axis current that achieves maximum torque control may be zero or approximately zero.

The $i_\gamma$ switching controller 223 receives $i_{\gamma 1}{}^*$ as a first input value and $i_{\gamma 2}{}^*$ as a second input value; according to the speed information that represents the rotation speed of the rotor of the motor 1, the $i_\gamma$ switching controller 223 calculates $i_\gamma{}^*$ as an output value form $i_{\gamma 1}{}^*$ and $i_{\gamma 2}{}^*$, and outputs $i_\gamma{}^*$. Used as the speed information by the $i_\gamma$ switching controller 223 is the estimated motor speed $\omega_e$. Instead, the specified motor speed value $\omega^*$ may be used as the speed information.

Specifically, for example, like the switching processor 203 shown in FIG. 15, the $i_\gamma$ switching controller 223 performs weighted averaging in accordance with the speed information. In this case, if the rotation speed represented by the speed information is lower than a predetermined first threshold speed $V_{TH1}$, the $i_\gamma$ switching controller 223 outputs $i_{\gamma 1}{}^*$ as $i_\gamma{}^*$; if it is higher than a predetermined second threshold speed $V_{TH2}$, the $i_\gamma$ switching controller 223 outputs $i_{\gamma 2}{}^*$ as $i_\gamma{}^*$.

If the rotation speed represented by the speed information is in the range between the first threshold speed $V_{TH1}$ and the second threshold speed $V_{TH2}$, a weighted average of $i_{\gamma 1}{}^*$ and $i_{\gamma 2}{}^*$ is calculated and outputted as $i_\gamma{}^*$. Specifically, as in the switching processor 203 (see FIG. 16) shown in FIG. 15, when the rotation speed represented by the speed information is in the range between the first threshold speed $V_{TH1}$ and the second threshold speed $V_{TH2}$, the weighted average of $i_{\gamma 1}{}^*$ and $i_{\gamma 2}{}^*$ is calculated such that, as the rotation speed increases, the contribution of $i_{\gamma 2}{}^*$ to $i_\gamma{}^*$ increases and that, as the rotation speed decreases, the contribution of $i_{\gamma 1}{}^*$ to $i_\gamma{}^*$ increases.

Instead, for example, the weighted averaging by the $i_\gamma$ switching controller 223 may be performed in accordance with the time (length of time) that has passed since the start of switching. Specifically, as schematically shown in FIG. 17, at time point t1 at which the rotation speed represented by the speed information turns from lower than the first threshold speed $V_{TH1}$ to higher than the first threshold speed $V_{TH1}$, the output value ($i_\gamma{}^*$) starts to be switched from the first input value ($i_{\gamma 1}{}^*$) to the second input value ($i_{\gamma 2}{}^*$). Just at time point t1, the output value ($i_\gamma{}^*$) is, for example, equal to the first input value ($i_{\gamma 1}{}^*$). Then, the weighted average of the first and second input values ($i_{\gamma 1}{}^*$ and $i_{\gamma 2}{}^*$) is calculated such that, as the time that has passed since time point t1 increases, the contribution of the second input value ($i_{\gamma 2}{}^*$) to the output value ($i_\gamma{}^*$)

increases. Then, when a predetermined time has passed since time point t1—the time point at which the switching was started, the output value ($i_\gamma$*) is made equal to the second input value ($i_{\gamma 2}$*), and the switching is finished. Similar operations are performed when the rotation speed represented by the speed information turns from higher than the second threshold speed $V_{TH2}$ to lower than the second threshold speed $V_{TH2}$. In a case where weighted averaging is performed in accordance with the time that has passed since the start of switching, the first threshold speed $V_{TH1}$ and the second threshold speed $V_{TH2}$ may be equal.

Whenever, as in low-speed rotation, the axis error $\Delta\theta$ calculated by the first axis error estimator 201 is needed, it is absolutely necessary that the superposed voltage generator 41 shown in FIG. 14 generate the superposed voltages; on the other hand, whenever, as in high-speed rotation, the axis error $\Delta\theta$ calculated by the first axis error estimator 201 is not needed, the superposed voltage generator 41 may be stopped from generating the superposed voltages. This is because what is needed to calculate the axis error $\Delta\theta_m$ is the drive current components that flow in accordance with the drive voltages ($v_\gamma$* and $v_\delta$*) and the superposed current components act as noise to the calculation of the axis error $\Delta\theta_m$.

In cases as where weighted averaging is performed, however, it is necessary to calculate the axis error $\Delta\theta_m$ while superposing the superposed voltages. In that case, it is advisable that the γ-axis current $i_\gamma$ and δ-axis current $i_\delta$ from the coordinate converter 12 be subjected to high cut processing so that the values of the γ-axis current $i_\gamma$ and δ-axis current $i_\delta$ having the components of the superposed currents ($i_{h\gamma}$ and $i_{h\delta}$ described after the description of the seventh embodiment) removed from them are used to calculate the axis error $\Delta\theta_m$.

As described above, in low-speed rotation and at a standstill, low-speed control is performed based on superposed components so that $\Delta\theta$, which is the estimated axis error between the γ-axis and d-axis, converges to zero; in high-speed rotation, high-speed control is performed based on an induction voltage or the like so that $\Delta\theta_m$, which is the estimated axis error between the γ-axis and the dm-axis, converges to zero. Thus, it is possible to achieve satisfactory sensorless control in a wide range of speed. Furthermore, by performing high-speed control based on the dm-qm axes, it is possible, as described previously, to simplify the adjustment of parameters and reduce the load of calculation.

To achieve low-speed control, low-speed estimation processing based on the axis error $\Delta\theta$ is performed, and the estimated rotor position $\theta_e$ calculated based on the axis error $\Delta\theta$ represents the estimated value of the phase $\theta$ (estimated phase) of the d-axis relative to the U-phase armature winding fixed axis. To achieve high-speed control, high-speed estimation processing based on the axis error $\Delta\theta_m$ is performed, and the estimated rotor position $\theta_e$ calculated based on the axis error $\Delta\theta_m$ represents the estimated value of the phase ($\theta-\theta_m$) (estimated phase) of the dm-axis relative to the U-phase armature winding fixed axis. Which of these two types of estimation processing is performed is switched according to the speed information representing the rotation speed of the rotor.

Between low-speed control and high-speed control, the estimated axis differs; thus, switching between the different types of control needs to be done cleverly. In this embodiment, during a shift from low-speed control to high-speed control, and during a shift from high-speed control to low-speed control, weighted averaging is performed to perform estimation processing temporarily with consideration given to both of two estimated results (in this example, $\theta$ and $\theta_m$). This prevents the value based on which the estimated rotor position $\theta_e$ and the estimated motor speed $\omega_e$ are calculated from becoming discontinuous during switching, and thus ensures smooth switching.

Moreover, between control based on the d-q axes (low-speed control) and control based on the dm-qm axes (high-speed control), the γ-axis current to be fed to the motor 1 differs; thus, at switching between the different types of control, the specified γ-axis current value $i_\gamma$* needs to be changed appropriately. In this embodiment, during a shift from low-speed control to high-speed control, and during a shift from high-speed control to low-speed control, in coordination with the weighted averaging by the estimator, a weighted average of $i_{\gamma 1}$* and $i_{\gamma 2}$* is calculated as $i_\gamma$*. This prevents $i_\gamma$* from becoming discontinuous during switching, and thus ensures smooth switching; in addition, it makes high-efficiency operation possible even during switching.

Third Embodiment

The switching processor 203 shown in FIG. 15 may be made to function simply as a switch that switches between the first and second input values. Now, an example where the switching processor 203 is made to function as a switch will be described as a third embodiment of the invention. All the description of the second embodiment applies also to this embodiment unless inconsistent.

Figure 19:
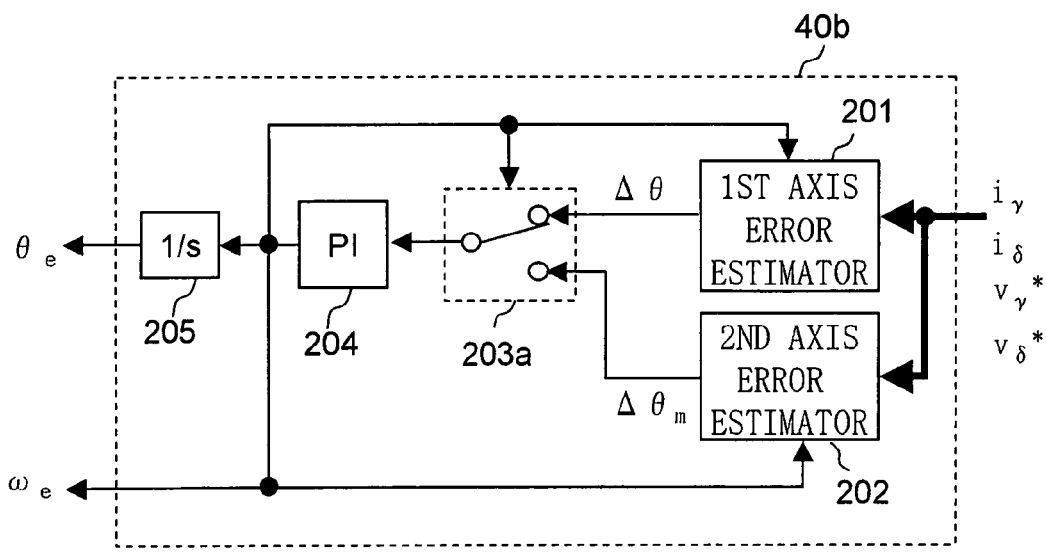
FIG. 19 is a modified internal block diagram showing the position/speed estimator shown in FIG. 15, according to a third embodiment of the invention.

FIG. 19 is an internal block diagram of the position/speed estimator 40b (hereinafter referred to simply as "the estimator 40b") according to the third embodiment. In the estimator 40b, the switching processor functions as a switch. The switching processor in the estimator 40b is called the switching processor 203a. The switching processor 203a provides an example of the configuration of the switching processor 203. The estimator 40b can be used as the estimator 40 shown in FIG. 14.

The estimator 40b shown in FIG. 19 differs from the estimator 40a shown in FIG. 15 in that the switching processor 203 in the latter is replaced with the switching processor 203a; in other respects, they are the same.

The switching processor 203a receives the axis error $\Delta\theta$ as a first input value and the axis error $\Delta\theta_m$ as a second input value; according to speed information representing the rotation speed of the rotor of the motor 1, the switching processor 203a outputs either the first input value or the second input value as an output value. Specifically, if the rotation speed represented by the speed information is lower than a predetermined threshold speed $V_{TH}$, the switching processor 203a outputs the first input value as the output value; if it is higher than the predetermined threshold speed $V_{TH}$, the switching processor 203a outputs the second input value as the output value. Used as the speed information by the switching processor 203a is the estimated motor speed $\omega_e$. Instead, the specified motor speed value ω* may be used as the speed information.

The threshold speed $V_{TH}$ is a rotation speed, for example, in the range from 10 rps (revolutions per second) to 30 rps.

Even when the axis error fed to the proportional-plus-integral calculator 204 is switched swiftly between $\Delta\theta$ and $\Delta\theta_m$ with the switching processor 203a, the estimated values of the motor speed and the rotor position only vary at a speed corresponding to the response of the PLL control using the proportional-plus-integral calculator 204, and therefore, even without weighted averaging processing or the like, the continuity of those estimated values is ensured.

The estimator 40b shown in FIG. 19 is used, for example, in combination with the magnetic flux controller 44a shown in FIG. 18. In a case where the axis error fed to the proportional-plus-integral calculator 204 is switched swiftly from $\Delta\theta$ to $\Delta\theta_m$, in consideration of the response of the above-mentioned PLL control, it is advisable that the specified $\gamma$-axis current value $i_\gamma^*$ be varied gradually from $i_{\gamma1}^*$ to $i_{\gamma2}^*$. The same applies in a case where the axis error fed to the proportional-plus-integral calculator 204 is switched swiftly from $\Delta\theta_m$ to $\Delta\theta$.

Switching Smoothing Processing $\alpha$: When the value fed to the proportional-plus-integral calculator 204 is switched from the output value of the first axis error estimator 201 to the output value of the second axis error estimator 202 in order to shift the control and estimation processing performed in the motor control device from low-speed control and low-speed estimation processing to high-speed control and high-speed estimation processing, the following processing (which will hereinafter be referred to as "switching smoothing processing $\alpha$") may be adopted. The time point at which the switching is made is represented by T1. For example, the time point at which the rotation speed represented by speed information turns from lower than the threshold speed $V_{TH}$ to higher than the threshold speed $V_{TH}$ is time point T1.

Figure 20:
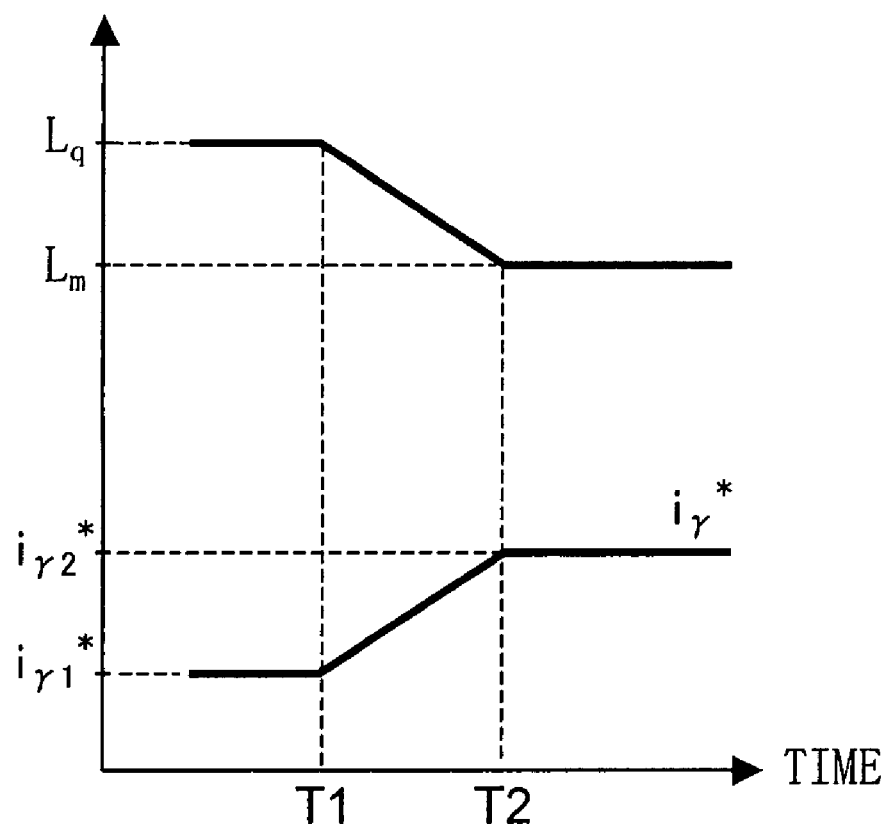
FIG. 20 is a diagram showing the operation of the position/speed estimator shown in FIG. 19.

With reference to FIG. 20, at the moment of the switching (i.e., at time point T1), the second axis error estimator 202 is made to estimate $\Delta\theta$. This is achieved by making the second axis error estimator 202 use, as the calculation parameter corresponding to the q-axis inductance, not $L_m$ but $L_q$.

After time point T1, the calculation parameter used, as corresponding to the q-axis inductance, to calculate the axis error is gradually decreased from $L_q$ toward $L_m$ such that, as time passes after time point T1, the output value of the second axis error estimator 202 varies from $\Delta\theta$ toward $\Delta\theta_m$. A predetermined time after time point T1, namely at time point T2, the calculation parameter corresponding to the q-axis inductance is made equal to $L_m$, and with this the switching to high-speed control (high-speed estimation processing) is completed.

For example, in a case where formula (A1) above is used, the second axis error estimator 202 operates as follows:
at time point T1, it calculates and outputs the axis error according to formula (A1) modified with $L_q$ substituting the $L_m$;
at time point T2, it calculates and outputs the axis error according to formula (A1) as it is; and
between time points T1 and T2, it calculates and outputs the axis error according to formula (A1) modified with "a value between $L_q$ and $L_m$" substituting the $L_m$.

When switching smoothing processing $\alpha$ is performed, it is advisable that, as shown in FIG. 20, $i_\gamma^*$ be increased gradually from $i_{\gamma1}^*$ toward $i_{\gamma2}^*$ in coordination with the variation of the calculation parameter corresponding to the q-axis inductance. Specifically, at time point T1, $i_\gamma^*$ is made equal to $i_{\gamma1}^*$; as time passes from time point T1 to time point T2, $i_\gamma^*$ is increased; and at time point T2 and thereafter, $i_\gamma^*$ is made equal to $i_{\gamma2}^*$.

The example above deals with a case where, in accordance with the time that has passed since the start of switching, the axis error estimated by the second axis error estimator 202 is shifted from $\Delta\theta$ to $\Delta\theta_m$. Instead, such a shift may be performed in accordance with speed information ($\omega^*$ or $\omega_e$) that represents the rotation speed of the rotor of the motor 1. Specifically, after time point T1, the calculation parameter used, as corresponding to the q-axis inductance, to calculate the axis error is gradually decreased from $L_q$ toward $L_m$ such that, as the rotation speed represented by the speed information increases, the output value of the second axis error estimator 202 varies from $\Delta\theta$ toward $\Delta\theta_m$. Then, when the rotation speed reaches a predetermined threshold speed, the calculation parameter is made equal to $L_m$, and with this the switching to high-speed control (high-speed estimation processing) is completed.

Also in this case, it is advisable that $i_\gamma^*$ be varied gradually from $i_{\gamma1}^*$ toward $i_{\gamma2}^*$ in coordination with the variation of the calculation parameter corresponding to the q-axis inductance (in other words, in coordination with the variation of the rotation speed). Specifically, at time point T1, $i_\gamma^*$ is made equal to $i_{\gamma1}^*$; after time point T1, as the rotation speed represented by the speed information increases, $i_\gamma^*$ is increased; then, when the calculation parameter reaches $L_m$, $i_\gamma^*$ is made to converge to $i_{\gamma2}^*$.

Incidentally, when switching from low-speed control to high-speed control is needed, the rotation speed usually increases. In case, however, the rotation speed represented by speed information decreases before switching to high-speed control is completed, it is possible, in addition to increasing the calculation parameter toward $L_q$, to decrease $i_\gamma^*$ toward $i_{\gamma1}^*$.

As described above, with switching smoothing processing $\alpha$, when switching of the actually performed control and estimation processing is performed from low-speed control and low-speed estimation processing to high-speed control and high-speed estimation processing, in accordance with the time (length of time) that has passed since the start of the switching, or in accordance with speed information, the calculation parameter for estimation is varied gradually from $L_q$ toward $L_m$ so that it eventually converges to $L_m$, when the desired switching is completed. Here, while the calculation parameter is being varied, based on the output value of the second axis error estimator 202, the estimated motor speed $\omega_e$ and the estimated rotor position $\theta_e$ during the variation of the calculation parameter are calculated; accordingly, $i_\gamma^*$ also is varied gradually. In this way, it is possible to achieve smooth switching of control while ensuring the continuity of the axis error and the $\gamma$-axis current.

Incidentally, when switching smoothing processing $\alpha$ is performed with the estimator 40b, the first axis error estimator 201 functions as a first estimation processor for calculating the value ($\Delta\theta$) for estimating the phase $\theta$ of the d-axis, and the second axis error estimator 202 functions as a second estimation processor for calculating the value ($\Delta\theta_m$) for estimating the phase ($\theta-\theta_m$) of the dm-axis.

Figure 21:
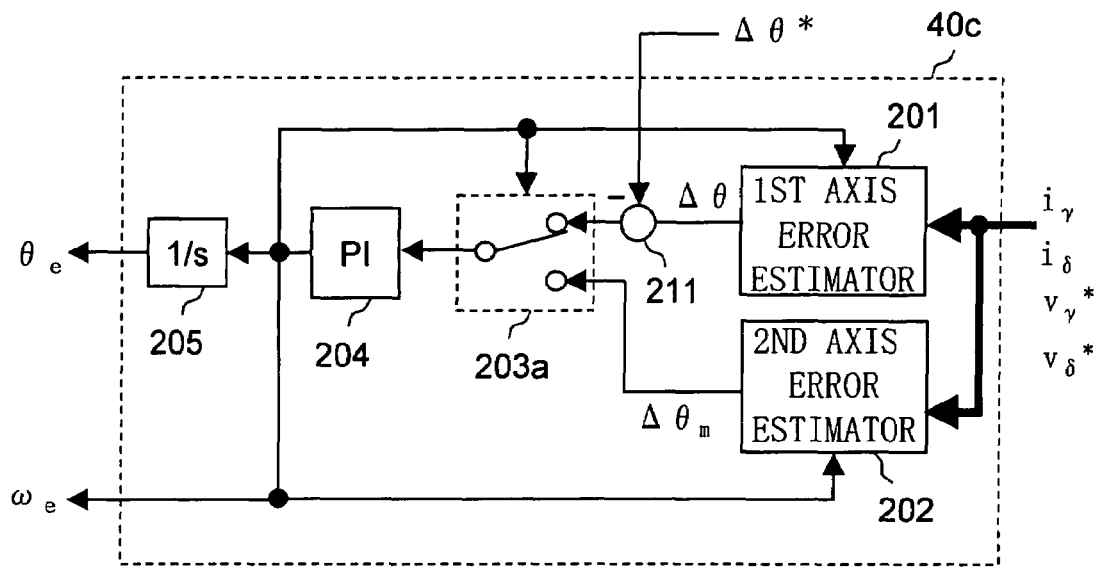
FIG. 21 is a modified internal block diagram showing the position/speed estimator shown in FIG. 15, according to the third embodiment of the invention.

Switching Smoothing Processing $\beta$: To achieve smooth switching of control, the estimator 40b shown in FIG. 19 may be modified as shown in FIG. 21. FIG. 21 is an internal block diagram of the position/speed estimator 40c (hereinafter referred to simply as "the estimator 40c") as such a modified example. The estimator 40c can be used as the estimator 40 shown in FIG. 14. The processing performed with the estimator 40c is called switching smoothing processing $\beta$.

The estimator 40c shown in FIG. 21 differs from the estimator 40b shown in FIG. 19 in that the former additionally includes a subtracter 211; in other respects, they are the same. Accordingly, no overlapping description regarding the common features will be repeated. Additionally including the subtracter 211, the estimator 40c operates in the following characteristic manner.

In the estimator 40c, the subtracter 211 subtracts the specified axis error value $\Delta\theta^*$ from the axis error $\Delta\theta$ calculated by the first axis error estimator 201, and outputs the result ($\Delta\theta-\Delta\theta^*$) of the subtraction. In the estimator 40c, the switching processor 203a receives the result ($\Delta\theta-\Delta\theta^*$) of the subtraction by the subtracter 211 as a first input value and the axis error $\Delta\theta_m$ as a second input value; according to speed information representing the rotation speed of the rotor of the motor 1, the switching processor 203a outputs either the first input value or the second input value as an output value. When low-speed control (low-speed estimation processing) is performed, the specified axis error value $\Delta\theta^*$ is set at zero. The second axis error estimator 202 in the estimator 40c, unlike that for switching smoothing processing $\alpha$ described above, always estimates and outputs $\Delta\theta_m$.

In the estimator 40c, when the value fed to the proportional-plus-integral calculator 204 is switched from the output value of the subtracter 211 to the output value of the second axis error estimator 202 in order to shift the control and estimation processing performed in the motor control device from low-speed control and low-speed estimation processing to high-speed control and high-speed estimation processing, before the switching, the specified axis error value $\Delta\theta^*$ is varied gradually from zero toward $\theta_m$. After the specified axis error value $\Delta\theta^*$ has converged to $\theta_m$, the value fed to the proportional-plus-integral calculator 204 is switched from the output value of the subtracter 211 to the output value of the second axis error estimator 202. When $\Delta\theta^*=\theta_m$, the output value of the subtracter 211 equals $\Delta\theta_m$.

As in switching smoothing processing $\alpha$, the specified axis error value $\Delta\theta^*$ is varied from zero to $\theta_m$ in accordance with the increase in the time that has passed since the start of the variation, or in accordance with the increase in the rotation speed represented by speed information.

Moreover, as the specified axis error value $\Delta\theta^*$ varies from zero to $\theta_m$, $i_\gamma^*$ also varies gradually from $i_{\gamma 1}^*$ to $i_{\gamma 2}^*$.

As described above, in the estimator 40c designed for switching smoothing processing $\beta$, before the value fed to the proportional-plus-integral calculator 204 is switched to the output value of the second axis error estimator 202, temporarily the output value ($\Delta\theta-\Delta\theta^*$) of the section composed of the first axis error estimator 201 and the subtracter 211 is made to converge to the output value $\Delta\theta_m$ of the second axis error estimator 202; after completion of the convergence of this value, the switching processor 203a actually performs switching; accordingly, $i_\gamma^*$ also is varied. In this way, it is possible to achieve smooth switching of control while ensuring the continuity of the axis error and the γ-axis current.

In the estimator 40c, the section composed of the first axis error estimator 201 and the subtracter 211 functions as a first estimation processor for calculating the value for estimating the phase θ of the d-axis, and the second axis error estimator 202 functions as a second estimation processor for calculating the value for estimating the phase ($\theta-\theta_m$) of the dm-axis.

The value of $\theta_m$, which is necessary to determine the specified axis error value $\Delta\theta^*$, is calculated by an unillustrated $\theta_m$ calculator provided within or outside the estimator 40c. Using the value of the δ-axis current $i_\delta$ outputted from the coordinate converter 12 shown in FIG. 14 as $i_\delta$ in formula (40) above, the $\theta_m$ calculator calculates $\theta_m$ according to formula (40) above. Here, table data containing different values of $\theta_m$ corresponding to different values of $i_\delta$ may be prepared beforehand so that an appropriate value of $\theta_m$ is obtained by referring to the table data whenever necessary.

Fourth Embodiment

The $i_\gamma$ switching controller 223 shown in FIG. 18 may be made to function simply as a switch that switches between the first and second input values. Now, an example where the $i_\gamma$ switching controller 223 is made to function as a switch will be described as a fourth embodiment of the invention.

Figure 22:
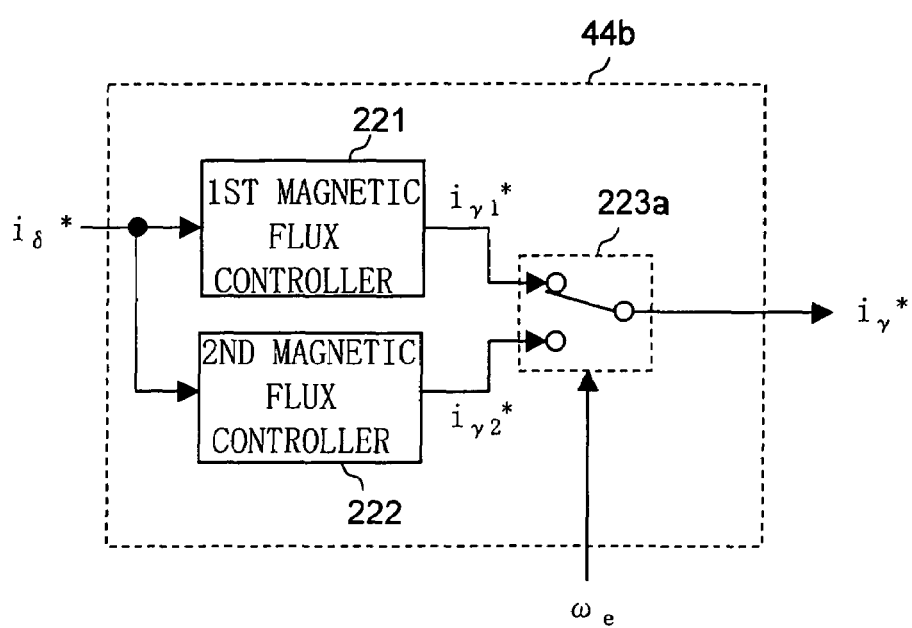
FIG. 22 is an internal block diagram of a magnetic flux controller usable as the magnetic flux controller shown in FIG. 14.

FIG. 22 is an internal block diagram of the magnetic flux controller 44b according to the fourth embodiment. In the magnetic flux controller 44b, the $i_\gamma$ switching processor functions as a switch. The $i_\gamma$ switching processor in the magnetic flux controller 44b is called the $i_\gamma$ switching processor 223a. The iγ switching processor 223a provides an example of the configuration of the $i_\gamma$ switching controller 223. The magnetic flux controller 44b can be used as the magnetic flux controller 44 shown in FIG. 14. The magnetic flux controller 44b may be used in combination with any of the second and third embodiments described above and the fifth and sixth embodiments described later.

The magnetic flux controller 44b shown in FIG. 22 differs from the magnetic flux controller 44a shown in FIG. 18 in that the $i_\gamma$ switching controller 223 in the latter is replaced with the $i_\gamma$ switching processor 223a; in other respects, they are the same.

The $i_\gamma$ switching processor 223a receives $i_{\gamma 1}^*$ as a first input value and $i_{\gamma 2}^*$ as a second input value; according to speed information representing the rotation speed of the rotor of the motor 1, the $i_\gamma$ switching processor 223a outputs either $i_{\gamma 1}^*$ or $i_{\gamma 2}^*$ as $i_\gamma^*$. Used as the speed information by the $i_\gamma$ switching processor 223a is the estimated motor speed $\omega_e$. Instead, the specified motor speed value $\omega^*$ may be used as the speed information.

Specifically, like the switching processor 203a shown in FIG. 19, the $i_\gamma$ switching processor 223a operates as follows: if the rotation speed represented by the speed information is lower than a predetermined threshold speed $V_{TH}$, the $i_\gamma$ switching processor 223a outputs $i_{\gamma 1}^*$—the first input value—as $i_\gamma^*$ and, if it is higher than the threshold speed $V_{TH}$, the $i_\gamma$ switching processor 223a outputs $i_{\gamma 2}^*$—the second input value—as $i_\gamma^*$.

Fifth Embodiment

In connection with the second (and third) embodiment, the estimator 40a (and also 40b and 40c) was described as the first configuration example of the estimator 40 shown in FIG. 14. In a fifth embodiment of the invention, a position/speed estimator 40d (hereinafter referred to simply as "the estimator 40d") will be described as a second configuration example of the estimator 40 shown in FIG. 14.

Figure 23:
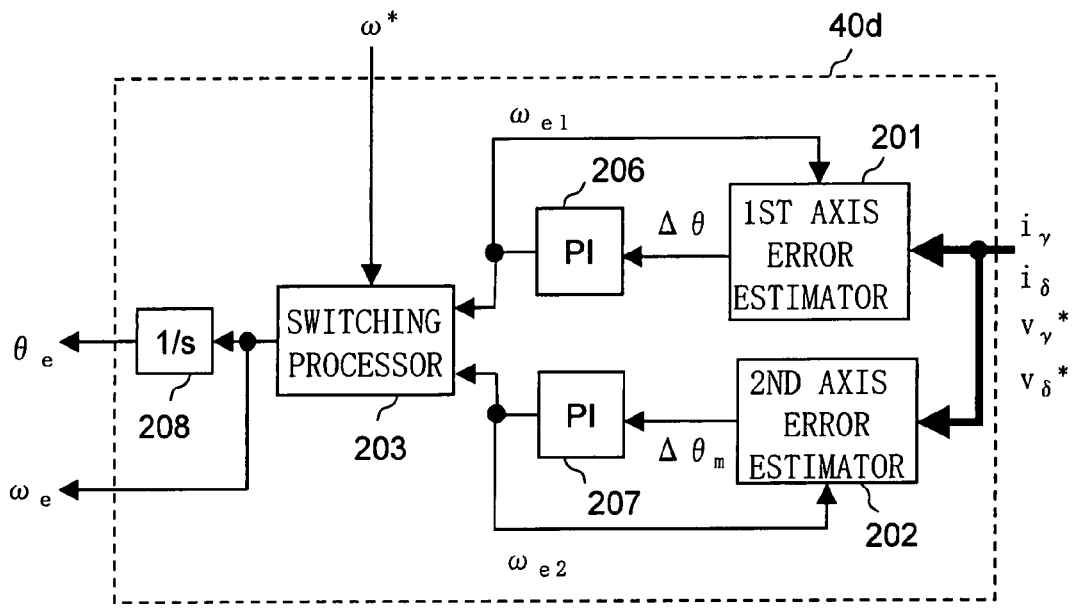
FIG. 23 is an internal block diagram of a position/speed estimator usable as the position/speed estimator shown in FIG. 14 (a second configuration example)

FIG. 23 is an internal block diagram of the estimator 40d. The estimator 40d can be used as the estimator 40 shown in FIG. 14.

The estimator 40d includes a first axis error estimator 201, a second axis error estimator 202, a switching processor 203, proportional-plus-integral calculators 206 and 207, and an integrator 208. The estimator 40d performs switching at the stage of the estimated speed.

The first axis error estimator 201 and the second axis error estimator 202 in the estimator 40d are similar to those in the estimator 40a shown in FIG. 15. The differences are: when calculating the axis error $\Delta\theta$, whenever necessary, the first axis error estimator 201 uses the output value of the proportional-plus-integral calculator 206 (the first candidate speed $\omega_{e1}$ described later) as the estimated motor speed $\omega_e$; likewise, when calculating the axis error $\Delta\theta_m$, whenever necessary, the second axis error estimator 202 uses the output value of the proportional-plus-integral calculator 207 (the second candidate speed $\omega_{e2}$ described later) as the estimated motor speed $\omega_e$.

To achieve a PLL, the proportional-plus-integral calculator 206 cooperates with different parts of the motor control device 3a to perform proportional-plus-integral control, and thereby calculates the estimated motor speed such that the axis error $\Delta\theta$ converges to zero. The estimated motor speed calculated by the proportional-plus-integral calculator 206 is outputted as the first candidate speed $\omega_{e1}$. The first candidate speed $\omega_{e1}$ corresponds to the estimated value of the rotation speed $\omega$ (the estimated rotation speed) of the d-q axes.

To achieve a PLL, the proportional-plus-integral calculator 207 cooperates with different parts of the motor control device 3a to perform proportional-plus-integral control, and thereby calculates the estimated motor speed such that the axis error $\Delta\theta_m$ converges to zero. The estimated motor speed calculated by the proportional-plus-integral calculator 207 is outputted as the second candidate speed $\omega_{e2}$. The second candidate speed $\omega_{e2}$ corresponds to the estimated value of the rotation speed (the estimated rotation speed) of the dm-qm axes.

The switching processor 203 in the estimator 40d is similar to that in the estimator 40a shown in FIG. 15, and may be a switch like the switching processor 203a shown in FIG. 19. The difference is that, in the estimator 40d, the first and second input values to the switching processor 203 are the first and second candidate speed $\omega_{e1}$ and $\omega_{e2}$, respectively. Thus, the switching processor 203 in the estimator 40d outputs the first candidate speed $\omega_{e1}$, the second candidate speed $\omega_{e2}$, or a weighted average of the two according to speed information representing the rotation speed of the rotor of the motor 1. As the speed information, it is advisable to use the specified motor speed value $\omega^*$. In the estimator 40d, the output value of the switching processor 203 is outputted as the estimated motor speed $\omega_e$.

The integrator 208 integrates the estimated motor speed $\omega_e$ outputted from the switching processor 203, and thereby calculates the estimated rotor position $\theta_e$. The estimated motor speed $\omega_e$ outputted from the switching processor 203 and the estimated rotor position $\theta_e$ outputted from the integrator 208 are, as the output values of the estimator 40d, fed to those parts of the motor control device 3a which require those values.

Sixth Embodiment

Next, a position/speed estimator 40e (hereinafter referred to simply as "the estimator 40e") as a third configuration example of the estimator 40 shown in FIG. 14 will be described as a sixth embodiment of the invention.

Figure 24:
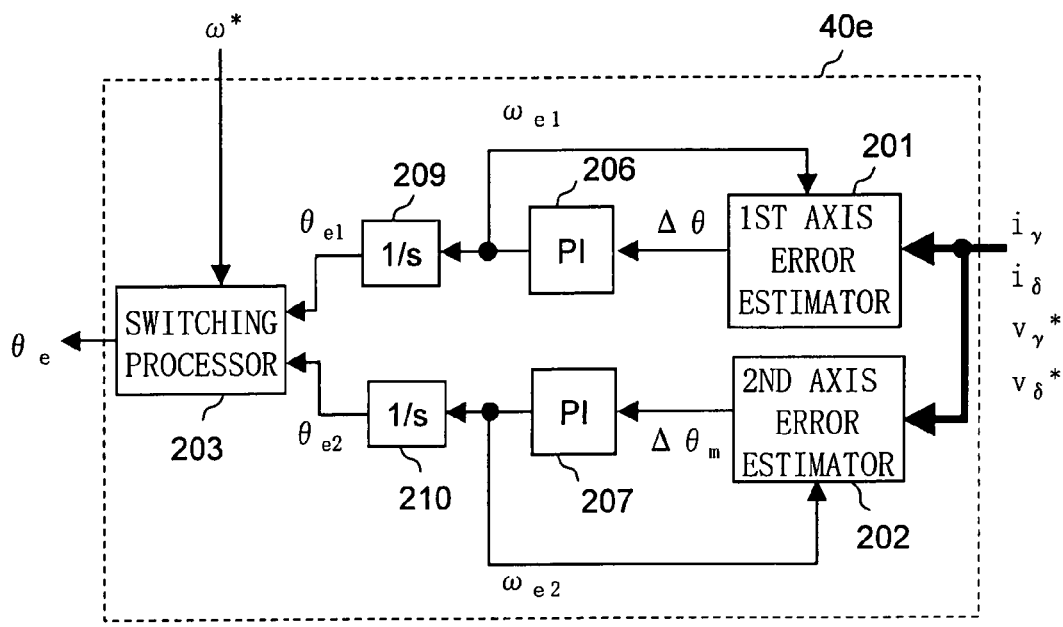
FIG. 24 is an internal block diagram of a position/speed estimator usable as the position/speed estimator shown in FIG. 14 (a third configuration example)

FIG. 24 is an internal block diagram of the estimator 40e. The estimator 40e can be used as the estimator 40 shown in FIG. 14.

The estimator 40e includes a first axis error estimator 201, a second axis error estimator 202, a switching processor 203, proportional-plus-integral calculators 206 and 207, and integrators 209 and 210. The estimator 40e performs switching at the stage of the estimated position.

The first axis error estimator 201, the second axis error estimator 202, and the proportional-plus-integral calculators 206 and 207 in the estimator 40e are similar to those in the estimator 40d shown in FIG. 23. The integrator 209 integrates the first candidate speed $\omega_{e1}$ outputted from the proportional-plus-integral calculator 206, and thereby calculates a first candidate position $\theta_{e1}$. The first candidate position $\theta_{e1}$ corresponds to the estimated value of the phase $\theta$ (the estimated phase) of the d-axis relative to the U-phase armature winding fixed axis. The integrator 210 integrates the second candidate speed $\omega_{e2}$ outputted from the proportional-plus-integral calculator 207, and thereby calculates a second candidate position $\theta_{e2}$. The second candidate position $\theta_{e2}$ corresponds to the estimated value of the phase $(\theta-\theta_m)$ (the estimated phase) of the dm-axis relative to the U-phase armature winding fixed axis.

The switching processor 203 in the estimator 40e is similar to that in the estimator 40a shown in FIG. 15, and may be a switch similar to the switching processor 203a shown in FIG. 19. The difference is that, in the estimator 40e, the first and second input values to the switching processor 203 are the first candidate positions $\theta_{e1}$ and $\theta_{e2}$, respectively. Thus, the switching processor 203 in the estimator 40e outputs the first candidate position $\theta_{e1}$, the second candidate position $\theta_{e2}$, or a weighted average of the two according to speed information representing the rotation speed of the rotor of the motor 1. As the speed information, it is advisable to use the specified motor speed value $\omega^*$. In the estimator 40e, the output value of the switching processor 203 is outputted as the estimated rotor position $\theta_e$.

The estimated rotor position $\theta_e$ outputted from the switching processor 203 is, as the output value of the estimator 40e, fed to those parts of the motor control device 3a which require that value. As necessary, the estimated rotor position $\theta_e$ outputted from the switching processor 203 may be differentiated to calculate the estimated motor speed $\omega_e$.

All the description of the estimators 40a, 40b, and 40c applies also to the estimators 40d and 40e unless inconsistent. The estimator 40d shown in FIG. 23 and the estimator 40e shown in FIG. 24 are used in combination with the magnetic flux controller 44a shown in FIG. 18 or the magnetic flux controller 44b shown in FIG. 22.

In a case where the switching processor 203 in the estimator 40d or 40e is made to function as a switch like the switching processor 203a shown in FIG. 19, switching smoothing processing a described above can be applied to the estimator 40d or 40e. Specifically, in the estimator 40d or 40e, immediately after the switching of the output value of the switching processor 203 from the first input value to the second input value, $L_q$ is used as the calculation parameter corresponding to the q-axis inductance to make the second axis error estimator 202 calculate the axis error $\Delta\theta$. Thereafter, as time passes, or with the increase in the rotation speed of the rotor represented by speed information, the calculation parameter is decreased gradually from $L_q$ toward $L_m$ until it eventually converges to $L_m$.

Moreover, in a case where the switching processor 203 in the estimator 40d or 40e is made to function as a switch like the switching processor 203a shown in FIG. 19, switching smoothing processing β described above corresponding to FIG. 21 can be applied to the estimator 40d or 40e. Specifically, in the estimator 40d or 40e, a subtracter like the subtracter 211 shown in FIG. 21 is provided between the first axis error estimator 201 and the proportional-plus-integral calculator 206, and the output value $(\Delta\theta-\Delta\theta^*)$ of the subtracter is fed to the proportional-plus-integral calculator 206. Then, before the switching of the output value of the switching processor 203 from the first input value to the second input value, temporarily the output value $(\Delta\theta-\Delta\theta^*)$ of the subtracter is made to converge toward the output value $\Delta\theta_m$ of the second axis error estimator 202; after completion of the convergence of this value, the switching processor 203 actually performs switching.

Configuring the estimator as in the fifth or sixth embodiment offers benefits similar to those obtained with the second or third embodiment.

Seventh Embodiment

In the motor control devices according to the second to sixth embodiments described above, in-low-speed rotation, control based on the d-q axes is performed. Instead of control based on the d-q axes, control based on the axes determined according to a specified speed may be performed. As an embodiment in which control based on the axes that match a specified speed is performed in low-speed rotation, a seventh embodiment of the invention will be described below.

Figure 25:
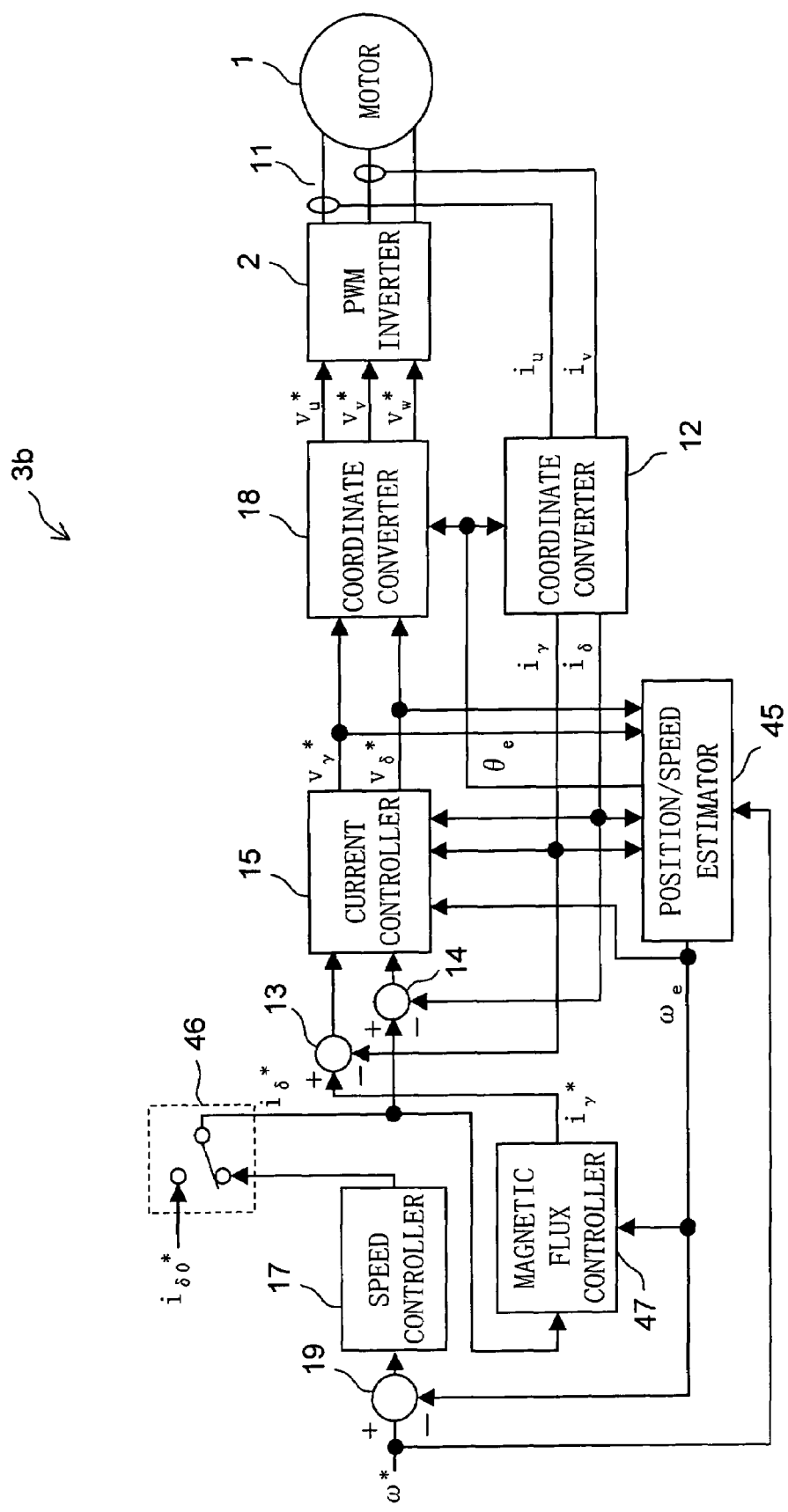
FIG. 25 is a block diagram showing an outline of the configuration of a motor drive system according to a seventh embodiment of the invention.

FIG. 25 is a configuration block diagram of a motor drive system according to the seventh embodiment. The motor drive system according to the seventh embodiment includes a motor 1, a PWM inverter 2, and a motor control device 3b. The motor control device 3b includes a current detector 11, a coordinate converter 12, a subtracter 13, a subtracter 14, a current controller 15, a magnetic flux controller 47, a speed controller 17, a coordinate converter 18, a subtracter 19, a position/speed estimator 45 (hereinafter referred to simply as "the estimator 45"), and a switch 46. These parts constituting the motor control device 3b can freely use, whenever necessary, any of the values generated within the motor control device 3b.

The motor drive system and the motor control device 3b shown in FIG. 25 differ from the motor drive system and the motor control device 3a shown in FIG. 14 in that the estimator 40 and the magnetic flux controller 44 in the latter are replaced with the estimator 45 and the magnetic flux controller 47 here, that the switch 46 is additionally provided here, and that the superposed voltage generator 41 and the adders 42 and 43 are omitted here; in other respects, they are the same. Accordingly, the following description proceeds with emphasis placed on the difference between the two, and no overlapping description will be repeated unless necessary.

In accordance with the above differences, the specified γ-axis voltage value $v_\gamma^*$ and specified δ-axis voltage value $v_\delta^*$ outputted from the current controller 15 are, as they are, fed to the coordinate converter 18 (i.e., with no superposed voltages superposed on them); moreover, the specified δ-axis current value calculated by the speed controller 17 is first fed to the switch 46.

In low-speed rotation, that is, for example, when the rotation speed of the rotor of the motor 1 as represented by the specified motor speed value ω* is lower than a predetermined threshold speed $V_{TH}$, the switch 46 feeds, as the specified δ-axis current value $i_\delta^*$, a predetermined specified low-speed δ-axis current value $i_{\delta O}^*$ fed from a CPU (unillustrated) or the like to the subtracter 14 and the magnetic flux controller 47. On the other hand, in high-speed rotation, that is, for example, when the rotation speed of the rotor of the motor 1 as represented by the specified motor speed value ω* is higher than the threshold speed $V_{TH}$, the switch 46 feeds, as the specified δ-axis current value $i_\delta^*$, the specified δ-axis current value calculated by the speed controller 17 to the subtracter 14 and the magnetic flux controller 47.

The subtracter 14 calculates the current error ($i_\delta^* - i_\delta$) between the specified δ-axis current value $i_\delta^*$ from the switch 46 and the δ-axis current $i_\delta$ from the coordinate converter 12, and feeds the result of the calculation to the current controller 15. The subtracter 13 calculates the current error ($i_\gamma^* - i_\gamma$) between the specified γ-axis current value $i_\gamma^*$ from the magnetic flux controller 47 and the γ-axis current $i_\gamma$ from the coordinate converter 12, and feeds the result of the calculation to the current controller 15.

Figure 26:
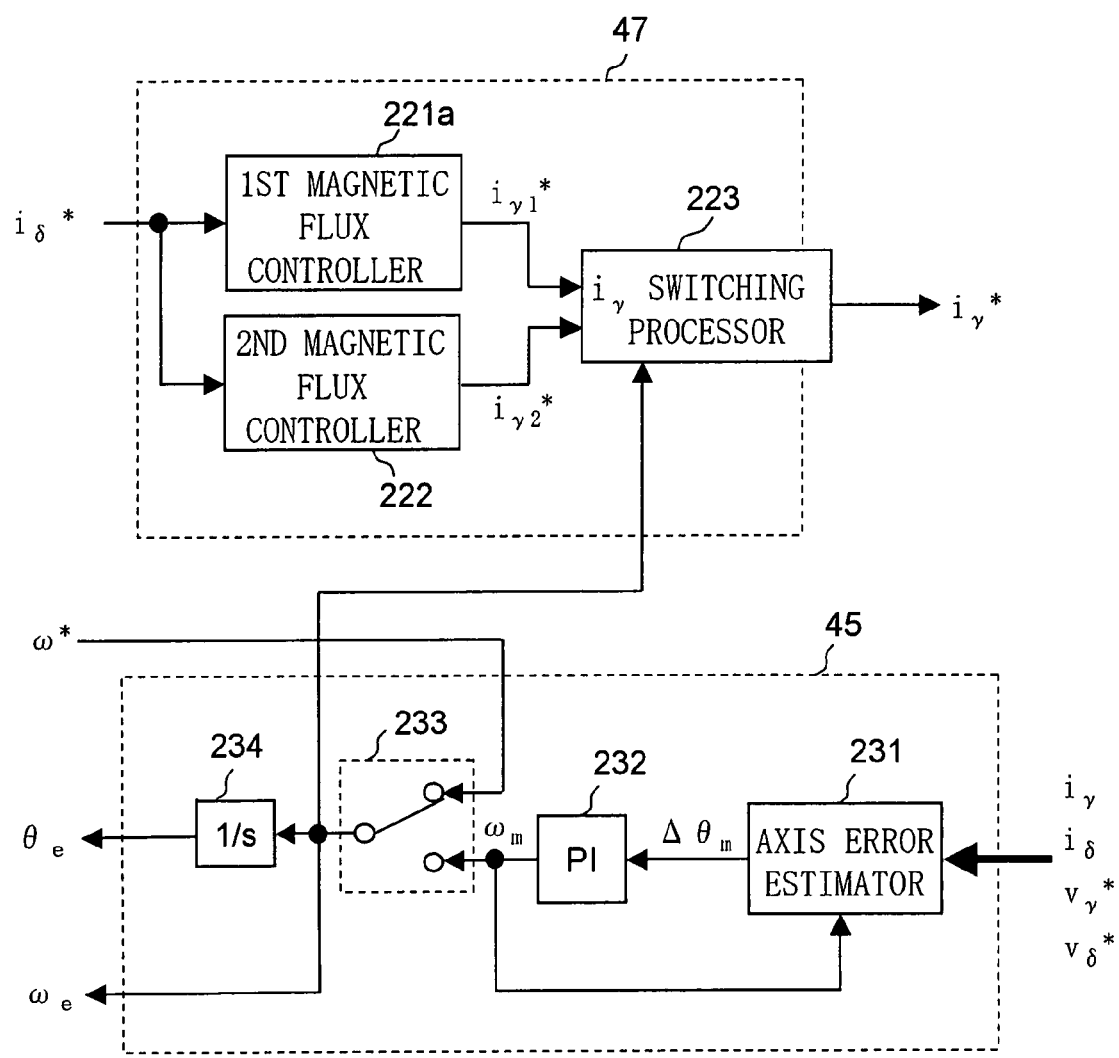
FIG. 26 is an internal block diagram of the position/speed estimator and the magnetic flux controller shown in FIG. 25.

FIG. 26 is an internal block diagram of the estimator 45 and the magnetic flux controller 47. The estimator 45 includes an axis error estimator 231, a proportional-plus-integral calculator 232, a switching processor 233, and an integrator 234.

The axis error estimator 231 is similar to the second axis error estimator 202 in FIG. 15; specifically, by use of all or part of the values of $v_\gamma^*$, $v_\delta^*$, $i_\gamma$, and $i_\delta$, and based on the induction voltage generated by the rotation of the rotor etc., the axis error estimator 231 estimates the axis error $\Delta\theta_m$ between the dm-axis and the γ-axis. Here, whenever necessary, the axis error estimator 231 uses the output value of the proportional-plus-integral calculator 232 (the value of the estimated dm-axis speed $\omega_m$ described later) as the estimated motor speed $\omega_e$. The axis error $\Delta\theta_m$ estimated by the axis error estimator 231 is fed to the proportional-plus-integral calculator 232, which functions as a speed estimator.

To achieve a PLL (phase-locked loop), the proportional-plus-integral calculator 232 cooperates with different parts of the motor control device 3b to perform proportional-plus-integral control, and thereby calculates the estimated dm-axis speed $\omega_m$ such that the axis error $\Delta\theta_m$ converges to zero. The estimated dm-axis speed $\omega_m$ corresponds to the estimated value of the rotation speed of the dm-qm axes.

The switching processor 233 is similar to the switching processor 203a in FIG. 19; specifically, according to speed information (ω* or $\omega_e$) representing the rotation speed of the rotor of the motor 1, the switching processor 233 outputs, as an output value, either the specified motor speed value ω*, which it receives as a first input value, or the estimated dm-axis speed $\omega_m$, which it receives as a second input value. More specifically, if the rotation speed represented by the speed information is lower than a predetermined threshold speed $V_{TH}$, the switching processor 233 outputs the first input value (ω*) as the output value; if it is higher than the threshold speed $V_{TH}$, the switching processor 233 outputs the second input value ($\omega_m$) as the output value. The output value of the switching processor 233 is dealt with as the estimated motor speed $\omega_e$.

The integrator 234 integrates the estimated motor speed $\omega_e$ outputted from the switching processor 233, and thereby calculates the estimated rotor position $\theta_e$. The estimated motor speed $\omega_e$ outputted from the switching processor 233 and the estimated rotor position $\theta_e$, outputted from the integrator 234 are, as the output values of the estimator 45, fed to those parts of the motor control device 3b which require those values.

As shown in FIG. 26, the magnetic flux controller 47 includes a first magnetic flux controller 221a, a second magnetic flux controller 222, and an $i_\gamma$ switching processor 223. The first magnetic flux controller 221a and the second magnetic flux controller 222 receive the specified δ-axis current value $i_\delta^*$ from the switch 46.

The first magnetic flux controller 221a outputs a specified γ-axis current value for achieving low-speed control. The specified γ-axis current value outputted from the first magnetic flux controller 221a is dealt with as one candidate of $i_\gamma^*$ to be outputted from the magnetic flux controller 47, and is represented by $i_{\gamma1}^*$.

The second magnetic flux controller 222 in FIG. 26 is similar to that in FIG. 18, and outputs a specified γ-axis current value for achieving a high-speed control. The specified γ-axis current value outputted from the second magnetic flux controller 222 is dealt with as another candidate of $i_\gamma^*$ to be outputted from the magnetic flux controller 47, and is represented by $i_{\gamma2}^*$. To achieve maximum torque control, $i_{\gamma2}^*$ is set at a predetermined value equal or close to zero irrespective of $i_\delta^*$.

The $i_\gamma$ switching processor 223 in FIG. 26 is similar to that in FIG. 18; according to speed information (ω* or $\omega_e$), the $i_\gamma$ switching processor 223 outputs, as $i_\gamma^*$, $i_{\gamma1}^*$ outputted from the first magnetic flux controller 221a, $i_{\gamma2}^*$ outputted from the second magnetic flux controller 222, or a weighted average of the two.

With the configuration described above, in high-speed rotation, the $\omega_e = \omega_m$ and in addition $i_\gamma^* = i_{\gamma2}^*$; thus, high-speed control based on the dm-qm axes is performed, and in addition the estimator 45 performs high-speed estimation processing for high-speed control. On the other hand, in low-speed rotation, $\omega_e = \omega^*$ and in addition $i_\gamma^* = i_{\gamma 1}^*$; thus, low-speed control based on the axes determined according to the specified speed ($\omega^*$) is performed, and in addition the estimator 45 performs low-speed estimation processing for low-speed control.

Figure 27:
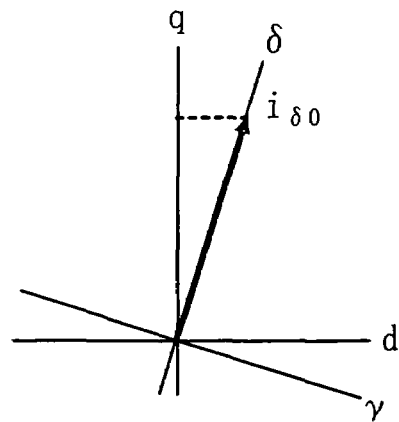
FIG. 27 is a diagram showing the current vector observed when low-speed control is performed in the motor control device shown in FIG. 25.

Now, the control axes ($\gamma$-$\delta$ axes) in low-speed control will be described. FIG. 27 shows the current vector on the rotating coordinate system as observed when $\omega_e = \omega^*$ and in addition $i_\gamma^* = i_{\gamma 1}^* = 0$. In this case, the direction of the current vector is parallel to the $\delta$-axis, and its magnitude is equal to the magnitude ($i_{\delta 0}$) of $i_{\delta 0}^*$. Operation is performed with the $\delta$-axis lagging behind the q-axis such that the torque generated by that current vector matches the load torque.

A complementary description of the state here will be given below. Consider a current vector having a fixed vector magnitude. When the load torque is smaller than the maximum torque that the current vector can generate, operation is performed with the $\delta$-axis lagging behind the q-axis such that the torque generated by the current vector matches the load torque (incidentally, if the load torque is larger than the maximum torque, synchronization failure occurs). Here, (1) the more the current vector lags behind the q-axis, the positive d-axis current increases, and the q-axis current decreases; thus the generated torque decreases;

(2) if the generated torque is larger than the load torque, the rotation speed of the rotor increases; thus, the lag of the $\delta$-axis relative to the q-axis tends to increase, and the generated torque decreases; and (3) by contrast, if the generated torque is smaller than the load torque, the rotation speed of the rotor decreases; thus, the lag of the $\delta$-axis relative to the q-axis tends to decrease, and the generated torque increases.

In this way, operation is performed with a phase difference (between the q-axis and $\delta$-axis) produced such that the load torque matches the generated torque.

Figure 28:
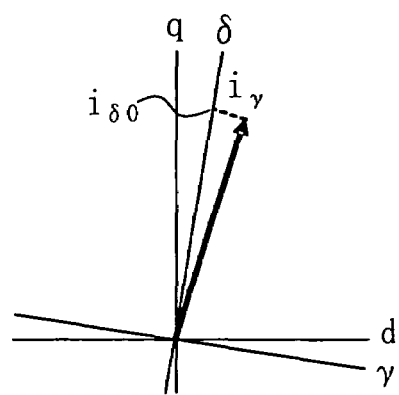
FIG. 28 is a diagram showing the current vector observed when low-speed control is performed in the motor control device shown in FIG. 25.

The value of $i_{\gamma 1}^*$ may be zero, or may be positive. It is known that, in a state where $\omega_e = \omega^*$, giving $i_\gamma^* (=i_{\gamma 1}^*)$ a positive value generates a torque that locks the d-axis onto the $\gamma$-axis and thereby helps achieve enhanced stability in low-speed rotation (e.g., see JP-A-H11-018499 and JP-A-2001-190099). FIG. 28 shows the current vector on the rotating coordinate system as observed when $i_\gamma^* (=i_{\gamma 1}^*)$ is given a positive value in a state where $\omega_e = \omega^*$.

In a case where $i_{\gamma 1}^*$ is given a positive value, it is advisable that, after the switching processor 233 switches $\omega_e$ from $\omega^*$ to the output value of the proportional-plus-integral calculator 232, $i_\gamma^*$ be shifted from $i_{\gamma 1}^*$ to $i_{\gamma 2}^*$. Moreover, the estimation of the dm-qm axes through calculation of $\Delta\theta_m$ and $\omega_m$ is started at the same time that the output value of the switching processor 233 shown in FIG. 26 is switched from $\omega^*$ to the output value of the proportional-plus-integral calculator 232. Here, it is advisable to appropriately initialize the value integrated through the proportional-plus-integral calculation in the proportional-plus-integral calculator 232 so that, immediately after the start of estimation, the initial value of the output value of the proportional-plus-integral calculator 232 equals $\omega^*$. Moreover, at the same time that the output value of the switching processor 233 is switched from $\omega^*$ to the output value of the proportional-plus-integral calculator 232, the switch 46 shown in FIG. 25 is so switched that $i_\delta^*$ to be fed to the subtracter 14 etc. is switched from $i_{\delta 0}^*$ to the output value of the speed controller 17. Here, it is advisable to appropriately initialize the value integrated through the proportional-plus-integral calculation in the speed controller 17 so that, immediately after the switching, the initial value of the output value of the speed controller 17 equals $i_{\delta 0}^*$.

Incidentally, in a case where $i_{\gamma 1}^* = i_{\gamma 2}^*$ as where $i_{\gamma 1}^*$ equals zero, the $i_\gamma$ switching processor 223 may be omitted from the magnetic flux controller 47 shown in FIG. 26 and instead either $i_{\gamma 1}^*$ or $i_{\gamma 2}^*$ is used as $i_\gamma^*$ all the time.

In the estimator 45 shown in FIG. 26, switching between control based on the dm-qm axes and control based on the axes determined according to a specified speed is performed at the stage of the estimated speed. Alternatively, this switching may be performed at the stage of the estimated position, just as the estimator 40*d* in FIG. 23 is modified to the estimator 40*e* in FIG. 24. Performing the switching at the stage of the estimated speed, however, offers the advantage that, as a result of the estimated value ($\theta_e$) of the rotor position being calculated through integrating calculation, the estimated value does not become discontinuous at switching. Thus, it is preferable to perform the switching at the stage of the estimated speed as in the estimator 45 shown in FIG. 26.

Configuring the motor control device as in this embodiment, too, permits proper switching between low-speed control and high-speed control, and offers benefits similar to those obtained with the second embodiment etc. Needless to say, as described previously, performing high-speed control based on the dm-qm axes helps simplify the adjustment of parameters and reduce the load of calculation.

Methods for Calculating the Axis Error $\Delta\theta$

Next, the method by which the first axis error estimator 201 shown in FIG. 15 etc. calculates the axis error $\Delta\theta$ will be described. As described earlier, there have conventionally been proposed many methods for estimating (calculating) the axis error $\Delta\theta$ based on high-frequency superposed components, and any such method may be used to calculate $\Delta\theta$. Here, as an example, one method proposed by the applicant of the present invention will be described.

Figure 29:
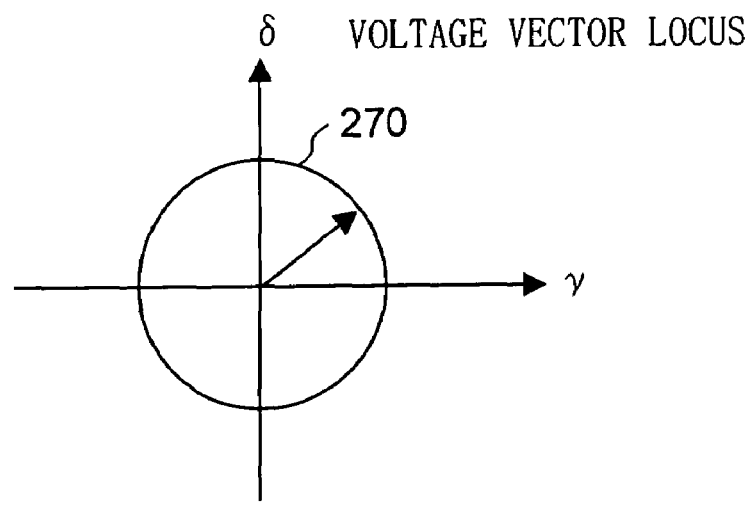
FIG. 29 is a diagram illustrating the method for calculating the axis error $\Delta\theta$ estimated by the first axis error estimator shown in FIG. 15, the diagram showing an example of the voltage vector locus of the superposed voltage generated by the superposed voltage generator shown in FIG. 14.

Now, consider a case where, as described in connection with the second embodiment, the superposed voltages generated by the superposed voltage generator 41 in FIG. 14 form a rotating voltage. In this case, on the $\gamma$-$\delta$ axes, the voltage vector locus of the superposed voltages describes a circle like the voltage vector locus 270 in FIG. 29. In a case where the superposed voltages are three-phase balanced voltages, their voltage vector describes, on the $\gamma$-$\delta$ axes, a perfect circle having its center at the origin, like the voltage vector locus 270. Since this rotating voltage (formed by the superposed voltages) is a high-frequency voltage that is not synchronous with the motor 1, application of that rotating voltage to the motor 1 does not cause it to rotate.

Figure 30:
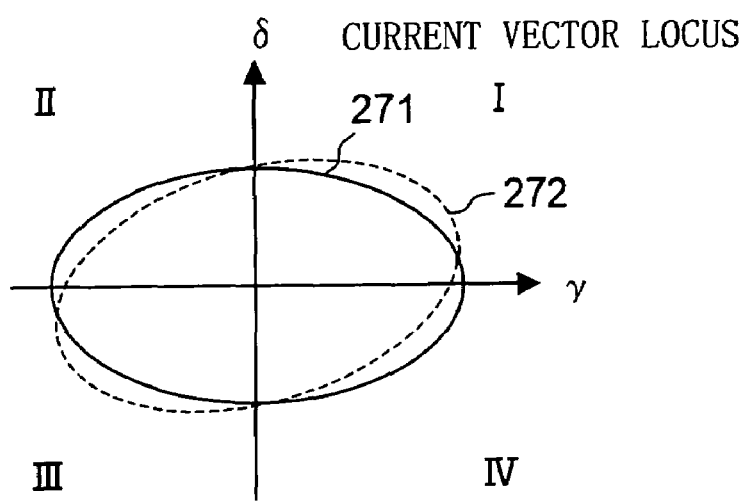
FIG. 30 is a diagram showing the current vector locus of the superposed current that flows through the motor as the result of the superposition of the superposed voltage shown in FIG. 29.

When the motor 1 is an interior permanent magnet synchronous motor or the like and $L_d < L_q$ holds, the current vector locus of the superposed currents that are made to flow through the motor 1 by the superposed voltages describing the voltage vector locus 270 describe, on the $\gamma$-$\delta$ axes, an ellipse having its center at the origin, having its major axis on the $\gamma$-axis, and having its minor axis on the $\delta$-axis, like the current vector locus 271 shown in FIG. 30. Here, the current vector locus 271 is one observed when the axis error $\Delta\theta$ between the d-axis and $\gamma$-axis is zero. When the axis error $\Delta\theta$ is non-zero, the current vector locus of the superposed currents describes an ellipse like the current vector locus 272, and its major axis does not coincide with the $\gamma$-axis. That is, when the axis error $\Delta\theta$ is non-zero, on the $\gamma$-$\delta$ axes, the current vector locus 271 tilts about the origin to describe the current vector locus 272 instead.

Let the $\gamma$-axis component and $\delta$-axis component of the superposed currents be referred to as the $\gamma$-axis superposed current $i_{h\gamma}$ and the $\delta$-axis superposed current $i_{h\delta}$, respectively. Then, their arithmetic product ($i_{h\gamma} \times i_{h\delta}$) contains a direct-current component that depends on the tilt of the ellipse described by the current vector locus 272. The arithmetic product ($i_{h\gamma} \times i_{h\delta}$) has a positive value in the first and third quadrants of the current vector locus, and has a negative value in the second and fourth quadrants of the current vector locus. Thus, when the ellipse is not tilted (as with the current vector locus 271), no direct-current component is contained; when the ellipse is tilted (as with the current vector locus 272), a direct-current component is contained. In FIG. 30, the symbols I, II, III, and IV represent the first, second, third, and fourth quadrants on the γ-δ axes.

Figure 31:
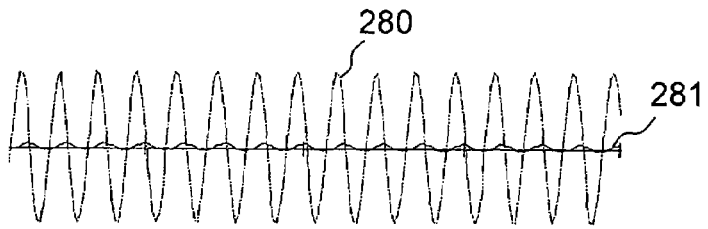
FIG. 31 is a diagram showing the arithmetic product, along with its direct-current component, of the γ-axis component and δ-axis component of the superposed current that flows through the motor as the result of the superposition of the superposed voltage shown in FIG. 29.
Figure 32:
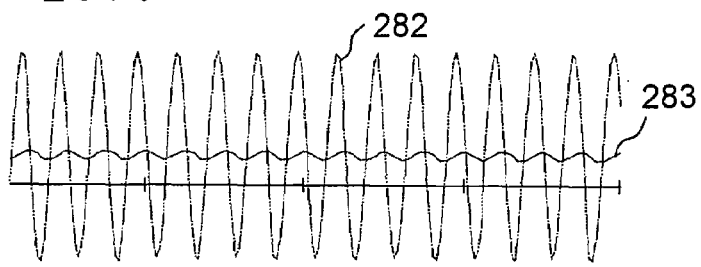
FIG. 32 is a diagram showing the arithmetic product, along with its direct-current component, of the γ-axis component and δ-axis component of the superposed current that flows through the motor as the result of the superposition of the superposed voltage shown in FIG. 29.

In FIG. 31, along the horizontal axis representing the lapse of time, the arithmetic product ($i_{h\gamma} \times i_{h\delta}$) and the direct-current component contained in it as observed when the axis error Δθ is zero are represented by curves 280 and 281, respectively. In FIG. 32, along the horizontal axis representing the lapse of time, the arithmetic product ($i_{h\gamma} \times i_{h\delta}$) and the direct-current component contained in it as observed when the axis error Δθ is non-zero are represented by curves 282 and 283, respectively. As will be understood from FIGS. 31 and 32, the direct-current component contained in the arithmetic product ($i_{h\gamma} \times i_{h\delta}$) is zero when Δθ=0°, and is non-zero when Δθ≠0°. Moreover, this direct-current component increases as the magnitude of the axis error Δθ increases (it is largely proportional to the axis error Δθ). Thus, controlling the direct-current component such that it converges to zero makes the axis error Δθ converge to zero.

Figure 33:
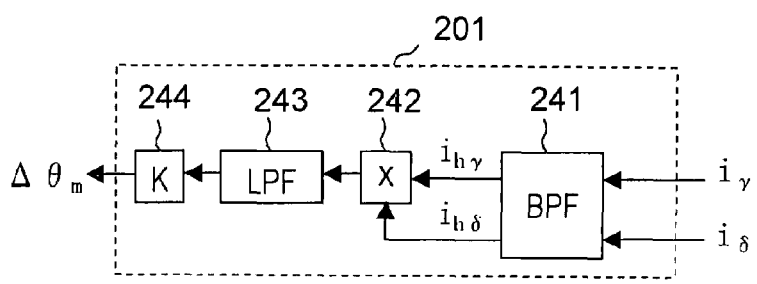
FIG. 33 is an internal block diagram of the first axis error estimator shown in FIG. 15.

This is exploited by the first axis error estimator 201 shown in FIG. 15 etc. to estimate the axis error Δθ. FIG. 33 shows an internal block diagram of the first axis error estimator 201. The first axis error estimator 201 shown in FIG. 33 includes a BPF (band-pass filter) 241, a multiplier 242, an LPF (low-pass filter) 243, and a coefficient multiplier 244. Now, let the frequency of the superposed voltages $v_{h\gamma}^*$ and $v_{h\delta}^*$ (the electrical angular velocity on the γ-δ axes) be $\omega_h$.

The BPF 241 extracts the $\omega_h$ frequency components from the γ-axis current $i_\gamma$ and δ-axis current $i_\delta$, and outputs the γ-axis superposed current $i_{h\gamma}$ and δ-axis superposed current $i_{h\delta}$. The BPF 241 is a band-pass filter that receives $i_\gamma$ and $i_\delta$ as its input signals and whose pass band includes the frequency of $\omega_h$, with the center frequency of the pass band typically set at $\omega_h$. The BPF 241 eliminates the drive current frequency components.

The multiplier 242 calculates the arithmetic product of $i_{h\gamma}$ and $i_{h\delta}$, and the LPF 243 extracts the direct-current component of the arithmetic product ($i_{h\gamma} \times i_{h\delta}$). The coefficient multiplier 244 multiplies the direct-current component extracted by the LPF 243 by a coefficient of proportionality K, and calculates and outputs the result of the multiplication as the axis error Δθ.

The above description deals with a case where the superposed voltages form a rotating voltage whose voltage vector locus on the γ-δ axes describes a perfect circle; instead, the voltage vector locus may describe an ellipse having its minor or major axis on the γ-axis, or a line on the γ-axis or δ-axis (i.e., the superposed voltages may form an alternating voltage), or a rectangular having its center at the origin.

Methods for Calculating the Axis Error $\Delta\theta_m$

Next, the method by which the second axis error estimator 202 in FIG. 15 etc. and the axis error estimator 231 in FIG. 26 calculate the axis error $\Delta\theta_m$ will be described. There are various methods applicable for calculating the axis error $\Delta\theta_m$. As examples of different methods for calculating the axis error $\Delta\theta_m$, a first to a fifth calculating method will be presented below.

It should be understood that, when the formulae noted below in connection with the first to fifth calculation methods are used in practice, the values of $v_\gamma^*$, $v_\delta^*$, and $\omega_e$, are used as the values of $v_\gamma$, $v_\delta$, and $\omega$, respectively, in the formulae. It should also be understood that any description given in conjunction with a given calculation method (e.g., how to determine the value of $L_m$) is applicable to all the calculation methods.

First Calculation Method: First, a first calculation method for calculating the axis error $\Delta\theta_m$ will be described. In the first calculation method, the induction voltage vector $E_{ex}$ appearing in the motor 1 is considered to be broken down into an induction voltage vector on the qm-axis and an induction voltage vector on the dm-axis. Then, by using the induction voltage vector $E_{exm}$ ($\approx E_m$; see FIG. 12), which is the induction voltage vector on the qm-axis, the axis error $\Delta\theta_m$ is calculated, and thereby the phase ($\theta_e$) of the γ-axis, which is an axis estimated for control purposes, is calculated (i.e., the rotor position is estimated).

Let the γ-axis component and δ-axis component of the induction voltage vector $E_{exm}$ be $E_{exm\gamma}$ and $E_{exm\delta}$, respectively. Then, as will be clear from FIG. 12, $\Delta\theta_m = \tan^{-1}(-E_{exm\gamma}/E_{exm\delta})$ holds. Then, by use of the result of rearrangement of the first and second rows of the matrix formula (38) above, $\Delta\theta_m$ is given by formula (41) below (provided that the third term of the right side of matrix formula (38) is ignored). In formula (41), it is assumed that $\Delta\theta_m$ is small, and eventually an approximation is used such that $\tan^{-}(-E_{exm\gamma}/E_{exm\delta}) \approx (-E_{exm\gamma}/E_{exm\delta})$.

$$\Delta\theta_m = \tan^{-1} \frac{-E_{exm\gamma}}{E_{exm\delta}} \quad (41)$$
$$= \tan^{-1} \frac{-(v_\gamma - (R_a + pL_d)i_\gamma + \omega L_m i_\delta)}{v_\delta - (R_a + pL_d)i_\delta - \omega L_m i_\gamma}$$
$$\approx -\frac{v_\gamma - (R_a + pL_d)i_\gamma + \omega L_m i_\delta}{v_\delta - (R_a + pL_d)i_\delta - \omega L_m i_\gamma}$$

When $\Delta\theta_m$ is calculated according to formula (41), the differential terms $pL_d i_\gamma$ and $pL_d i_\delta$ can be ignored. To calculate the value of $L_m$, which is necessary to calculate $\Delta\theta_m$, formula (42) below is used. Formula (42) is obtained by substituting $i_{dm}=0$ and formulae (43) and (44) below in formula (32) above, then solving the resulting formula with respect to $L_{q1}$, and then using the result.

$$L_m = L_q + L_{q1} \quad (42)$$
$$= L_q + \frac{i_d \{\Phi_a + (L_d - L_q)i_d\}}{i_d^2 + i_q^2}$$

$$i_{qm} = \sqrt{i_d^2 + i_q^2} \quad (43)$$

$$\sin\theta_m = \frac{i_d}{\sqrt{i_d^2 + i_q^2}} \quad (44)$$

Furthermore, rearranging formula (42) above by using formula (45), which gives the d-axis current $i_d$ that achieves maximum torque control, and formula (43), which expresses the relationship among $i_d$, $i_q$, and $i_{qm}$, gives $L_m$ as a function of $i_{qm}$ (i.e., $i_d$ and $i_q$ are removed from the formula for calculating $L_m$). Thus, by assuming that $i_\delta \approx i_{qm}$, the second axis error estimator 202 etc. can calculate, based on $i_\delta$, the value of $L_m$, which is now expressed as a function of $i_{qm}$. Then, by use of the value of $L_m$ thus calculated, the axis error $\Delta\theta_m$ is calculated according to formula (41).

$$i_d = \frac{\Phi_a}{2(L_q - L_d)} - \sqrt{\frac{\Phi_a^2}{4(L_q - L_d)^2} + i_q^2} \qquad (45)$$

Alternatively, assuming that $i_\delta \approx i_{qm}$, the value of $L_m$ may be calculated according to an approximation formula that gives $L_m$ as a function of $i_\delta$. Alternatively, table data containing different values of $L_m$ corresponding to different values of $i_\delta$ may be prepared beforehand so that an appropriate value of $L_m$ is obtained by referring to the table data whenever necessary.

Figure 34:
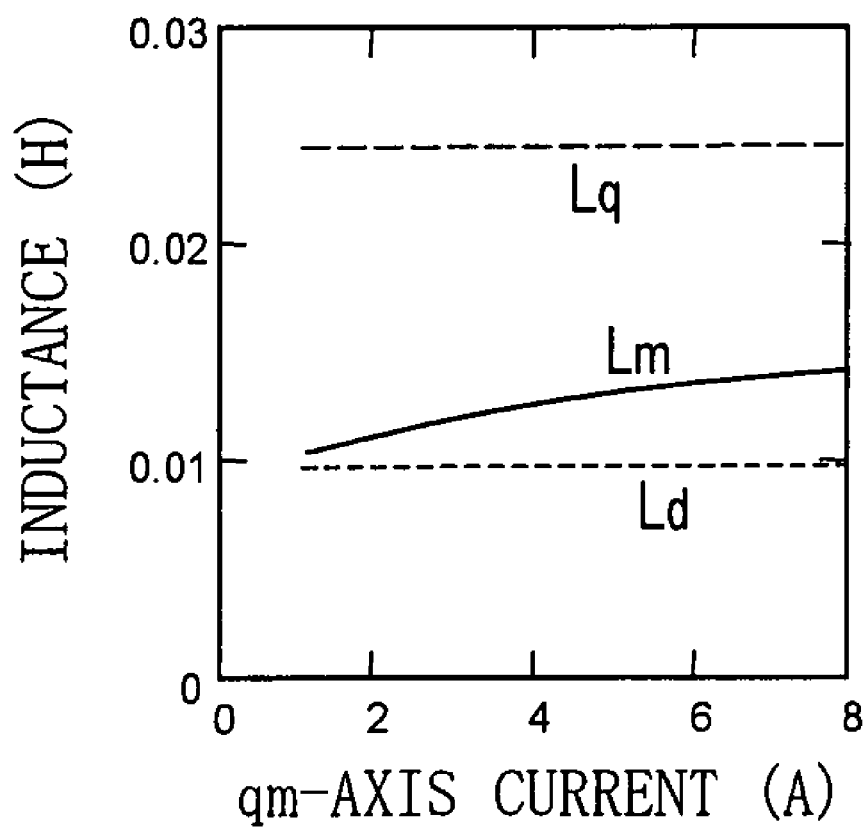
FIG. 34 is a graph showing the qm-axis current dependence of the inductances in the second and other embodiments of the invention.

FIG. 34 is a graph showing the dependence of $L_d$, $L_q$, and $L_m$ on $i_{qm}$ in a certain numerical example (assuming that $i_\gamma^* \approx 0$). As shown in FIG. 34, the value of $L_m$ depends on $i_{qm}$, and increases as $i_{qm}$ increases. Here, $L_m$ corresponds to the calculation parameter L in the first embodiment; like L, the value of $L_m$ that achieves maximum torque control falls notably closer to $L_d$ than to $L_q$ (see also FIGS. 5 and 7).

As in the first embodiment, the value of $L_m$ is eventually so determined as to fulfill formula (46) or (47) below. In this way, as in the first embodiment, the motor control device 3a shown in FIG. 14 etc. achieve control approximate to maximum torque control by intentionally producing a deviation between the d-axis and γ-axis and in addition making $i_\gamma^* \approx 0$.

$$L_d \leq L_m < L_q \qquad (46)$$

$$L_d \leq L_m < (L_d + L_q)/2 \qquad (47)$$

Figure 35:
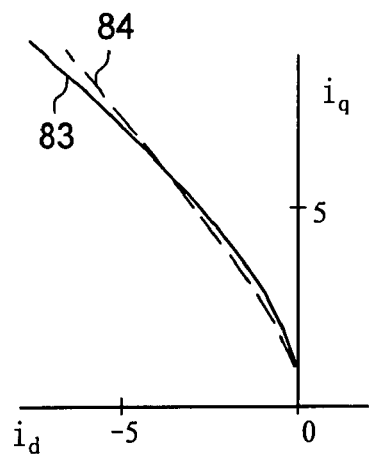
FIG. 35 is a diagram showing a comparison between ideal maximum torque control and the control (high-speed control) in the motor drive system according to the second and other embodiments of the invention.

$L_m$ may have a fixed value. Specifically, $L_m$ may be given a value that remains fixed irrespective of the value of $i_\delta$. In FIG. 35, a solid line 83 represents the relationship between the d-axis current $i_d$ and the q-axis current $i_q$ as observed when $L_m$ is given a predetermined fixed value; a broken line 84 represents the relationship between the d-axis current $i_d$ and the q-axis current $i_q$ as observed when maximum torque control is performed in an ideal fashion. As will be understood from FIG. 35, the curves of the solid line 83 and the broken line 84 are very similar.

Second Calculation Method: Next, a second calculation method for calculating $\Delta\theta_m$ will be described. As in the first calculation method described above, also in the second calculation method, the axis error $\Delta\theta_m$ is calculated by use of the induction voltage vector $E_{exm}$, and thereby the phase $(\theta_e)$ of the γ-axis, which is an axis estimated for control purposes, is calculated (i.e., the rotor position is estimated). The difference is that the second calculation method does not use the δ-axis component $E_{exm\delta}$ of the induction voltage vector $E_{exm}$. Specifically, the axis error $\Delta\theta_m$ is calculated according to formula (48) below. In formula (48), it is assumed that $\Delta\theta_m$ is small, and eventually an approximation is used such that $\sin^{-1}(-E_{exm\gamma}/E_{exm}) \approx (-E_{exm\gamma}/E_{exm})$.

$$\Delta\theta_m = \sin^{-1}\left(\frac{-E_{exm\gamma}}{E_{exm}}\right) \qquad (48)$$

$$= \sin^{-1}\frac{-(v_\gamma - (R_a + pL_d)i_\gamma + \omega L_m i_\delta)}{E_{exm}}$$

$$\approx \frac{v_\gamma - (R_a + pL_d)i_\gamma + \omega L_m i_\delta}{E_{exm}}$$

When $\Delta\theta_m$ is calculated according to formula (48), the differential term $p\, L_d i_\gamma$ can be ignored. The value of $L_m$ is determined in the same manner as in the first calculation method described above.

$E_{exm}$ in formula (48) is calculated according to formula (39) above. As an approximation formula for calculating $E_{exm}$, it is possible to use, for example, formula (49), (50), or (51) below. Formula (49) approximates formula (37) by use of the approximations "$p\, \Delta\theta_m \approx 0$, $i_{dm} \approx 0$, and $(L_d - L_q)(p\, i_q) \approx 0$". Formula (50) further approximates formula (49) by use of the approximation "$\cos\theta_m \approx 1$". Formula (51) further approximates formula (50) by use of the approximation "$(L_d - L_q)i\delta \sin\theta_m \ll \Phi_a$". When formulae (49), (50), and (51) are used, $\omega_e$ is used as the value of ω.

$$E_{exm} \approx \omega((L_d - L_q)i_\delta \sin\theta_m + \Phi_a)\cos\theta_m \qquad (49)$$

$$E_{exm} \approx \omega((L_d - L_q)i_\delta \sin\theta_m + \Phi_a) \qquad (50)$$

$$E_{exm} \approx \omega\Phi_a \qquad (51)$$

To calculate $\theta_m$ appearing in formula (49) etc., formula (40) above is used. As will be understood from formula (40), $\theta_m$ is a function of $i_\delta$, and thus $E_{exm}$ also is a function of $i_\delta$. Since the calculation of $E_{exm}$ is complicated, it is preferable to use an appropriate approximation formula to calculate it. Alternatively, table data containing different values of $E_{exm}$ corresponding to different values of $i_\delta$ may be prepared beforehand so that an appropriate value of $E_{exm}$ is obtained by referring to the table data whenever necessary.

Third Calculation Method: Next, a third calculation method for calculating the axis error $\Delta\theta_m$ will be described. In the third calculation method, the flux linkage $\Phi_{ex}$ around the armature winding of the motor 1 is considered to be broken down into a flux linkage vector on the qm-axis and a flux linkage vector on the dm-axis. Then, by using the $\Phi_{exm}(\approx \Phi_m$; see FIG. 12), which is the flux linkage vector on the dm-axis, the axis error $\Delta\theta_m$ is calculated, and thereby the phase $(\theta_e)$ of the γ-axis, which is an axis estimated for control purposes, is calculated (i.e., the rotor position is estimated).

Let the γ-axis component and δ-axis component of the flux linkage vector $\Phi_{exm}$ be $\Phi_{exm\gamma}$ and $\Phi_{exm\delta}$, respectively. Then, as will be clear from FIG. 12, $\Delta\theta_m = \tan^{-1}(-\Phi_{exm\delta}/\Phi_{exm\gamma})$ holds. Since $\Phi_{exm}$ equals $E_{exm}$ divided by ω, $\Delta\theta_m$ is given by formula (52) below. In formula (52), it is assumed that $\Delta\theta_m$ is small, and eventually an approximation is used such that $\tan^{-1}(-\Phi_{exm\delta}/\Phi_{exm\gamma}) \approx (-\Phi_{exm\delta}/\Phi_{exm\gamma})$.

$$\Delta\theta_m = \tan^{-1}\frac{-\Phi_{exm\delta}}{\Phi_{exm\gamma}} \qquad (52)$$

$$= \tan^{-1}\frac{-\left(\frac{v_\gamma - (R_a + pL_d)i_\gamma}{\omega} + L_m i_\delta\right)}{\frac{v_\delta - (R_a + pL_d)i_\delta}{\omega} - L_m i_\gamma}$$

$$\approx -\frac{\frac{v_\gamma - (R_a + pL_d)i_\gamma}{\omega} + L_m i_\delta}{\frac{v_\delta - (R_a + pL_d)i_\delta}{\omega} - L_m i_\gamma}$$

When $\Delta\theta_m$ is calculated according to formula (52), the differential terms $p\, L_d i_\gamma$ and $p\, L_d i_\delta$ can be ignored. The value of $L_m$ is determined in the same manner as in the first calculation method described above.

Fourth Calculation Method: Next, a fourth calculation method for calculating the axis error $\Delta\theta_m$ will be described. As in the third calculation method described above, also in the fourth calculation method, the axis error $\Delta\theta_m$ is calculated by use of the flux linkage vector $\Phi_{exm}$, and thereby the phase ($\theta_e$) of the γ-axis, which is an axis estimated for control purposes, is calculated (i.e., the rotor position is estimated). The difference is that the fourth calculation method does not use the γ-axis component $\Phi_{exm\gamma}$ of the flux linkage vector $\Phi_{exm}$. Specifically, the axis error $\Delta\theta_m$ is calculated according to formula (53) below. In formula (53), it is assumed that $\Delta\theta_m$ is small, and eventually an approximation is used such that $\sin^{-1}(-\Phi_{exm\delta}/\Phi_{exm}) \approx (-\Phi_{exm\delta}/\Phi_{exm})$.

$$\Delta\theta_m = \sin^{-1}\left(\frac{-\Phi_{exm\delta}}{\Phi_{exm}}\right) \quad (53)$$

$$= \sin^{-1}\frac{-\left(\frac{v_\gamma - (R_a + pL_d)i_\gamma}{\omega} + L_m i_\delta\right)}{\Phi_{exm}}$$

$$\approx \frac{-\left(\frac{v_\gamma - (R_a + pL_d)i_\gamma}{\omega} + L_m i_\delta\right)}{\Phi_{exm}}$$

When $\Delta\theta_m$ is calculated according to formula (53), the differential term $p\,L_d i_\gamma$ can be ignored. The value of $L_m$ is determined in the same manner as in the first calculation method described above.

$\Phi_{exm}$ in formula (53) is calculated according to the formula obtained by dividing both sides of formula (39) by ω. As an approximation formula for calculating $\Phi_{exm}$, it is possible to use, for example, formula (54), (55), or (56). Formulae (54), (55), or (56) are obtained by dividing both sides of formulae (49), (50), and (51), respectively, by ω. When formulae (54), (55), or (56) are used, $\omega_e$ is used as the value of ω.

$$\Phi_{exm} \approx ((L_d - L_q)i_\delta \sin\theta_m + \Phi_a)\cos\theta_m \quad (54)$$

$$\Phi_{exm} \approx ((L_d - L_q)i_\delta \sin\theta_m + \Phi_a) \quad (55)$$

$$\Phi_{exm} \approx \Phi_a \quad (56)$$

To calculate $\theta_m$ appearing in formula (54) etc., formula (40) above is used. As will be understood from formula (40), $\theta_m$ is a function of $i_\delta$, and thus $\Phi_{exm}$ also is a function of $i_\delta$. Since the calculation of $\Phi_{exm}$ is complicated, it is preferable to use an appropriate approximation formula to calculate it. Alternatively, table data containing different values of $\Phi_{exm}$ corresponding to different values of $i_\delta$ may be prepared beforehand so that an appropriate value of $\Phi_{exm}$ is obtained by referring to the table data whenever necessary.

Figure 36:
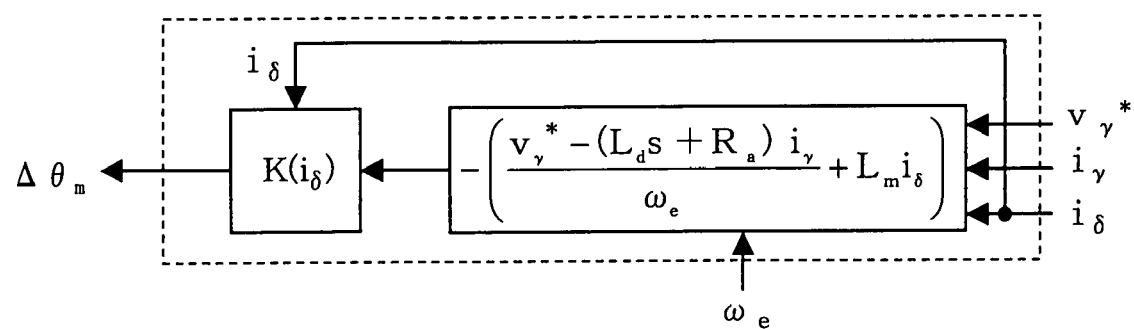
FIG. 36 is a diagram showing an example of the internal configuration of the second axis error estimator etc. shown in FIG. 15.

Let $K(i_\delta)=1/\Phi_{exm}$, and regard $K(i_\delta)$ as a coefficient of compensation. Then, when the fourth calculation method is used, the internal configuration of the second axis error estimator 202 etc. is as shown in FIG. 36. Instead of using the coefficient of compensation $K(i_\delta)$, it is also possible to vary the gains (coefficients of proportionality and of integration) used in the proportional-plus-integral calculators according to the value of $i_\delta$.

Fifth Calculation Method: Next, a fifth calculation method for calculating the axis error $\Delta\theta_m$ will be described. In the fifth calculation method, by use of the error current between the current on the dm-qm axes (the current through the motor model) and the current on the γ-δ axes, the axis error $\Delta\theta_m$ is calculated, and thereby the phase ($\theta_e$) of the γ-axis, which is an axis estimated for control purposes, is calculated (i.e., the rotor position is estimated).

The method will now be described by way of formulae. Ignoring the third term of the right side of formula (38) gives formula (57) below.

$$\begin{bmatrix} v_\gamma \\ v_\delta \end{bmatrix} = \begin{bmatrix} R_a + pL_d & -\omega L_m \\ \omega L_m & R_a + pL_d \end{bmatrix}\begin{bmatrix} i_\gamma \\ i_\delta \end{bmatrix} + E_{exm}\begin{bmatrix} -\sin\Delta\theta_m \\ \cos\Delta\theta_m \end{bmatrix} \quad (57)$$

$$= \begin{bmatrix} R_a + pL_d & -\omega L_m \\ \omega L_m & R_a + pL_d \end{bmatrix}\begin{bmatrix} i_\gamma \\ i_\delta \end{bmatrix} + \begin{bmatrix} E_{exm\gamma} \\ E_{exm\delta} \end{bmatrix}$$

When discretization is performed at a sampling period of $T_s$, formula (57) can be rearranged to formula (58) below.

$$\begin{bmatrix} i_\gamma(n) \\ i_\delta(n) \end{bmatrix} = \begin{bmatrix} 1 - \frac{R_a}{L_d}T_s & \omega(n-1)\frac{L_m}{L_d}T_s \\ -\omega(n-1)\frac{L_m}{L_d}T_s & 1 - \frac{R_a}{L_d}T_s \end{bmatrix}\begin{bmatrix} i_\gamma(n-1) \\ i_\delta(n-1) \end{bmatrix} + \quad (58)$$

$$\frac{T_s}{L_d}\begin{bmatrix} v_\gamma(n-1) \\ v_\delta(n-1) \end{bmatrix} - \frac{T_s}{L_d}\begin{bmatrix} E_{exm\gamma}(n-1) \\ E_{exm\delta}(n-1) \end{bmatrix}$$

On the other hand, the estimated currents $i_{M\gamma}$ and $i_{M\delta}$ obtained through the calculation by the second axis error estimator 202 etc. are given by formula (59) below by use of estimated induction voltages $E_{Mexm\gamma}$ and $E_{Mexm\delta}$, which are the values of $E_{exm\gamma}$ and $E_{exm\delta}$ as calculated on a model basis.

$$\begin{bmatrix} i_{M\gamma}(n) \\ i_{M\delta}(n) \end{bmatrix} = \begin{bmatrix} 1 - \frac{R_a}{L_d}T_s & \omega(n-1)\frac{L_m}{L_d}T_s \\ -\omega(n-1)\frac{L_m}{L_d}T_s & 1 - \frac{R_a}{L_d}T_s \end{bmatrix}\begin{bmatrix} i_\gamma(n-1) \\ i_\delta(n-1) \end{bmatrix} + \quad (59)$$

$$\frac{T_s}{L_d}\begin{bmatrix} v_\gamma(n-1) \\ v_\delta(n-1) \end{bmatrix} - \frac{T_s}{L_d}\begin{bmatrix} E_{Mexm\gamma}(n-1) \\ E_{Mexm\delta}(n-1) \end{bmatrix}$$

The second axis error estimator 202 etc. calculates the estimated induction voltages $E_{Mexm\gamma}$ and $E_{Mexm\delta}$ as estimated values of $E_{exm\gamma}$ and $E_{exm\delta}$, respectively. Moreover, since the estimated currents $i_{M\gamma}$ and $i_{M\delta}$ are calculated by use of $L_m$ instead of $L_q$, the estimated currents $i_{M\gamma}$ and $i_{M\delta}$ can be called currents that estimate the dm-axis and qm-axis components of the motor current $I_a$.

The differences between the currents $i_\gamma$ and $i_\delta$ based on the fixed-axis components ($i_u$ and $i_v$) of the motor current $I_a$ detected by the current detector 11 and the estimated currents $i_{M\gamma}$ and $i_{M\delta}$ obtained through calculation are called the error currents $\Delta i_\gamma$ and $\Delta i_\delta$, and are given by formula (60), which is based on formulae (58) and (59).

$$\begin{bmatrix} \Delta i_\gamma(n) \\ \Delta i_\delta(n) \end{bmatrix} = \begin{bmatrix} i_\gamma(n) \\ i_\delta(n) \end{bmatrix} - \begin{bmatrix} i_{M\gamma}(n) \\ i_{M\delta}(n) \end{bmatrix} \quad (60)$$

$$= -\frac{T_s}{L_d}\begin{bmatrix} E_{exm\gamma}(n-1) - E_{Mexm\gamma}(n-1) \\ E_{exm\delta}(n-1) - E_{Mexm\delta}(n-1) \end{bmatrix}$$

$$= -\frac{T_s}{L_d}\begin{bmatrix} \Delta E_{exm\gamma}(n-1) \\ \Delta E_{exm\delta}(n-1) \end{bmatrix}$$

Here, $\Delta E_{exm\gamma}$ is the error between the induction voltage $E_{exm\gamma}$ and the estimated induction voltage $E_{Mexm\gamma}$, which is an estimated value of the $E_{exm\gamma}$, and $\Delta E_{exm\delta}$ is the error between the induction voltage $E_{exm\delta}$ and the estimated induction voltage $E_{Mexm\delta}$, which is an estimated value of the $E_{exm\delta}$.

As will be clear from formula (60), the errors ($\Delta E_{exm\gamma}$, etc.) of the estimated values of the induction voltages are proportional to the error currents ($\Delta i_\gamma$, etc.). Thus, the errors of the estimated values of the induction voltages can be made to converge by use of the error currents. That is, the estimated induction voltages $E_{Mexm\gamma}$ and $E_{Mexm\delta}$ can be used as correct estimates of the induction voltages $E_{exm\gamma}$ and $E_{exm\delta}$ (the induction voltages can be estimated correctly).

Specifically, the estimated induced voltages now are calculated by use of the estimated induced voltages and the estimation errors before. More specifically, according to formula (61), the estimated induction voltages $E_{Mexm\gamma}$ and $E_{Mexm\delta}$ are calculated cyclically. Here, g represents the feedback gain for making the errors of the estimated values of the induction voltages converge.

$$\begin{bmatrix} E_{Mexm\gamma}(n) \\ E_{Mexm\delta}(n) \end{bmatrix} = \begin{bmatrix} E_{Mexm\gamma}(n-1) \\ E_{Mexm\delta}(n-1) \end{bmatrix} + g \begin{bmatrix} \Delta E_{exm\gamma}(n-1) \\ \Delta E_{exm\delta}(n-1) \end{bmatrix} \quad (61)$$
$$= \begin{bmatrix} E_{Mexm\gamma}(n-1) \\ E_{Mexm\delta}(n-1) \end{bmatrix} - \frac{g \cdot L_d}{T_s} \begin{bmatrix} \Delta i_\gamma(n) \\ \Delta i_\delta(n) \end{bmatrix}$$

Then, as in the first or second calculation method described above, according to formula (62) or (63) below, the axis error $\Delta\theta_m$ is calculated.

$$\Delta\theta_m = \tan^{-1} \frac{-E_{Mexm\gamma}(n)}{E_{Mexm\delta}(n)} \approx \frac{-E_{Mexm\gamma}(n)}{E_{Mexm\delta}(n)} \quad (62)$$

$$\Delta\theta_m = \sin^{-1} \frac{-E_{Mexm\gamma}(n)}{E_{exm}} \approx \frac{-E_{Mexm\gamma}(n)}{E_{exm}} \quad (63)$$

In formulae (58) to (63), parenthesized symbols ("n" and "n−1") represent the count of the sampling cycle in a case where discretization is performed at a sampling period of $T_s$. The symbol n stands for a natural number, and represents the next sampling cycle after the sampling cycle (n−1). The parts constituting the motor control device 3a or 3b calculate and output values cyclically every sampling period of $T_s$. Specifically, $i_\gamma(n)$ and $i_\delta(n)$ represent $i_\gamma$ and $i_\delta$ in the nth sampling cycle, and $i_\gamma(n-1)$ and $i_\delta(n-1)$ represent $i_\gamma$ and $i_\delta$ in the (n−1)th sampling cycle. The same applies to other symbols.

When the axis error $\Delta\theta_m$ calculated as described above is made to converge to zero so that the γ-axis follows the dm-axis, then $i_\gamma$ and $i_\delta$ follow $i_{dm}$ and $i_{qm}$, respectively. That is, it can be said that, when high-speed control is performed, the motor control device 3a or 3b breaks down the current flowing through the motor 1 into qm-axis and dm-axis components, and drives and controls the motor 1.

Modifications and Variations

Any description given above in conjunction with a given embodiment applies to any other embodiment unless inconsistent. All specific values given in the above description are merely examples, and thus may quite naturally be altered to different values.

According to the description above, in the first embodiment, $i_\gamma^*$ is set at zero or approximately zero; in the second to seventh embodiments, when high-speed control is performed, $i_\gamma^*$ is set at zero or approximately zero. Instead, at rotation speeds at which flux-weakening control needs to be performed, it is needless to say possible to output $i_\gamma^*$ having a value that suits such rotation speeds.

The current detector 11 may be configured to directly detect the motor current as shown in FIG. 3 etc; instead, it may be configured to reproduce the motor current from an instantaneous current in the DC current from the power supply and thereby detect the motor current.

All or part of the functions of the motor control device of each embodiment are realized, for example, with software (programs) incorporated into a general-purpose microcomputer or the like. When a motor control device is realized on a software basis, the block diagrams showing the configuration of relevant parts of the motor control device serve as functional block diagrams. Needless to say, it is also possible to realize a motor control device on a hardware basis alone, without using software (programs).

The second to seventh embodiments have been described as intended to achieve maximum torque control (or control approximate to it) when high-speed control is performed. It is however also possible to exploit what has been described above to achieve desired vector control different from maximum torque control. Needless to say, even then, it is possible to obtain the benefits described above, such as simplified parameter adjustment.

For example, in the second to seventh embodiments, a rotating axis that further leads in phase the rotating axis whose direction coincides with the direction of the current vector to be supplied to the motor 1 to achieve maximum torque control may be adopted as the qm-axis. This helps reduce iron loss, and thus helps enhance motor efficiency. By appropriately setting the lead of the qm-axis in phase, it is possible even to achieve maximum efficiency control.

To achieve maximum torque control, the value of $L_m$ is calculated according to formula (42) above. Using as $L_m$ a value smaller than the value calculated according to formula (42) above helps enhance motor efficiency.

For switching between low-speed control and high-speed control, in the second to sixth embodiments, the estimated axes are switched between the d-q axes and the dm-qm axes; in the seventh embodiment, the estimated axes are switched between the axes based on a specified speed and the dm-qm axes. These configurations, however, are in no way meant to limit the present invention. That is, the axes estimated when low-speed control is performed may be any axes other than the d-q axes and the axes based on a specified speed, and the axes estimated when high-speed control is performed may be any axes other than the dm-qm axes. Wherever the axes estimated when low-speed control is performed are different from the axes estimated when high-speed control is performed, it is possible to use a technique for switching between different types of control (and estimation processing) like those described in connection with the second to seventh embodiments.

The parts of the motor control device 3 shown in FIG. 3 excluding the estimator 20 together constitute a controller. The parts of the motor control device 3a shown in FIG. 14 excluding the estimator 40 together constitute a controller. In the motor control device 3a in FIG. 14, the controller may be regarded as including, or not including, the superposed voltage generator 41. The parts of the motor control device 3b shown in FIG. 25 excluding the estimator 45 together constitute a controller.

In each embodiment, the coordinate converters 12 and 18, the subtracters 13 and 14, and the current controller 15 together constitute a specified voltage calculator. The magnetic flux controller (16, 44, or 47), the speed controller 17, and the subtracter 19 together constitute a specified current calculator.

In the present specification, for the sake of simplicity, a status quantity or the like is often referred to by its symbol ($i_\gamma$ etc.) alone. For example, in the present specification, "$i_\gamma$" and "the γ-axis current $i_\gamma$" denote the same thing.

The present invention is suitable for all kinds of electric appliance employing a motor; it is suitable for, for example, electric cars that exploit the rotation of a motor to run, and compressors and the like employed in air conditioners and the like.

There is no restriction whatsoever on how to derive (or estimate) any of the values that need to be derived (or estimated), which include the various specified values ($i_\gamma^*$, $i_\delta^*$, $v_\gamma^*$, $v_\delta^*$, etc.) and other status quantities ($\omega_e$ etc.) mentioned above. Specifically, these values may be derived (or estimated) through calculation within the motor control device (3, 3a, etc.), or may be derived (or estimated) from table data prepared beforehand.

What is claimed is:

1. A motor control device comprising:
an estimator estimating a rotor position of a motor; and
a controller controlling the motor based on the estimated rotor position,
wherein
let two mutually perpendicular rotating axes that rotate as a rotor of the motor rotates be called an $x_1$-axis and a $y_1$-axis,
let a rotating axis different from the $x_1$-axis be called an $x_2$-axis, and
let a rotating axis perpendicular to the $x_2$-axis be called a $y_2$-axis,
control performed by the controller can be switched between
a first type of control by which, for a purpose of controlling the motor, the controller breaks down a motor current flowing through the motor into an $x_1$-axis component parallel to the $x_1$-axis and a $y_1$-axis component parallel to the $y_1$-axis, and
a second type of control by which, for a purpose of controlling the motor, the controller breaks down the motor current into an $x_2$-axis component parallel to the $x_2$-axis and a $y_2$-axis component parallel to the $y_2$-axis.

2. The motor control device according to claim 1, wherein
estimation processing performed by the estimator can be switched between a first type of estimation processing whereby the estimator makes the controller perform the first type of control and a second type of estimation processing whereby the estimator makes the controller perform the second type of control, and
the estimation processing actually performed by the estimator is switched between the first and second types of estimation processing according to speed information representing a rotation speed of the rotor.

3. The motor control device according to claim 1, wherein
let an axis parallel to a magnetic flux produced by a permanent magnet forming the rotor be called a d-axis,
let an axis leading the d-axis by an electrical angle of 90 degrees be called a q-axis,
let a rotating axis whose direction coincides with a direction of a current vector that achieves maximum torque control, or a rotating axis further leading that rotating axis in phase, be called a qm-axis, and
let a rotating axis perpendicular to the qm-axis be called a dm-axis,
the $x_1$-axis and the $y_1$-axis are the d-axis and the q-axis, respectively, or axes based on a given specified speed value, and
the $x_2$-axis and the $y_2$-axis are the dm-axis and the qm-axis, respectively.

4. The motor control device according to claim 2, wherein
when the estimation processing actually performed by the estimator is switched between the first and second types of estimation processing, a shift from one type of estimation processing to the other is made through estimation processing whereby results of the first and second types of estimation processing are taken into consideration according to the speed information or according to a length of time that has passed since a start of the switching.

5. The motor control device according to claim 2, wherein the estimator comprises:
a first estimation processor deriving a value for estimating a phase of the $x_1$-axis relative to a predetermined fixed axis; and
a second estimation processor deriving a value for estimating a phase of the $x_2$-axis relative to the fixed axis,
the phase of the $x_1$-axis estimated based on the value derived by the first estimation processor represents the rotor position as supposed to be estimated when the first type of estimation processing is performed, and the phase of the $x_2$-axis estimated based on the value derived by the second estimation processor represents the rotor position as supposed to be estimated when the second type of estimation processing is performed,
the second estimation processor
can derive a value for estimating the phase of the $x_1$-axis by using a first predetermined inductance as a calculation parameter corresponding to a q-axis inductance of the motor and,
when deriving the value for estimating the phase of the $x_2$-axis, uses, as the calculation parameter, a second predetermined inductance different from the first inductance, and
when the estimation processing actually performed by the estimator is switched from the first estimation processing to the second estimation processing, the calculation parameter used by the second estimation processor is temporarily made equal to the first inductance and is then made to vary toward the second inductance so as to eventually converge to the second inductance, and based on the value derived by the second estimation processor while the calculation parameter is so varying, the rotor position is estimated during the switching.

6. The motor control device according to claim 2, wherein the estimator comprises:
a first estimation processor deriving a value for estimating a phase of the $x_1$-axis relative to a predetermined fixed axis, and
a second estimation processor deriving a value for estimating a phase of the $x_2$-axis relative to the fixed axis,
the phase of the $x_1$-axis estimated based on the value derived by the first estimation processor represents the rotor position as supposed to be estimated when the first type of estimation processing is performed, and the phase of the $x_2$-axis estimated based on the value derived by the second estimation processor represents the rotor position as supposed to be estimated when the second type of estimation processing is performed,
when the estimation processing actually performed by the estimator is switched from the first estimation processing to the second estimation processing, the first estimation processor can derive a value for temporarily estimating the phase of the $x_2$-axis, and
when the estimation processing actually performed by the estimator is switched from the first estimation processing to the second estimation processing, prior to the switching, the value derived by the first estimation processor is temporarily made to converge to the value derived by the second estimation processor for estimating the phase of the $x_2$-axis, and, after completion of the convergence, the switching from the first estimation processing to the second estimation processing is actually performed.

7. The motor control device according to claim 1, wherein let an axis parallel to a magnetic flux produced by a permanent magnet forming the rotor be called a d-axis, and let an axis estimated, for control purposes, as corresponding to the d-axis be called a γ-axis, when the control actually performed by the controller is switched between the first and second types of control, a specified γ-axis current value that should be followed by a γ-axis component of the motor current is switched between a specified current value for the first type of control and a specified current value for the second type of control.

8. The motor control device according to claim 7, wherein when the control actually performed by the controller is switched between the first and second types of control, the specified γ-axis current value is derived based on both the specified current values for the first and second types of control.

9. A motor drive system comprising:

a motor;

an inverter driving the motor; and the motor control device according to claim 1, the motor control device controlling the motor by controlling the inverter.

* * * * *